United States Patent [19]

Nakano

[11] Patent Number: 6,018,991
[45] Date of Patent: Feb. 1, 2000

[54] SCANNING PROBE MICROSCOPE HAVING CANTILEVER ATTACHED TO DRIVING MEMBER

[75] Inventor: Katsushi Nakano, Kawasaki, Japan

[73] Assignee: Nikon Corporation, Japan

[21] Appl. No.: 08/967,215

[22] Filed: Oct. 28, 1997

Related U.S. Application Data

[63] Continuation of application No. 08/786,613, Jan. 21, 1997, which is a continuation of application No. 08/513,650, Aug. 10, 1995.

[30] Foreign Application Priority Data

| Aug. 11, 1994 | [JP] | Japan | 6-189140 |
| Aug. 11, 1994 | [JP] | Japan | 6-189141 |
| Oct. 12, 1994 | [JP] | Japan | 6-246251 |
| Oct. 12, 1994 | [JP] | Japan | 6-246252 |
| Jan. 30, 1995 | [JP] | Japan | 7-012243 |
| Mar. 10, 1995 | [JP] | Japan | 7-051246 |
| Mar. 28, 1995 | [JP] | Japan | 7-070164 |
| Apr. 10, 1995 | [JP] | Japan | 7-083625 |
| Apr. 10, 1995 | [JP] | Japan | 7-083626 |
| Jun. 6, 1995  | [JP] | Japan | 7-139230 |

[51] Int. Cl.[7] ................................................. G01B 5/28
[52] U.S. Cl. ......................................................... 73/105
[58] Field of Search ............................... 73/105; 250/306

[56] References Cited

U.S. PATENT DOCUMENTS

| 4,798,989 | 1/1989  | Miyazoki et al. ............... 250/306 X |
| 4,894,537 | 1/1990  | Blockford et al. .................. 250/306 |
| 5,038,322 | 8/1991  | Van Loenen ..................... 250/306 X |
| 5,155,715 | 10/1992 | Ueyema et al. .................. 250/307 X |
| 5,223,713 | 6/1993  | Uozumi et al. ...................... 250/306 |
| 5,257,024 | 10/1993 | West ........................................ 341/16 |
| 5,408,094 | 4/1995  | Kajimura . |
| 5,440,920 | 8/1995  | Jung et al. . |
| 5,463,897 | 11/1995 | Prater et al. . |
| 5,560,244 | 10/1996 | Prater et al. . |
| 5,587,523 | 12/1996 | Jung et al. . |

FOREIGN PATENT DOCUMENTS

| 1-178803 | 7/1989 | Japan . |
| 3-149742 | 6/1991 | Japan ..................................... 250/306 |
| 4-235302 | 8/1992 | Japan ..................................... 73/105 |
| 5-026662 | 2/1993 | Japan . |

OTHER PUBLICATIONS

Werf et al., "Compact stand–alone atomic force microscope", Rev. Sci. Instrum. 64(10), Oct. 1993, pp. 2892–2897.

*Primary Examiner*—Daniel S. Larkin
*Attorney, Agent, or Firm*—Pennie & Edmonds LLP

[57] ABSTRACT

An apparatus includes an X-direction piezoelectric driving member expandable in the X direction upon application of a voltage, and a Y-direction piezoelectric driving member expandable in the Y direction upon application of a voltage. One end of the X-direction piezoelectric driving member is flexibly connected to a frame via a hinge, and the other end of the member is firmly connected to a block. One end of the Y-direction piezoelectric driving member is flexibly connected to the frame via a hinge, and the other end of the member is flexibly connected to the block via a hinge. A probe can be scanned by using this scanning mechanism without causing much fluctuations of the optical axis of a light beam used for the atomic force microscope.

13 Claims, 47 Drawing Sheets

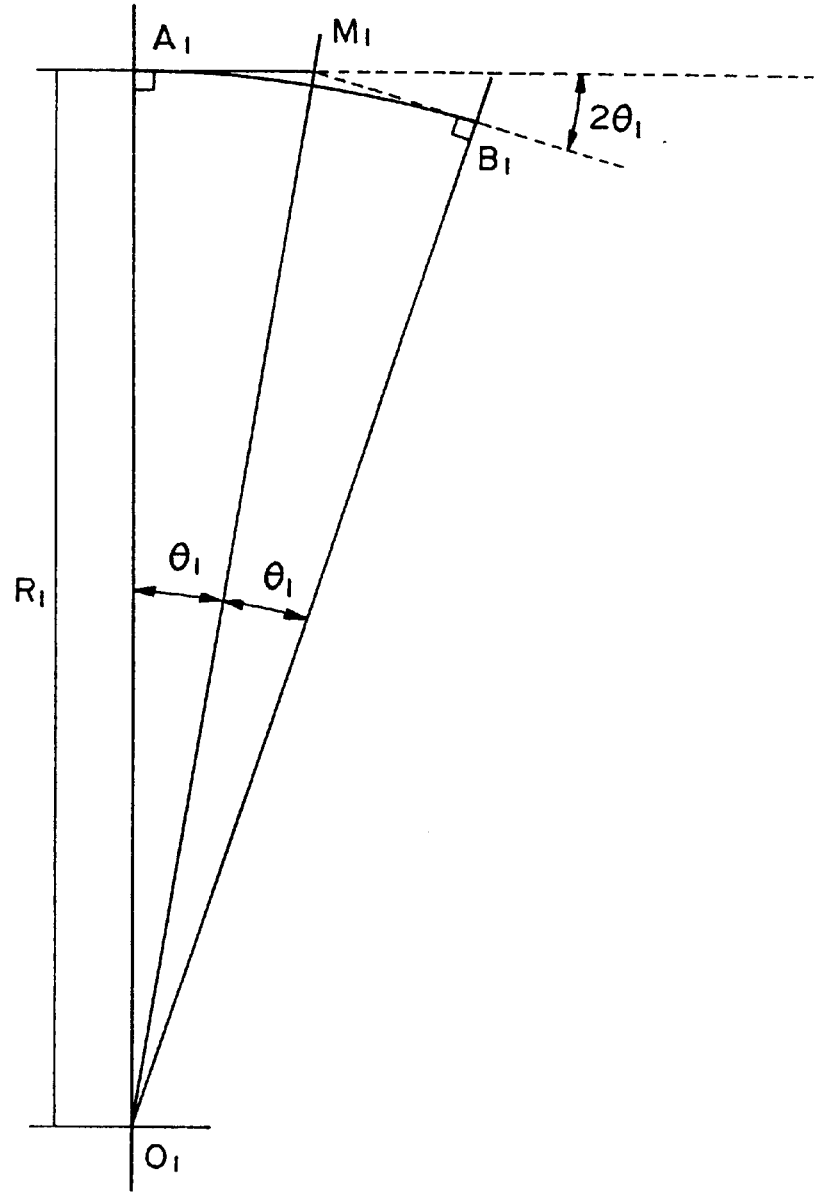

SCANNING PROBE MICROSCOPE HAVING CANTILEVER ATTACHED TO DRIVING MEMBER

This is a continuation of application Ser. No. 08/786,613, filed Jan. 21, 1997, which is a continuation of application Ser. No. 08/513,650, filed Aug. 10, 1995.

BACKGROUND OF THE INVENTION

1. Field of the Invention

The present invention relates to a scanning probe microscope such as an atomic force microscope using a piezoelectric scanner.

2. Related Background Art

Conventionally, an atomic force microscope has been used as an apparatus for detecting information of a sample surface. This apparatus is disclosed in Japanese Patent Laid-Open No. 2-281103.

SUMMARY OF THE INVENTION

An apparatus of the present invention includes an X-direction piezoelectric driving member expandable in the X direction upon application of a voltage, and a Y-direction piezoelectric driving member expandable in the Y-direction upon application of a voltage. One end of the X-direction piezoelectric driving member is flexibly connected to a frame via a hinge, and the other end of the member is firmly connected to a block. One of the Y-direction piezoelectric driving member is flexibly connected to the frame via a hinge, and the other end of the member is flexibly connected to the block via a hinge. A probe can be scanned by using this scanning mechanism without causing much fluctuations of the optical axis of a light beam used for the atomic force microscope.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIGS. 11A and 11B explain the operation of the piezoelectric element;

DESCRIPTION OF THE PREFERRED EMBODIMENTS

Figure 1A:
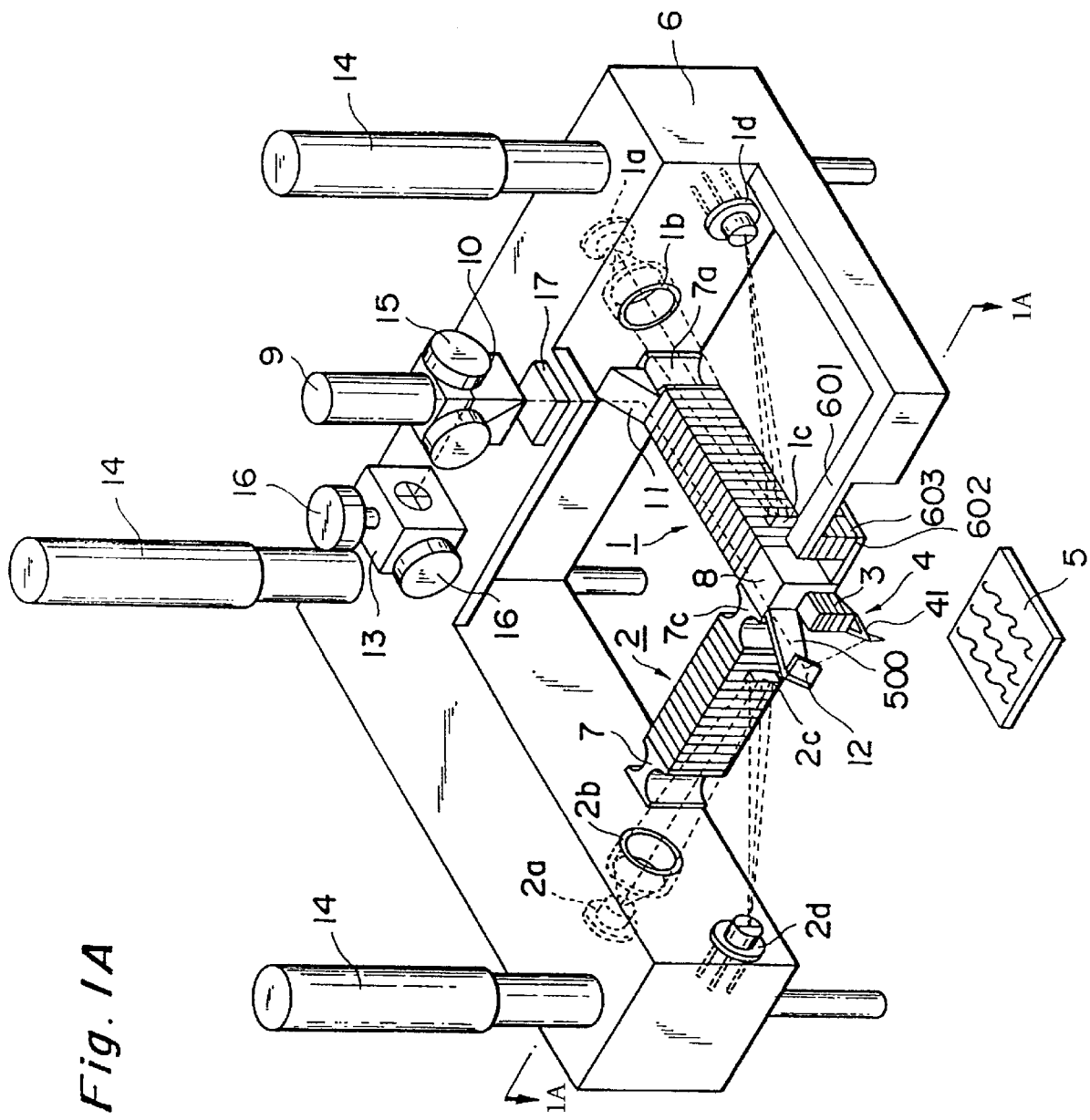
FIG. 1A is a perspective view of an atomic force microscope (AFM) according to an embodiment of the present invention.
Figure 1B:
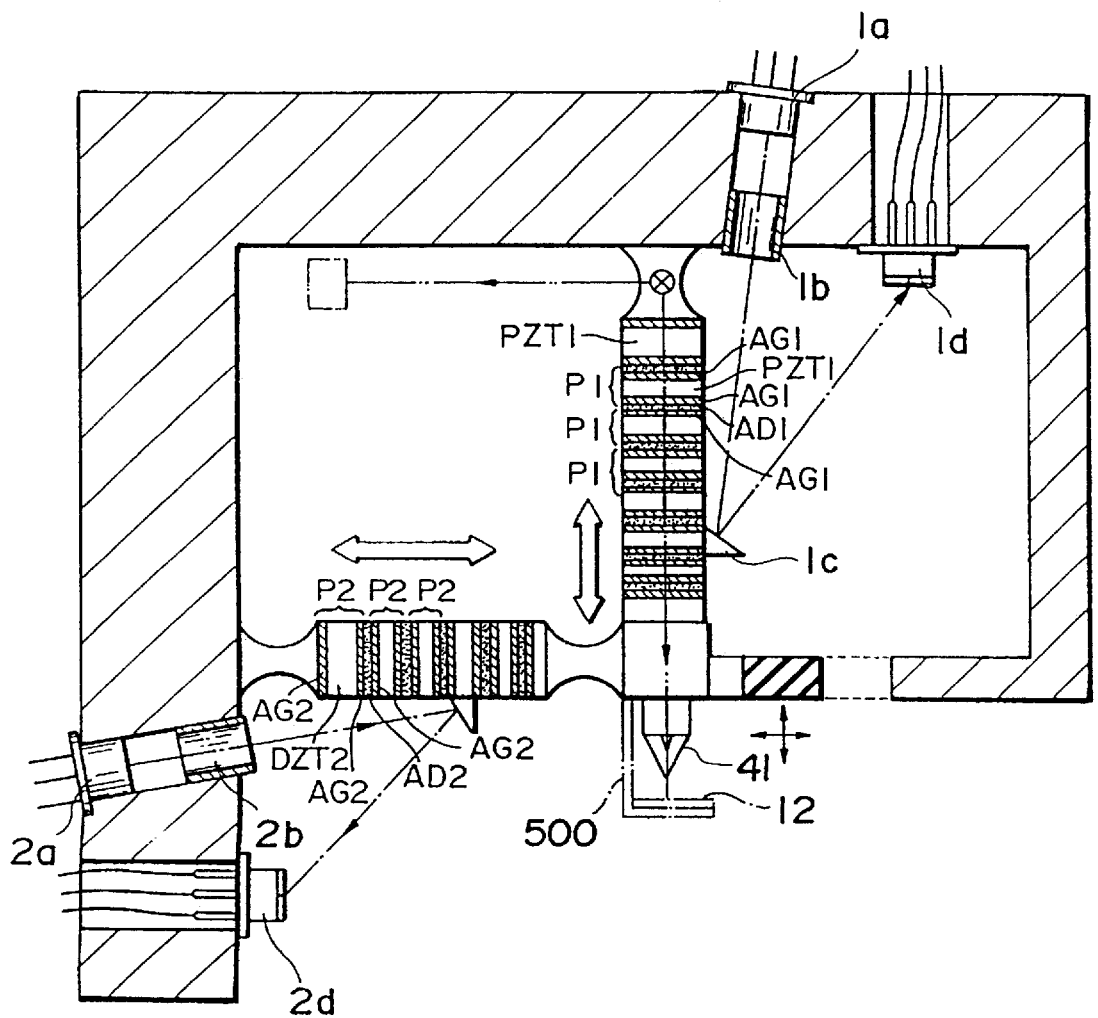
FIG. 1B is a sectional view taken along arrows A of the microscope in FIG. 1A.

FIG. 1A shows an atomic force microscope according to the first embodiment of the present invention. FIG. 1B is a sectional view taken along arrows A of the apparatus in FIG. 1A.

This atomic force microscope comprises a probe 4 having a cantilever 41 which is deflected by an interatomic force between the cantilever 41 and a sample 5, a laser source 9 for irradiating a light beam on the probe 4, and a photodetector 13 for detecting light reflected by the probe 4. This apparatus includes an X-direction piezoelectric driving member 1 expandable in the X direction (along a first straight line) upon application of a voltage and a Y-direction piezoelectric driving member 2 expandable in the Y-direction (along a second straight line) upon application of a voltage. One end of the piezoelectric driving member 1 is flexibly connected to a rigid frame 6 via a hinge 7a and the other end of the piezoelectric driving member 1 is firmly connected to a rigid block 8. One end of the piezoelectric driving member 2 is flexibly connected to the frame 6 via a hinge 7b, and the other end of the piezoelectric driving member 2 is flexibly fixed to the block 8 via a hinge 7c. These hinges 7a–7c can be deflected only in a direction parallel to a virtual plane (X-Y plane) including the first and second straight lines (X and Y axes).

The piezoelectric driving element 1 has a structure obtained by repeatedly stacking piezoelectric elements P1 each consisting of a piezoelectric crystal PZT1 such as PZT and silver electrodes AG1 sandwiching the piezoelectric crystal PZT1. The silver electrodes AG1 of each piezoelectric element P1 are bonded thereto with an epoxy resin AD1. The piezoelectric driving member 2 has a structure obtained by repeatedly stacking piezoelectric elements P2 each consisting of a piezoelectric crystal PZT2 such as PZT and silver electrodes AG2 sandwiching the piezoelectric crystal PZT2. The silver electrodes AG2 of each piezoelectric element P2 are bonded thereto with epoxy resin AD2.

The probe 4 is scanned within the X-Y plane by applying voltages to these piezoelectric driving members 1 and 2. An arm 500 is mounted on the block 8. A mirror 12 is mounted on the distal end of the arm 500. In measuring the moving amount of the probe 4 in a scanning operation, photodetectors 1d and 2d fixed to the frame 6 respectively detect light beams emitted from light sources 1a and 2a such as light-emitting diodes or semiconductor laser diodes and reflected by mirrors 1c and 2c fixed to the piezoelectric driving members 1 and 2. Note that the light beam from the light-emitting diode 1a passes through an objective lens 1b to be focused on the light-receiving surface of the light-receiving diode 1d. The light beam from the light-emitting diode 2a passes through an objective lens 2b to be focused on the light-receiving surface of the light-receiving diode 2d.

The scanning mechanism comprising the frame 6, the piezoelectric driving members 1 and 2, the hinges 7a, 7b, and 7c, and the block 8, and the mechanism for detecting a light beam emitted from the laser source 9 will be described later with reference to FIGS. 1C to 9.

The detection mechanism constituted by the light-emitting diodes 1a and 2a, the objective lenses 1b and 2b, the mirrors 1c and 2c, and the light-receiving diodes 1d and 2d and designed to detect the moving amount of the probe 4 will be described later with reference to FIGS. 20 to 22.

An antivibration mechanism using crossbeams 601 and 602 and a free end support member 603 clamped therebetween will be described later with reference to FIGS. 41 and 42.

The scanning mechanism will be briefly described first.

Scanning type probe microscopes have been enthusiastically developed and improved. Such a microscope is used to observe the fine structure of a sample surface by scanning a probe near the sample surface and detecting a tunnel current or an interatomic force acting between the sample and the probe.

Figure 5:
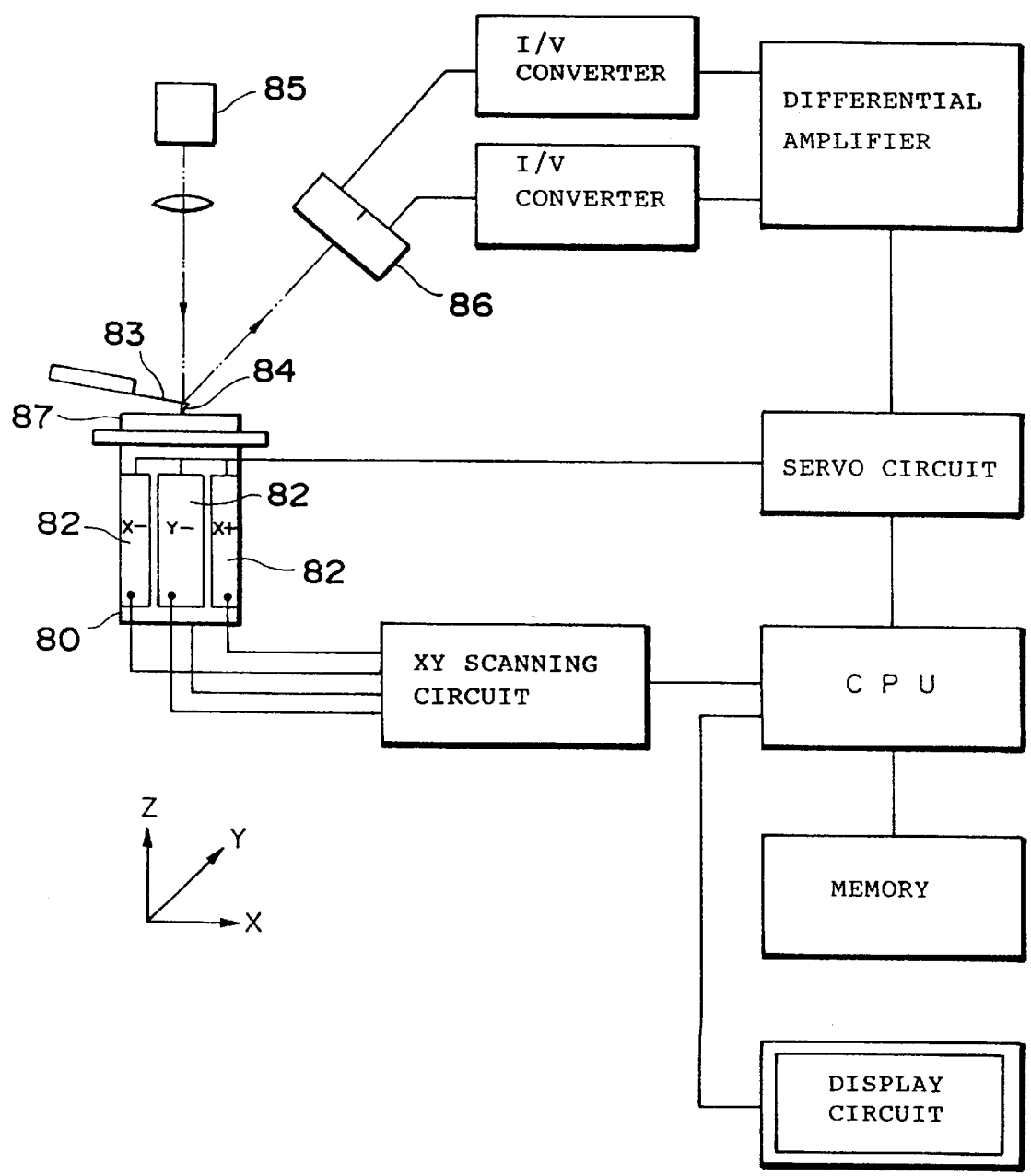
FIG. 5 is a perspective view of an atomic force microscope using a tube actuator.
Figure 6:
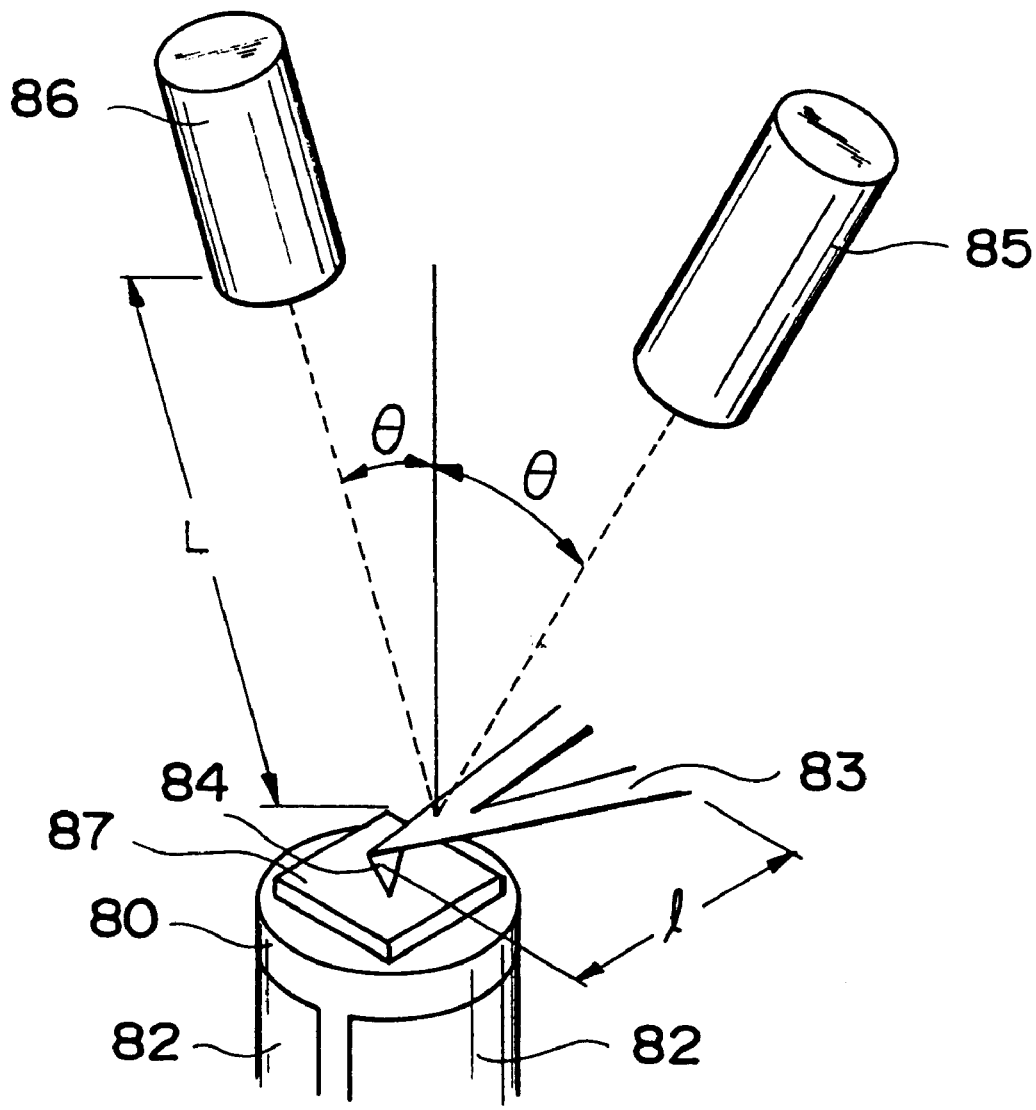
FIG. 6 is a perspective view showing the principle of an optical lever.

FIGS. 5 and 6 show an atomic force microscope as a scanning type probe microscope. The probe is constituted by a tip 84 for scanning a sample surface, and a cantilever 83. A sample 87 whose surface is to be observed is arranged on the free end side of a cylindrical piezoelectric driving mechanism. This piezoelectric is constituted by a cylindrical piezoelectric element 80. A ground electrode (not shown) is arranged inside the cylindrical piezoelectric element, and four divided electrodes 82 are arranged outside the piezoelectric element. The piezoelectric element 80 is driven by the following method. Voltages having opposite polarities with respect to the ground electrode, i.e., positive and negative voltages, are respectively applied to the electrodes 82 located outside the piezoelectric element to oppose each other. As a result, the cylindrical piezoelectric element 80 can be deflected in the horizontal direction. By using this phenomenon, i.e., deflection in the horizontal direction, a scanning/driving operation in the X or Y direction is performed. In performing a scanning/driving operation in the Z direction, offsets of the same voltage are respectively applied to the electrode located outside the piezoelectric element. As a result, the cylindrical piezoelectric element 80 can be expandably displaced in the Z direction. With these operations, a three-dimensional fine driving operation can be realized.

In general, a method of detecting an interatomic force used in the atomic force microscope is based on an optical lever method. In this optical lever method, the positional relationship between a light source 85 and the cantilever 83 and that between a photodetector 86 and the cantilever 83 must be kept relatively unchanged. For this reason, the detection system of a conventional atomic force microscope using a cantilever and this optical lever method is fixed, and the shape of a sample surface is observed by scanning the sample with respect to the cantilever.

In the scanning method based on such a sample driving operation, however, it is difficult to perform a scanning operation when a sample having a large area or mass is to be observed.

Demands, therefore, have currently arisen for atomic force microscopes designed to scan the cantilever having a tip itself to allow observation of a sample surface.

Such a conventional atomic force microscope designed to scan the cantilever is disclosed in Japanese Patent Laid-Open No. 6-82249. In this microscope, the cantilever and the interatomic force detection system using the optical lever method are incorporated into one structure, and the overall structure is scanned to relatively maintain the positional relationship between the light source and the cantilever 83 and that between the photodetector and the cantilever 83.

Attempts have also been made to mount an atomic force microscope in an optical microscope to allow simultaneous observation of a sample. According to this method, a cylindrical piezoelectric driving element which is large enough to enclose an objective lens is used, and one end of the element is fixed to the mirror barrel of the objective lens. A transparent plate-like member is attached to the other end of the element. A probe having a cantilever and a tip is fixed to the plate-like member. In this method, in order to use the optical microscope to observe a portion scanned with the atomic force microscope from right above the portion, an objective lens is arranged inside the cylindrical piezoelectric driving member (disclosed in Japanese Patent Laid-Open No. 2-281103).

In the conventional atomic force microscope for detecting an interatomic force by using the optical lever method, when a sample having a large area is to be measured, the resonance frequency of the piezoelectric driving member decreases owing to the mass of the sample, resulting in difficulty in observation.

In the conventional method, since the overall system for detecting an interatomic force by the optical lever method is scanned, the member for scanning the system inevitably has a large mass. Consequently, a high-speed scanning operation cannot be performed.

Each of the atomic force microscopes shown in FIGS. 1C to 4 has a compact, simple probe scanning/driving device which can always irradiate interatomic force detection light on the cantilever even during a probe scanning operation.

These microscopes will be briefly described first.

Each of these atomic force microscopes comprises a support member, an X-direction driving member having one end fixed to the support member via a hinge and expandable in the X direction parallel to a sample surface, a probe arranged on the other end of the X-direction driving member and having a cantilever and a tip, a Y-direction driving member for driving the probe in the Y direction parallel to the sample surface and different from the X direction, a light source, a first optical path changing member fixed on the X-direction driving member side from the bending center of a hinge arranged between the X-direction driving member and the support member, a second optical path changing member arranged on the X-direction driving member and having a reflecting surface, and a light-receiving member having a plurality of light-receiving surfaces for receiving light reflected by the cantilever and the second optical path changing member, wherein the light source and the first and second optical path changing members are arranged such that light from the light source is irradiated on the second optical path changing member via the first optical path changing member, and light from the first optical path changing member is irradiated on the cantilever via the second optical path changing member.

The first optical path changing member preferably has a reflecting surface for irradiating light from the light source onto the second optical path changing member. The position of the reflecting surface of the first optical path changing member which receives light from the light source preferably corresponds to a position on the extended line connecting the bending central portion of the hinge between the X-direction driving member and the support member and the optical axis of light from the light source. In addition, the second optical path changing member preferably has a reflecting surface for irradiating light from the first optical path changing member onto the cantilever and irradiating reflected light from the cantilever onto the first optical path changing member. Furthermore, the light-receiving member preferably has a plurality of light-receiving surfaces for receiving light reflected by the cantilever and passing through the second and first optical path changing members.

A cantilever-reflected light splitting member is preferably arranged between the light source and the first optical path changing member to transmit light from the light source and reflect light reflected by the first optical path changing member.

It is preferable that the X-direction driving member be a piezoelectric driving member obtained by stacking a plurality of piezoelectric elements in the X direction, and the Y-direction driving member be a piezoelectric driving member which has one end fixed to the support member via the hinge and the other end fixed to the X-direction piezoelectric driving member via the hinge and is obtained by stacking a plurality of piezoelectric elements in the Y direction. A Z-direction driving member is preferably arranged on the other end of the X-direction driving member. The Z-direction driving member is obtained by stacking a plurality of piezoelectric elements in the Z direction perpendicular to the sample surface and is expandable in the Z direction. The probe is preferably arranged on the end of the Z-direction driving member which is located on the sample surface side.

In detecting an interatomic force by the optical lever method, a change in the optical axis of reflected light is detected in accordance with the deflection amount of the cantilever. Therefore, the following two conditions are required to accurately detect the deflection amount of the cantilever by this method:

① The optical axis of light incident on the cantilever does not change.

② When the deflection amount of the cantilever is constant, the light reception position of the photodetector at which reflected light is received does not change.

In consideration of these two points, the present inventor has invented an optical system in which the light reception position of the photodetector at which reflected light is received does not change when the optical axis of light incident on the cantilever does not change even if the probe moves, and the deflection amount of the cantilever is constant.

In addition, according to the present invention, in order to minimize the mass applied to each driving member, the light source and the light-receiving member are not arranged on the driving member.

Assume that light from the light source is directly irradiated on the cantilever. In this case, if the probe is driven by the driving member, since the probe is moved, the light from the light source is not irradiated on the cantilever. In order to solve this problem, in the present invention, a constant relationship is maintained between the optical path of light from the light source and the axis of the X-direction driving member in the expanding/contracting direction by the first optical path changing member. More specifically, assume that the optical path of light emitted from the light source and transmitted through the first optical path changing member is nearly parallel to the axis of the X-direction driving member in the expanding/contracting direction. In this case, if the axis of the X-direction driving member changes, since the first optical path changing member is arranged on the X-direction driving member side from the bending center of the hinge, the axis of the X-direction driving member is parallel to the optical axis of light emitted from the light source and transmitted through the first optical path changing member. Even if the X-direction driving member expands/contracts, since the relationship between the optical axis and the axis of the X-direction driving member does not change, no influence is present.

In this manner, even when the probe is driven, a constant relationship is maintained between the optical path of light from the first optical path changing member and the X-direction driving member.

Furthermore, in the present invention, the second optical path changing member is arranged to irradiate light from the first optical path changing member onto the cantilever. Since the second optical path changing member is mounted on the X-direction driving member, the angle defined by the reflecting surface of the second optical path changing member and the optical path of light from the first optical path changing member can always be kept constant with respect to the optical path of light from the first optical path changing member.

Even when each driving member is driven, light from the light source can be caused to be incident on the cantilever at a constant incident angle in this manner.

Since light reflected by the cantilever is irradiated on the light-receiving member via the second and first optical path changing members, even if each driving member is driven, the reflected light from the cantilever reaches the same place of the light-receiving member unless the cantilever deflects.

In addition, the first optical path changing member has a reflecting surface. The reflecting surface is at the bending center of the hinge and is fixed on the piezoelectric driving member side from the center. Even if the angle of the piezoelectric driving member fixed to the hinge changes with respect to the support member, since the first optical path changing member undergoes an angle change of the same amount as that of the above angle change, the optical axis can be changed by the same amount as that of the angle change. Furthermore, the position of the center of the reflecting surface of the first optical path changing member does not change. For this reason, by fixing the second optical path changing member to the piezoelectric driving member subjected to an angle change, light can always be irradiated on the same portion even if the cantilever moves.

When this piezoelectric driving member expands/contracts, the optical axis undergoes no change, and hence a description thereof will be omitted.

If a beam splitter for reflecting light reflected by the cantilever is arranged between the light source and the first optical path changing member having the reflecting surface, the optical path of light from the light source and the optical axis of light reflected by the cantilever can be completely changed. In such an atomic force microscope, since the deflection amount of the cantilever is small, the optical path of light from the light source is almost parallel to the optical path of light reflected by the cantilever. If a beam splitter is arranged, the light source and the light-receiving members can be easily arranged.

The present invention will be described in detail with reference to the following embodiments. However, the present invention is not limited to the embodiments.

Figure 1C:
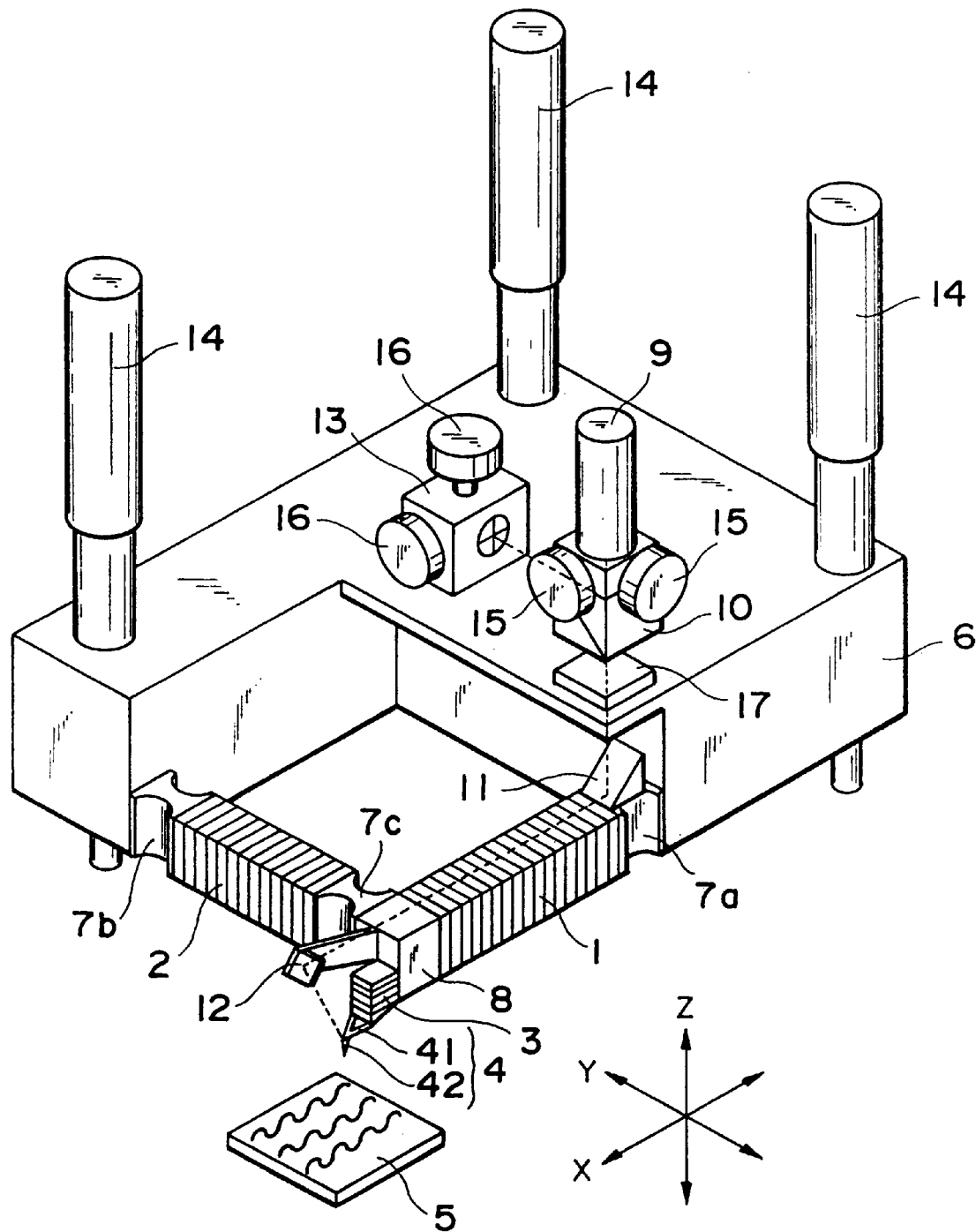
FIG. 1C is a perspective view for explaining the scanning mechanism of the microscope and the beam bounds.

FIG. 1C is a perspective view of an atomic force microscope according to an embodiment.

This atomic force microscope includes a driving device capable of moving a probe 4 to any position by using a combination of an X-direction piezoelectric driving member 1 which is expandable in the X direction parallel to the surface of a sample 5, a Y-direction piezoelectric driving member 2 which is expandable in a direction parallel to the surface of the sample 5 and perpendicular to the X direction, and a Z-direction piezoelectric driving member 3 is expandable in a direction perpendicular to the surface of the sample 5. In other words, the driving member 3 is expandable along a third straight line (Z-direction or axis) perpendicular to the virtual plane (X-Y plane) including the first and second straight lines. The probe 4 is constituted by a cantilever 41 and a tip 42.

One end of the X-direction piezoelectric driving member 1 is fixed to a support substrate 6 via a hinge 7*a*. The other end of the X-direction piezoelectric driving member 1 is fixed to a block 8.

One end of the Y-direction piezoelectric driving member 2 is fixed to the support substrate 6 via a hinge 7*b*. The other end of the Y-direction piezoelectric driving member 2 is fixed to the block 8 via a hinge 7*c*. In this manner, the X-direction piezoelectric driving member 1 and the Y-direction piezoelectric driving member 2 are fixed at a right angle.

The Z-direction piezoelectric driving member 3 is also fixed to the block 8. The probe 4 is fixed to the end of the Z-direction piezoelectric driving member 3 which is located on the sample surface side.

The support substrate 6 has micrometers 14 for performing coarse position adjustment between the probe 4 and the sample 5. The micrometers 14 support the support substrate 6. A laser source 9, a polarizing beam splitter 10, a λ/4 plate 17, and a 4-division position sensor photodiode 13 are arranged on the support substrate 6.

The laser source 9 is a light source used to detect the deflection amount of the cantilever 41 of the probe 4 by the optical lever method. As the laser source 9, a polarized light source, e.g., a semiconductor laser. The polarizing beam splitter 10 transmits light from the laser source 9, and reflects light reflected by the cantilever 41 toward the 4-division position sensor photodiode 13. The polarizing beam splitter 10 and the 4-division position sensor photodiode 13 respectively have a polarizing beam splitter fine movement mechanism 15 and a 4-division position sensor photodiode fine movement mechanism 16. The optical path of light reflected by the polarizing beam splitter 10 can be adjusted by using the polarizing beam splitter fine movement mechanism 15. The position and angle of the light-receiving surface of the 4-division position sensor photodiode 13 can be adjusted by the 4-division position sensor photodiode fine movement mechanism 16.

A first reflecting mirror 11 is arranged on the hinge 7*a*. A second reflecting mirror 12 is arranged on the block 8.

The first reflecting mirror 11 reflects light from the laser source 9 and makes the reflected light have an optical path nearly parallel to the expanding/contacting direction of the X-direction piezoelectric driving member 1. The first reflecting mirror 11 is fixed on the X-direction piezoelectric driving member 1 side from the bending center of the hinge 7a and a portion of the first reflecting mirror which receives and reflects light from the laser source 9 is located right above the bending center of the hinge 7a. With this arrangement, when the hinge 7a is bent with expansion/contraction of the Y-direction piezoelectric driving member 2, the reflecting surface undergoes an angle change to the same degree as that of the bending.

The second reflecting mirror 12 irradiates light reflected by the first reflecting mirror 11 onto the cantilever 41.

Detection of the deflection amount of the cantilever 41 in the atomic force microscope having the above arrangement will be described next.

A laser beam from the laser source 9 is incident on the polarizing beam splitter 10. Since the plane of polarization of this laser beam is adjusted in the direction in which the laser beam is transmitted through the polarizing beam splitter 10, the laser beam is transmitted through the polarizing beam splitter 10 to be incident on the $\lambda/4$ plate 17. The laser beam is then circularly polarized. The circularly polarized laser beam is incident on the first reflecting mirror 11. The optical path of the laser beam becomes nearly parallel to the axial direction of the X-direction piezoelectric driving member 1. The laser beam reflected by the first reflecting mirror 11 is incident on the second reflecting mirror 12, by which the optical path of the laser beam is changed. The laser beam is then incident on and reflected by the cantilever 41. The laser beam reflected by the cantilever 41 is reflected by the second and first reflecting mirrors 12 and 11 and is transmitted through the $\lambda/4$ plate 17. At this time, the laser beam becomes linearly polarized light again. The laser beam reflected by the cantilever 41 has a plane of polarization which is perpendicular to the plane of polarization of the laser beam emitted from the laser source 9. The light reflected by the cantilever 41 is reflected by the polarizing beam splitter 10 to be incident on the 4-division position sensor photodiode 13.

A case wherein one of the piezoelectric driving members is driven will be described below.

Figure 2:
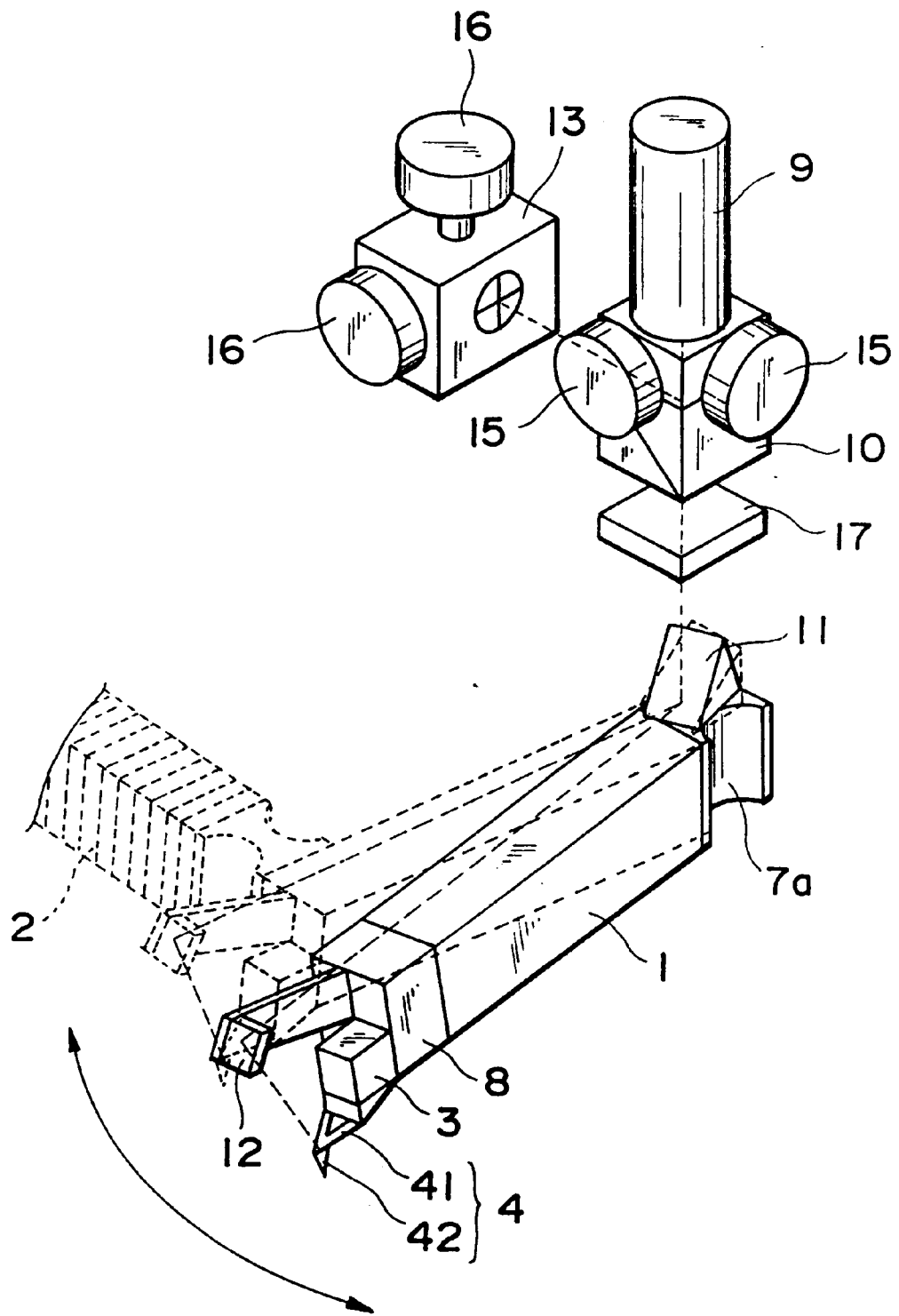
FIG. 2 is an enlarged view of a portion of the scanning mechanism in FIG. 1C.

FIG. 2 shows a case wherein the Y-direction piezoelectric driving member 2 is driven. The portions indicated by the thin dotted lines indicate a state wherein the Y-direction piezoelectric driving member 2 is not driven, whereas the portions indicated by the solid lines indicate a state wherein the Y-direction piezoelectric driving member 2 is driven. When the Y-direction piezoelectric driving member 2 is displaced, the X-direction piezoelectric driving member 1 is inclined. At the same time, the first reflecting mirror 11 can be inclined by the same amount by which the X-direction piezoelectric driving member 1 is inclined because the first reflecting mirror 11 is mounted on the side of the hinge 7a which is located at the X-direction piezoelectric driving member 1. For this reason, even after the displacement of the Y-direction piezoelectric driving member 2, the relationship between the axial direction of the X-direction piezoelectric driving member 1 and the optical path of light reflected by the first reflecting mirror 11 does not change. Furthermore, since the second reflecting mirror 12 is fixed to the block 8 directly fixed to the X-direction piezoelectric driving member 1, the relationship between the second reflecting mirror 12 and the optical path of light reflected by the first reflecting mirror 11 does not change either. Even if, therefore, the Y-direction piezoelectric driving member 2 is displaced, a laser beam can always be irradiated on the cantilever 41.

A case wherein the X-direction piezoelectric driving member 1 is displaced will be described below. When the X-direction piezoelectric driving member 1 is displaced, only the distance between the second reflecting mirror 12 and the first reflecting mirror 11 changes, but the relationship between the optical path of light reflected by the first reflecting mirror 11 and the reflecting surface of the second mirror 12 undergoes no change. For this reason, a laser beam can always be irradiated on the cantilever 41.

A method of measuring the surface of the sample 5 by scanning the probe 4 will be described.

Figure 3:
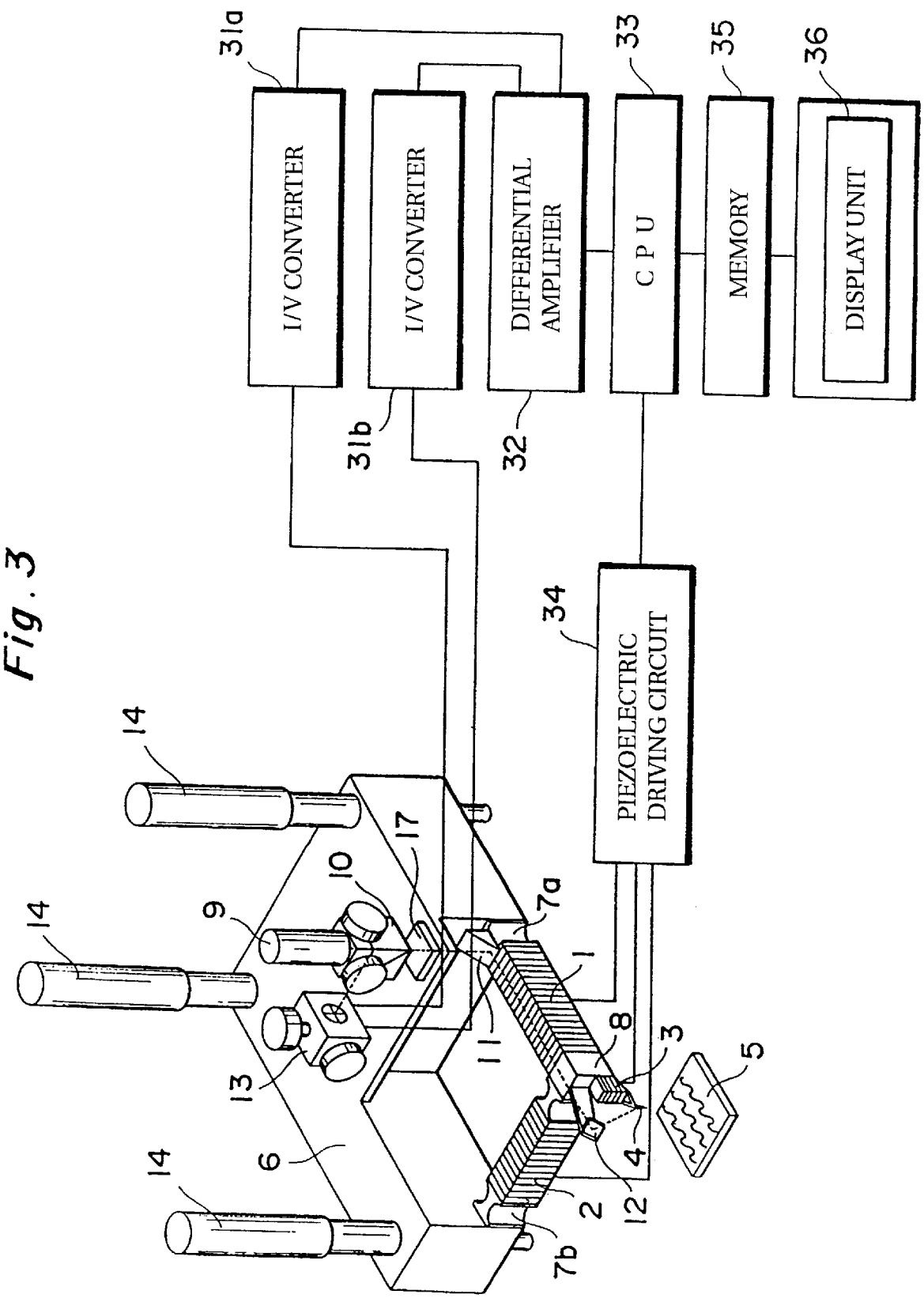
FIG. 3 is a view showing a detection system.

This method will be described with reference to FIG. 3.

When the deflection amount of the cantilever 41 changes, the optical path of a laser beam reflected by the cantilever 41 changes. This change in the optical path of the reflected light is represented by a change in the position of the spot of a laser beam on the 4-division position sensor photodiode 13. This change in the position of the spot of the laser beam is detected on the basis of the differences between currents obtained from the respective light-receiving surfaces of the 4-division position sensor photodiode 13. The currents obtained from the four light-receiving surfaces are converted into voltages corresponding to the respective currents by I/V converters 31a and 31b. The voltages obtained by the I/V converters 31a and 31b are input to a differential amplifier 32. The differences between the voltages are calculated, and the resultant data are input to a CPU 33. The CPU 33 calculates a change in the deflection amount of the cantilever 41 on the basis of the respective voltage differences. The CPU 33 outputs a signal for displacing the Z-direction piezoelectric driving member 3 to a piezoelectric driving circuit 34 to displace the Z-direction piezoelectric driving member 3 so as to make the deflection amount of the cantilever 41 constant. The expansion/contraction amounts of the respective piezoelectric driving members are input from the piezoelectric driving circuit 34 to the CPU 33. The CPU 33 calculates the sizes of uneven portions of the sample surface at the respective positions from the expansion/contraction amounts of the piezoelectric driving members, and outputs the resultant data to a memory 35. The position data and the information of the uneven portions at the respective positions are output altogether from the memory 35 to a display unit 36. The display unit 36 three-dimensionally displays an image of the sample surface.

As described above, in the atomic force microscope of this embodiment, since the members for detecting an interatomic force which are supported by the piezoelectric driving members are only the first and second reflecting mirrors 11 and 12, the mass to be scanned can be relatively small. Especially in this case, the second reflecting mirror 12 may be smaller than the first reflecting mirror 11. This is because light from the laser source 9 is focused by a lens arranged in the laser source 9 above the cantilever 41. That is, as a laser beam approaches the cantilever 41, the width of the laser beam is reduced. Therefore, the diameter of the laser beam irradiated on the second reflecting mirror 12 is smaller than that of the laser beam irradiated on the first reflecting mirror 11. The first reflecting mirror 11 must have a certain size. However, the first reflecting mirror 11 is only rotated above the hinge 7a and hence any large force is not required.

As described above, the second reflecting mirror 12, which must be moved as the cantilever 41 is scanned, can be reduced in size and weight, whereas the first reflecting mirror 11, which need not be scanned/moved, need not be reduced in weight. Since the optical system has such an efficient arrangement, even if the probe 4 is scanned in either the X direction or the Y direction at a high speed, an interatomic force can be accurately detected. In addition, since the mass to be scanned is reduced, a high resonance frequency can be used. With the use of the high resonance frequency, there is no influence on vibrations, and the resolution can be increased even if the probe 4 is scanned.

Since the light incident on the cantilever 41 and the light reflected by the cantilever 41 propagate along the same route, the laser source 9 can be arranged near the 4-division position sensor photodiode 13 by inserting the λ/4 plate 17 and the polarizing beam splitter 10 between the first reflecting mirror 11 and the laser source 9. Therefore, the atomic force microscope of this embodiment can be made compact.

In this embodiment, the reflecting surface of the first reflecting mirror 11 for receiving light from the laser source 9 is located right above the bending center of the hinge 7a and the second reflecting mirror 12 is arranged at the end of the X-direction piezoelectric driving member 1 on which the Z-direction piezoelectric driving member 3 is mounted. With this arrangement, even if the position of the probe 4 changes upon driving of each piezoelectric driving member, light can always be irradiated on the cantilever 41, and light reflected by the cantilever 41 can be received without moving the laser source 9 and the 4-division position sensor photodiode 13.

If the reflecting surface of the second reflecting mirror 12 is arranged such that the optical path of light reflected by the second mirror 12t is perpendicular to the reflecting surface of the cantilever 41, a change in reflected light on the 4-division position sensor photodiode 13 which changes upon deflection of the cantilever 41 increases. As a result, high measurement/detection sensitivity can be obtained.

Figure 4:
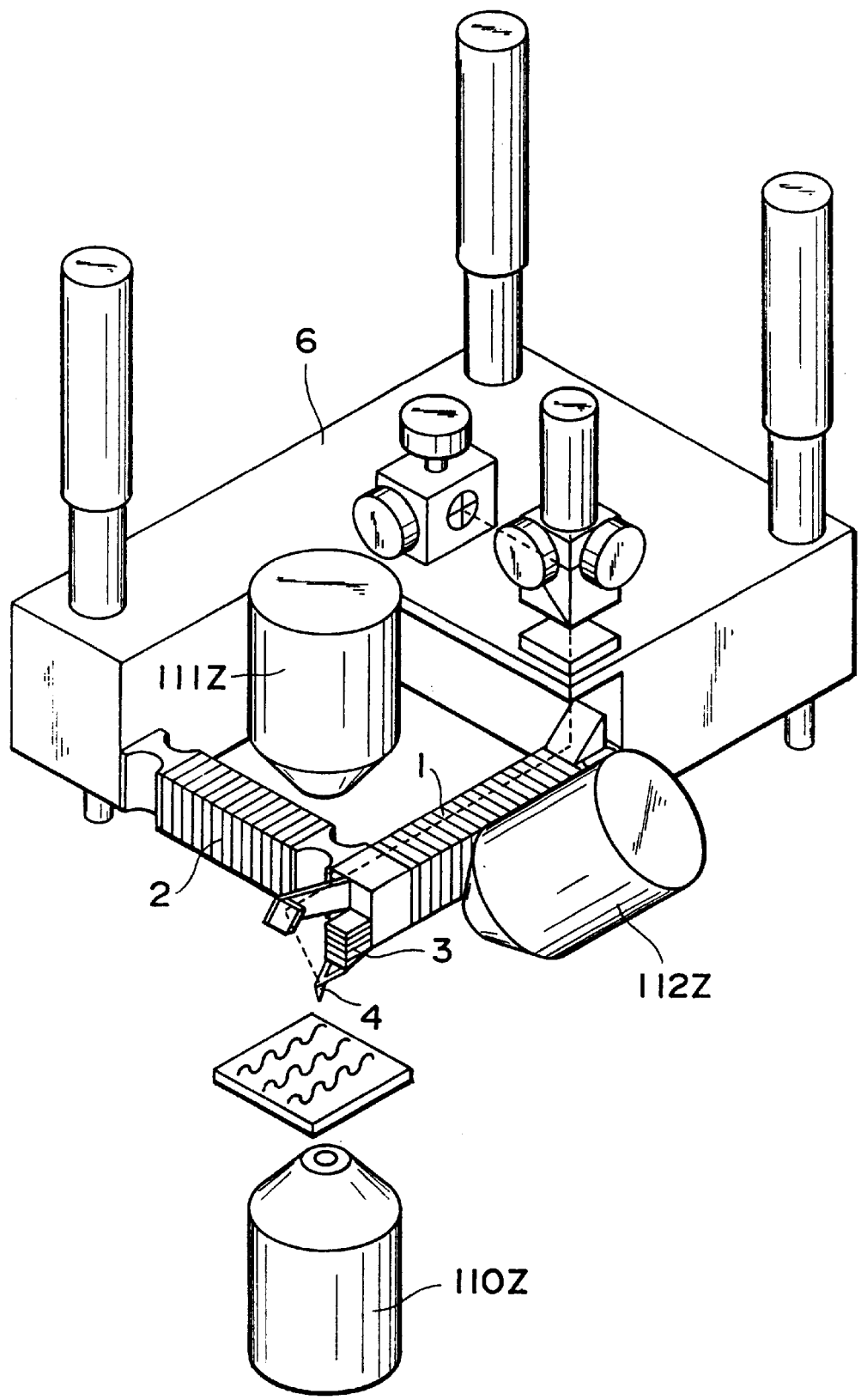
FIG. 4 is a perspective view of an atomic force microscope having objective lenses.

In the atomic force microscope of this embodiment, since the laser source 9 and the 4-division position sensor photodiode 13 are not arranged above the probe 4, objective lenses 110z, 111z, and 112z of an optical microscope can be arranged in the manner shown in FIG. 4. In this embodiment, the laser source 9 and the position sensor photodiode 13 are not arranged above the probe 4, the atomic force microscope can be smaller in profile than the conventional atomic force microscope. For this reason, in mounting this atomic force microscope on an optical microscope, not a change in the design of the optical microscope nor remodeling is required, and simultaneous observation is allowed with the optical microscope and the atomic force microscope with the maximum function of the existing optical microscope. Since observation in a narrow range is performed with the atomic force microscope, and observation in a wide range is performed with the optical microscope, the utility value of the microscope greatly improves.

As the first and second reflecting mirrors in this embodiment, either mirrors or prisms may be used as long as the optical axis of a laser beam can be changed. The first reflecting mirror, in particular, may not be a member for reflecting light from the laser source and reflecting light reflected by the second reflecting mirror. Alternatively, the first reflecting mirror may be not be used, and light from the laser source may be irradiated on the second reflecting mirror through an optical fiber to detect the deflection amount of the cantilever. Light reflected by the cantilever may be directly incident on the position sensor photodiode via the second reflecting mirror.

In this embodiment, the laser source is used as a light source used to detect the deflection amount of the cantilever. However, other light sources may be used as long as a light beam can be sufficiently reduced in diameter. For example, a light source which has a lens arranged for a light-emitting diode to sufficiently reduce a light beam in diameter may be used.

If light reflected by the cantilever 41 is sufficiently strong, a half mirror may be used in place of the λ/4 plate 17 and the polarizing beam splitter 10.

According to the present invention, the laser source and the position sensor photodiode, which are used to detect the deflection amount of the cantilever of the atomic force microscope, need not be arranged above the cantilever but can be arranged at arbitrary positions. In addition, a compact atomic force microscope can be obtained.

The scanning device shown in FIG. 1C will be further described next.

The three-dimensional driving device in the probe scanning type microscope needs to move in the Z direction perpendicular to a sample surface while keeping the distance between the sample surface and the probe constant, and scan within a plane in the X and Y directions parallel to the sample surface to measure the uneven shape of the sample surface on the atomic order.

In a conventional probe scanning type microscope, the probe or a sample is driven by a tripod type driving device or a tube type driving device.

Figure 9:
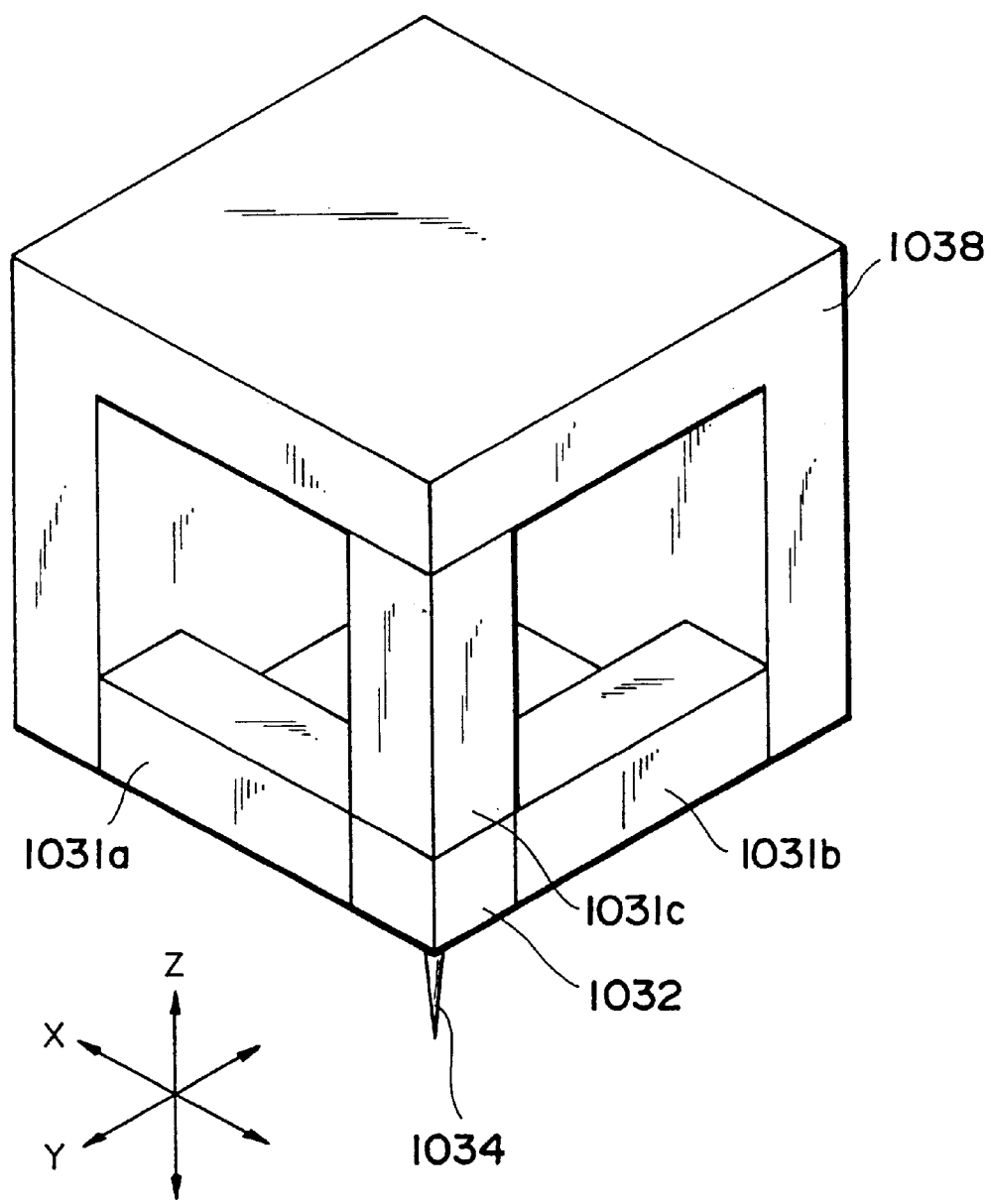
FIG. 9 is a perspective view of a conventional apparatus.

FIG. 9 shows a tripod type driving device. The tripod type driving device has three piezoelectric driving members 1031a, 1031b, and 1031c for independently driving the prove in the X, Y, and Z directions. The respective driving members are arranged on the same vertex. One end of each of the piezoelectric driving members 1031a, 1031b, and 1031c of the tripod type driving device is fixed on a substrate 1038, and a probe 1034 is fixed to the other end of each member via a block 1032. Since one end of each of the piezoelectric driving members of this tripod type driving device is fixed to the substrate, if each piezoelectric driving member is displaced, a stress is accumulated in each member. A fine positioning apparatus (Japanese Patent Laid-Open No. 63-265573) is available, in which in order to reduce the influences of the stress, a tripod type driving device has two fixing ends, and piezoelectric driving members are fixed to a substrate via hinges.

In the above tripod type driving device, however, since the ends of the piezoelectric driving members which are located on the opposite side to the substrate are fixed to one portion, an internal stress is accumulated in the piezoelectric driving members constituting the tripod type driving device. Owing to the internal stress, each piezoelectric driving member deflects and cracks, posing a problem in terms of durability.

Figure 7:
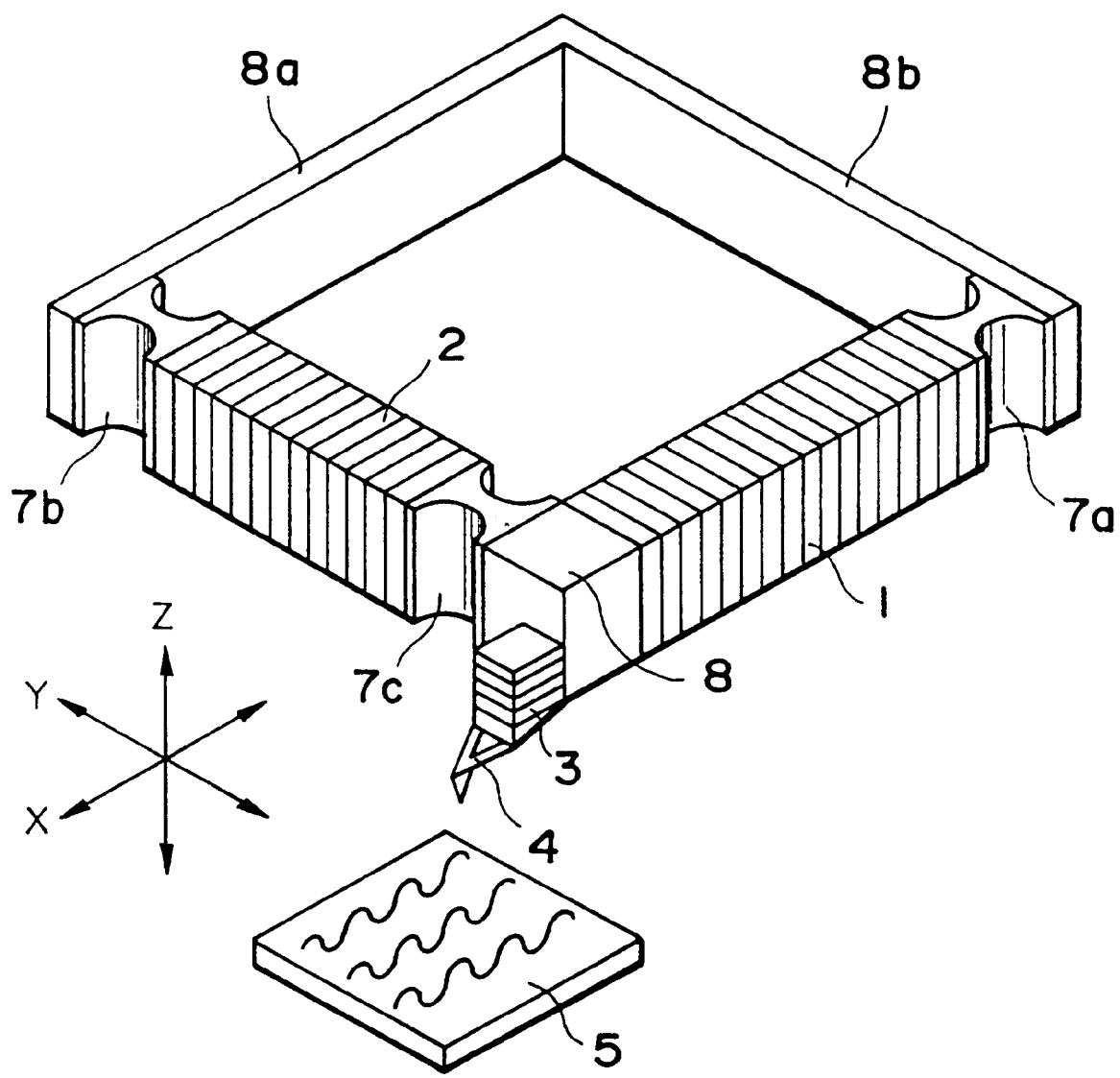
FIG. 7 is a perspective view of a scanning mechanism.

FIG. 7 shows a piezoelectric driving device which can remove the stress accumulated in each piezoelectric driving member.

This device will be briefly described first.

In this piezoelectric driving device for scanning the probe in a probe scanning type microscope comprising a support member, X- and Y-direction scanning piezoelectric driving members constituted by two piezoelectric elements which are respectively expandable in the X and Y directions to scan a given plane and each of which has one end fixed to the support member via a hinge, a block arranged on the other end of each of the X- and Y-direction scanning piezoelectric elements, the other end being different from one end fixed to the support member, and a Z-direction scanning piezoelectric driving member which is fixed to the block and is scanned in a direction perpendicular to the given plane, a flexible member is arranged between the block and at least one of the X- and Y-direction scanning piezoelectric elements. In addition, according to the present invention, the flexible member arranged between the block and one of the two piezoelectric elements expandable in the X and Y directions is designed such that a portion between the end fixed to the block and the end fixed to one of the two piezoelectric elements can be bent within the X-Y plane, and is smaller in width than the two ends.

A probe used for a probe scanning type microscope is used for observation in a wide range relative to the size of the probe. For this reason, the probe must be scanned a large number of times. Consequently, high stability and high durability are required for piezoelectric driving members for driving the probe.

According to the present inventor, in order to obtain a probe driving device with high stability and high durability, one piezoelectric driving member is fixed to the other piezoelectric driving member at a right angle, and a flexible member is arranged on a fixing portion of at least one of the piezoelectric driving members to be inserted between the two members.

This flexible member can be bent at least within a given plane (to be referred to as the X-Y plane hereinafter). As the flexible member, a spring, a hinge, or the like which can be bent within the given plane is used.

By inserting the hinge between the piezoelectric driving members in this manner, the probe driving device can drive the probe without deflecting the piezoelectric driving members.

Figure 8A:
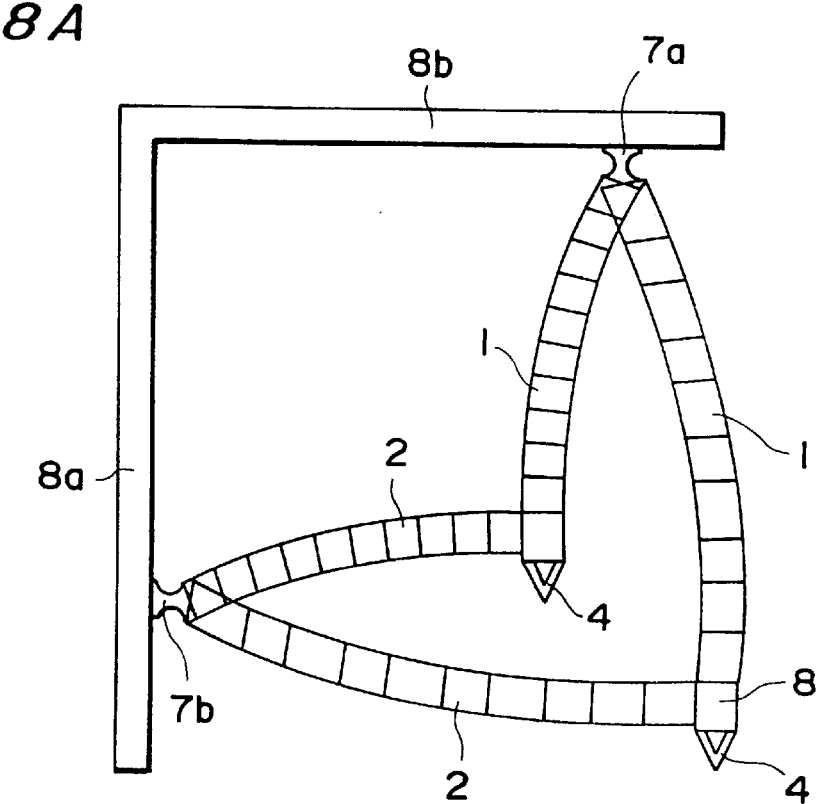
FIG. 8A is a view showing the operation of a scanning mechanism according to a comparative example thereof.
Figure 8B:
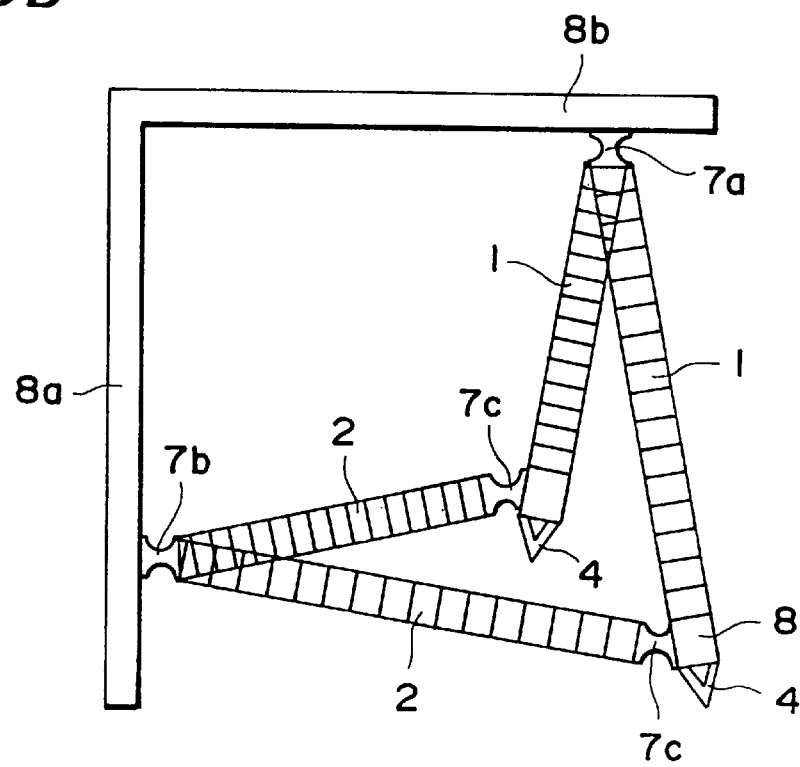
FIG. 8B is a view showing the operation of the scanning mechanism according to the embodiment.

FIGS. 8A and 8B respectively show how the driving devices are driven. FIG. 8A shows a case wherein the tripod type piezoelectric driving device in FIG. 9 is driven. FIG. 8B shows a case wherein the tripod type piezoelectric driving device in FIG. 7 is driven. As is apparent from FIGS. 8A and 8B, in the tripod type piezoelectric driving device of the present invention, the probe can be driven within the X-Y plane without deflecting the X- and Y-direction piezoelectric elements, unlike in the conventional tripod type piezoelectric driving device, thereby preventing a stress from acting on the X- and Y-direction piezoelectric elements. This prevents cracking in each piezoelectric element.

Such a piezoelectric driving device of the present invention is especially effective for a scanning type probe microscope required to scan the probe over a sample surface having fine uneven portions at a high speed.

The device shown in FIG. 7 will be described in more detail below.

FIG. 7 shows the arrangement of the piezoelectric driving device according to an embodiment of the present invention.

The piezoelectric driving device includes two support substrates 8a and 8b which are perpendicular to each other, a first piezoelectric driving member 2 which is displaced in the X-axis direction, a second piezoelectric driving member 1 which is displaced in the Y-axis direction parallel to a sample surface and perpendicular to the X-axis direction, a hinge 7b arranged between the support substrate 8a and the first piezoelectric driving member 2, a hinge 7a arranged between the support substrate 8b and the second piezoelectric driving member 1, a block 8 arranged on the other end (to be referred to as the free end hereinafter) of the second piezoelectric driving member 1 with respect to the end where the hinge 7a is arranged, a hinge 7c arranged between the block 8 and the free end of the first piezoelectric driving member 2, a third piezoelectric driving member 3 which is arranged on the block 8 and displaced in the Z-axis direction with respect to the sample, and a probe 4 arranged on the end of the third piezoelectric driving member 3 which is located on the sample side.

The first piezoelectric driving member 2 in this embodiment is obtained by stacking a plurality of plate-like piezoelectric elements in the X-axis direction in FIG. 7. Each piezoelectric element has electrodes (not shown) on both sides when viewed from the stacking direction of the elements. A voltage is applied from a power supply (not shown) of the piezoelectric driving device to each electrode. Upon application of a voltage from the power supply of the piezoelectric driving device, each piezoelectric element expands/contracts in the stacking direction. The hinge 7b is arranged on the end of the first piezoelectric driving member 2 which is located on the support substrate 8 a side. The first piezoelectric driving member 2 is fixed to the support substrate 8a via the hinge 7b. The hinge 7c is arranged on the end of the first piezoelectric driving member 2 which is located on the opposite side to the support substrate 8a.

The hinges 7a, 7b, and 7c are hinges which can be bent in the X-Y direction in FIG. 7. Each of the hinges 7a, 7b, and 7c is an I-shaped member having a narrow part in the middle which is obtained by performing electrical discharge machining or a cutting process for a parallellepiped metal member. With this shape, the central portion of each of the hinges 7a, 7b, and 7c can be easily bent. Aluminum is used as a metal material for the hinges 7a to 7c. Although aluminum is used in this embodiment, iron, nickel, or the like may be used.

The block 8 is mounted on the opposite side of the hinge 7c to the side on which the first piezoelectric driving member 2 is mounted.

Similarly, the second piezoelectric driving member 1 is obtained by stacking a plurality of piezoelectric elements in a direction parallel to the support substrate 8b. The electrodes of these piezoelectric elements and the state in which voltages are applied to the piezoelectric elements are the same as those of the first piezoelectric driving member 2, and hence a description thereof will be omitted. The second piezoelectric driving member 1 is driven in the Y-axis direction in FIG. 7. The hinge 7a is arranged between the second piezoelectric driving member 1 and an end of the support substrate 8b. The second piezoelectric driving member 1 is fixed to the support substrate 8b via the hinge 7a. The block 8 is directly fixed to the end of the first piezoelectric driving member 2 on the opposite side to the support substrate 8b.

In the above manner, the first piezoelectric driving member 2 and the second piezoelectric driving member 1 are fixed to each other at a right angle via the block 8 and the hinge 7c.

The third piezoelectric driving member 3 is also mounted on the block 8. The third piezoelectric driving member 3 is constituted by a plurality of piezoelectric elements, similar to the first piezoelectric driving member 2. The piezoelectric elements are stacked in the Z-axis direction in FIG. 7, which is perpendicular to both the stacking directions of the first piezoelectric driving member 2 and the second piezoelectric driving member 1. Electrodes are arranged on the respective piezoelectric elements of the third piezoelectric driving member 3, similar to the first piezoelectric driving member 2. When a voltage is applied to each electrode, the third piezoelectric driving member 3 can expand/contract in the Z-axis direction. A cantilever serving as the probe 4 is mounted on the end of the third piezoelectric driving member 3 which is located on the sample 5 side.

The piezoelectric driving device of this embodiment includes a photodetector for detecting the offset amount of the optical path of light which is irradiated from a light source (not shown) onto the distal end of the cantilever and is reflected thereby. By detecting the offset amount of the optical path of this reflected light, the deflection degree of the probe 4 can always be measured when the probe 4 sufficiently approaches the sample 5. A voltage is applied to the third piezoelectric driving member 3 in accordance with this measurement result to always keep the deflection degree of the probe 4 constant. That is, by causing the third piezoelectric driving member 3 to expand/contract, the deflection amount of the probe 4 is always kept constant.

The operation of the piezoelectric driving device of this embodiment will be described next.

In this embodiment, the probe 4 is moved by the piezoelectric driving device as follows. In moving the probe 4 in the X-axis direction, a voltage is applied to the first piezoelectric driving member 2 to cause it to expand/contract. In moving the probe 4 in the Y-axis direction, a voltage is applied to the second piezoelectric driving member 1 to cause it to expand/contract. The probe 4 can be moved in any direction within the X-Y plane by a combination of the values of voltages to be applied to the second piezoelectric driving member 1 and the first piezoelectric driving member 2.

In this embodiment, since the hinge 7c is arranged between the first piezoelectric driving member 2 and the block 8, the first piezoelectric driving member 2 and the second piezoelectric driving member 1 do not deflect regardless of the moving directions of the probe 4 on the X-Y plane. FIG. 8A shows this state. FIG. 8A shows a case wherein the probe is moved by a tripod type piezoelectric driving device without the hinge 7c as a comparative example. Note that FIG. 8B shows the second piezoelectric driving member 1 and the first piezoelectric driving member 2 when viewed from the Z-axis direction in FIG. 7.

The difference in operation between the piezoelectric driving device of this embodiment and the piezoelectric driving device as the comparative example will be described next with reference to FIGS. 8A and 8B.

FIG. 8A shows the operation of the piezoelectric driving device as the comparative example. In this piezoelectric driving device, when the probe 4 is moved by the first and second piezoelectric driving members 2 and 1, the first and second piezoelectric driving members 2 and 1 deflect. This is because the first and second piezoelectric driving members 2 and 1 are fixed to each other via the block 8 at a right angle. Assume that the position of the probe 4 does not correspond to the position where the first and second piezoelectric driving members 2 and 1 are at a right angle. In this case, if the difference in displacement from the mounting angle of the first and second piezoelectric driving members 2 and 1 cannot be canceled by the deformation of the hinges 7b and 7a, the first and second piezoelectric driving members 2 and 1 deflect by the corresponding amount.

FIG. 8B shows the operation of the piezoelectric driving device of this embodiment. Assume that in the piezoelectric driving device of the embodiment, the probe 4 is moved by the first and second piezoelectric driving members 2 and 1. In this case, even if the position of the probe 4 does not correspond to the position where the first and second piezoelectric driving members 2 and 1 are at a right angle, the hinges 7c, 7b, and 7a are deformed to cancel the displacement from the mounting angle of the first and second piezoelectric driving members 2 and 1. Unlike in the comparative example, therefore, the first and second piezoelectric driving members 2 and 1 can move the probe 4 in any direction on the X-Y plane without deflection.

As described above, in the piezoelectric driving device of this embodiment, since the probe 4 can be moved without deflecting the first and second piezoelectric driving members 2 and 1, the chance of developing cracks in each piezoelectric driving member during a driving operation decreases. Since a piezoelectric driving member like the one used in this embodiment or the comparative example is obtained by bonding and stacking piezoelectric crystals on each other in the longitudinal direction with an epoxy-based adhesive, as shown in FIG. 7, cracks tend to be developed between the respective piezoelectric elements upon application of a stress in the lateral direction. In this embodiment, however, since the hinge 7c is deformed, the stress applied to each piezoelectric driving member does not act on the piezoelectric elements. This problem therefore can be solved.

In addition, the piezoelectric driving device of this embodiment can scan the probe at a higher speed than the piezoelectric driving device as the comparative example. According to the piezoelectric driving device as the comparative example, the probe is scanned while the piezoelectric driving members are deflecting. That is, the probe is scanned with the deflecting forces being applied to the piezoelectric driving members. In contrast to this, according to the piezoelectric driving device of the embodiment, since only the force for deflecting the hinge is required, the probe can be easily scanned at a high speed by using a small voltage as compared with the piezoelectric driving device as the comparative example.

As described above, with the piezoelectric driving device of the present invention, a wide scanning range and high durability can be ensured by using currently available piezoelectric driving members, and an easy, high-speed scanning operation can be realized.

Each piezoelectric driving member in the present invention may be formed by stacking piezoelectric elements in a direction perpendicular to the stacking direction of each piezoelectric driving member in this embodiment. For example, an expansion type piezoelectric driving member may be used, which is obtained by stacking piezoelectric elements in a direction perpendicular to the direction in which the piezoelectric elements are stacked in the embodiment.

The first and second piezoelectric driving members 2 and 1 need not always be mounted at a right angle. If, however, the first and second piezoelectric driving members 2 and 1 are mounted at a right angle, position control of the probe 4 is facilitated for the following reason. Assume that the first and second piezoelectric driving members 2 and 1 are not mounted at a right angle. In this case, when the probe 4 is to be moved to an arbitrary position, the mounting angles of the first and second piezoelectric driving members 2 and 1 must be considered as well as the expansion or contraction amount of each piezoelectric driving member. That is, correction of the position of the probe must be performed in consideration of the influences of the expansion (contraction) amount of each piezoelectric driving member on the movement of the probe according to a trigonometric function.

In the present invention, the block 8 may be formed integrally with the hinge 7c. A member obtained by integrating the hinge 7c and the block 8 has a higher mechanical strength than that of a member obtained by joining separate elements to each other as in the embodiment. For this reason, there is no chance of damaging the hinge 7c and the block 8 by applying a stress thereon. The hinges 7b, 7a, and 7c in the present invention may be made of a metal, e.g., iron or nickel, other than aluminum. In addition, each of the hinges 7b, 7a, and 7c may have-a shape other than that shown in FIG. 7 as long as the hinge can be bent in at least two directions. For example, a hinge or coil spring with a precision on the atomic order may be used.

Furthermore, the piezoelectric driving device of the present invention can be used as a probe driving device for a scanning type tunnel microscope and a scanning type proximity field microscope in addition to the scanning type atomic force microscope described in this embodiment.

According to the arrangement of the driving device of the present invention, the probe can be moved without deflecting each piezoelectric driving member, and a stress can be prevented from acting on each piezoelectric driving member in the lateral direction. Since no stress acts on the piezoelectric driving members in the lateral direction, damage to the piezoelectric driving members can be prevented.

The apparatuses shown in FIGS. 10 to 19 will be briefly described next.

Each of these AFMs comprises a sample surface scanning/driving member which can be displaced within a plane parallel to a sample surface, a cantilever which is arranged on one end of the sample surface scanning/driving member and changes in deflection amount in accordance with an interatomic force applied to a tip having a sharp distal end, a light source for irradiating light on the cantilever, a reflecting member arranged on the sample surface scanning/driving member and having a reflecting surface at a position where the distance from the displacing end of the sample surface scanning/driving member is ½ the total length of the displacing portion of the sample surface scanning/driving member, and a light-receiving member, having a plurality of divided light-receiving surfaces for receiving reflected light from the cantilever, which is reflected by the reflecting member. It is preferable that the reflecting member irradiate light from the light source onto the cantilever and irradiate reflected light from the cantilever onto the light-receiving member.

A splitting member for splitting light emitted from the light source from light reflected by the cantilever is preferably arranged between the light source and the reflecting member.

An optical path changing member is preferably arranged on the optical axis of light from the light source. The position of this member is kept unchanged with respect to the optical axis of light from the light source, and the member serves to irradiate the light from the light source onto the reflecting member and also irradiate the light from the light from the light source, which is reflected by the reflecting member, onto the light-receiving member.

It is preferable that the AFM include a Z-direction piezoelectric driving member capable of expanding/contracting in the Z direction perpendicular to the sample surface, and the cantilever be arranged on one end of the Z-direction piezoelectric driving member which is located on the sample surface side.

An irradiation member for irradiating light from the light source, which is reflected by the reflecting member, onto the cantilever, and irradiating light reflected by the cantilever onto the reflecting member is preferably arranged on one end of the sample surface scanning/driving member.

In the present invention, the sample surface scanning/driving member is preferably a piezoelectric driving member obtained by stacking a plurality of piezoelectric elements.

The sample surface scanning/driving member may be constituted by an X-direction piezoelectric driving member having one end fixed to a support member and capable of expanding/contracting in the X direction parallel to the sample surface, and a Y-direction piezoelectric driving member having one end fixed to the support member and capable of expanding/contacting in the Y direction which is parallel to the sample surface and different from the X direction.

An apparatus of the present invention comprises a support member, an X-direction piezoelectric driving member having one end fixed to the support member via a flexible hinge and capable of expanding/contracting in the X direction parallel to the sample surface, a Y-direction piezoelectric driving member having one end fixed to the support member via a flexible hinge and capable of expanding and contracting in the Y direction parallel to the sample surface and different from the X direction, a Z-direction piezoelectric driving member fixed to the other end of the X-direction piezoelectric driving member and capable of expanding/contracting in the Z direction perpendicular to the sample surface, a cantilever which is arranged on one end of the Z-direction piezoelectric driving member which is located on the sample surface side and changes in deflection amount in accordance with an interatomic force applied to a tip having a sharp distal end, a light source for irradiating light on the cantilever, an irradiation member, arranged on the other end of the X-direction piezoelectric driving member, for irradiating light from the light source onto the cantilever, a reflecting member, arranged on the X-direction piezoelectric driving member, for irradiating light from the light source onto the irradiation member, and a light-receiving member, having a plurality of divided light-receiving surfaces, for receiving light reflected by the cantilever, wherein the reflecting surface of the reflecting member is located at a position where the distance from the bending center of the flexible hinge arranged on one end of the X-direction piezoelectric driving member to the reflecting surface of the reflecting member is equal to the distance from the reflecting surface of the reflecting member to the cantilever in the optical path of light reflected by the reflecting member.

The reflecting member preferably reflects light from the light source onto the irradiation member and reflects light from the light source, which is irradiated by the irradiation member, onto the light-receiving member.

A splitting member for splitting light emitted from the light source from light reflected by the cantilever is preferably arranged between the light source and the reflecting member.

An optical path changing member is preferably arranged on the optical path of light from the light source. The optical path changing member is arranged between the light source and the reflecting member such that the position of the optical path changing member is kept unchanged with respect to the optical path of light from the light source, and the member serves to irradiate the light from the light source onto the reflecting member and also irradiate the reflected light from the cantilever, which is reflected by the reflecting member, onto the light-receiving member.

With the above arrangement, the problem in the conventional apparatus is solved.

According to the AFM of the present invention, in detecting an interatomic force by using the optical lever method, a change in the optical path of reflected light is detected in accordance with the deflection amount of the cantilever. Therefore, the following two conditions are required to accurately detect the deflection amount of the cantilever by this method:

① The optical axis of light incident on the cantilever does not change.

② When the deflection amount of the cantilever is constant, the light reception position of the photodetector at which reflected light is received does not change.

In consideration of these two points, the present inventor has invented an optical system in which the light reception position of the photodetector at which reflected light is received does not change with respect to the optical axis of the reflected light when the optical path of light incident on the cantilever does not change even if the probe constituted by the cantilever and the tip is moved by driving the driving member in each direction, and the deflection amount of the cantilever is constant.

In addition, the light source and the light-receiving members are not arranged above the driving members to allow an optical microscope to be arranged near the cantilever.

The reflecting member for irradiating light from the light source onto the cantilever is arranged on each driving member which is displaced in a plane parallel to the sample surface to move the probe in a direction parallel to the sample surface. With this arrangement, the optical path of light from the light source always has a predetermined relationship. In order to maintain this relationship and always allow irradiation of light on the cantilever, the reflecting surface is located at the center of the displacing portion of the driving member (the position where the ratio of the total length of the displacing portion of the driving member to the distance from an end of the driving member to the reflecting member is 2:1). With this arrangement, even if the driving member is displaced, the optical path of light from the light source, which is reflected by the reflecting member, i.e., the optical path of light incident on the cantilever, is always kept constant at the end to which the cantilever is fixed.

Since the deflection amount of the cantilever is not very large, light reflected by the cantilever may be reflected by the reflecting member mounted on the sample surface scanning/driving member to be irradiated on the light-receiving member. With this arrangement, the light source and the light-receiving member can be arranged to be close to each other. Assume that the light source and the light-receiving member cannot be arranged to be close to each other because the optical path of light from the light source is almost parallel to the optical path of light reflected by the cantilever. In this case, a splitting member for splitting light emitted from the light source from light reflected by the cantilever may be arranged between the reflecting member and the light source to solve this problem.

Assume that an optical path changing member having a reflecting surface whose angle is constant with respect to the optical axis of light from the light source is arranged to irradiate the light from the light source onto the reflecting member. In this case, the light source or the light-receiving member need not be arranged at a position where light can be directly irradiated on the reflecting surface of the reflecting member. The light source and the light-receiving member can be arranged at arbitrary positions.

If a Z-direction piezoelectric driving member which can be displaced in a direction perpendicular to the sample surface is arranged on one end of the sample surface scanning/driving member, and the Z-direction piezoelectric driving member is caused to expand/contract, the deflection amount of the cantilever can be controlled.

If light emitted from the light source and reflected by the reflecting member cannot be directly irradiated on the cantilever, an irradiation member for irradiating the light emitted from the light source and reflected by the reflecting member onto the cantilever is preferably arranged on one end of the sample surface scanning/driving member to which the cantilever is fixed. This irradiation member is fixed to one end of the sample surface scanning/driving member. For this reason, even if the irradiation member is displaced upon deflection of the sample surface scanning/driving member, the reflecting surface of the reflecting member is always at the same angle with respect to the optical path of light reflected by the reflecting member. Therefore, light from the light source can always be irradiated on the cantilever.

The reflecting member is fixed on the X-direction piezoelectric driving member such that the reflecting surface is set at the position where the distance from the bending center of the hinge arranged between the X-direction piezoelectric driving member and the support member to the reflecting surface of the reflecting member is equal to the distance from the reflecting surface of the reflecting member to the cantilever via the irradiation member in the optical path of light reflected by the reflecting member and reaching the cantilever (the position where the distance from the bending center of the hinge to the reflecting surface of the reflecting member: the distance from the reflecting surface of the reflecting member to the cantilever via the irradiation member 32 1:1). Assume that the reflecting member is arranged at this position. In this case, even if the piezoelectric driving member fixed to the hinge undergoes an angle change with respect to the support member, the reflecting member undergoes an angle change by the same amount as that of the above angle change. With this angle change, light can always be irradiated on the irradiation member arranged on one end of the X-direction piezoelectric driving member. Even if the cantilever moves, light can always be irradiated on the irradiation member. If a splitting member for splitting light reflected by the cantilever from light emitted from the light source is arranged between the reflecting member and the light source, the optical path of light from the light source and the optical path of light reflected by the cantilever can be completely changed. In such an atomic force microscope, since the deflection amount of the cantilever is very small, the optical path of light from the light source becomes almost parallel to the optical path of light reflected by the cantilever. With the use of the splitting member, therefore, the light source and the light-receiving member can be easily arranged.

In addition, the optical path changing member is arranged between the light source and the reflecting member. The effect of this arrangement is the same as that described above.

The present invention will be described in more detail with reference to the following embodiments. The present invention, however, is not limited to the embodiments.

The apparatuses shown in FIGS. 10 to 19 will be described in more detail below.

Figure 10:
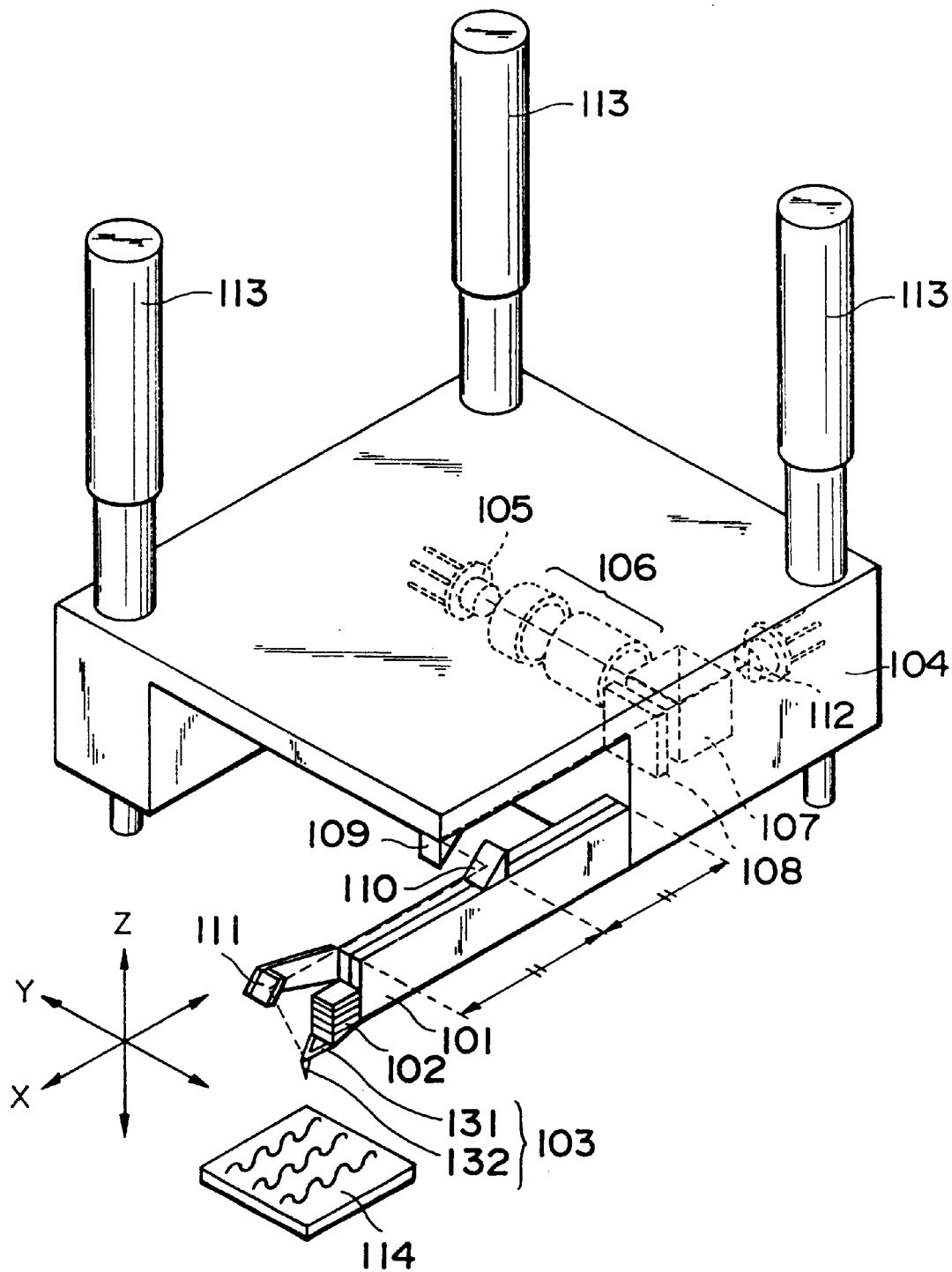
FIG. 10 is a perspective view of an atomic force microscope using bimorph type piezoelectric elements.

FIG. 10 is a perspective view showing the arrangement of an atomic force microscope.

This atomic force microscope uses a bimorph type piezoelectric driving member 101 as a driving member, which is obtained by bonding two piezoelectric elements to each other, and arranging electrodes on two surfaces of each piezoelectric element, i.e., the widest surface and the surface opposite thereto. One end of the bimorph type piezoelectric driving member 101 is fixed to a support substrate 104. When voltages are applied to the respective piezoelectric elements of the bimorph type piezoelectric driving member 101 in the same direction, the respective piezoelectric elements expand/contract in the same direction parallel to the X-axis which is parallel to the surface of sample 114.

When voltages are applied to the respective piezoelectric elements in different directions, one piezoelectric element contracts in a direction parallel to the X-axis, and the other piezoelectric element expands in the direction parallel to the X-axis. As a result, the bimorph type piezoelectric driving member 101 deflects. In this manner, the other end of the bimorph type piezoelectric driving member 101 can be swing in a direction parallel to the Y-axis which is different from the X-axis. By using the bimorph type piezoelectric driving member 101, the probe can be driven within the X-Y plane parallel to the sample surface.

This atomic force microscope further includes a second reflecting member 110 arranged at the middle portion of the bimorph piezoelectric driving member 101.

A Z-direction piezoelectric driving member 102 is arranged on the other end of the bimorph type piezoelectric driving member 101. The Z-direction piezoelectric driving member 102 is designed such that a plurality of piezoelectric elements are stacked in a direction perpendicular to the sample surface. By causing the Z-direction piezoelectric driving member 102 to expand/contract, the Z-direction piezoelectric driving member 102 can be driven in a direction parallel to the Z-axis. In addition, a third reflecting member 111 is arranged on the other end of the bimorph type piezoelectric driving member 101.

A probe 103 having a cantilever 131 and a tip 132 is fixed to the other end of the Z-direction piezoelectric driving member 102 which is located on the sample surface side.

Three mircrometers 113 are arranged on the support substrate 104 to adjust the positions of the sample 114 and the probe 103. In addition, a laser source 105, a collimator lens 106, a polarizing beam splitter 107, a λ/4 plate 108, and a 4-division position sensor photodiode 112 are arranged on the support substrate 104. The laser source 105 is a light source for detecting the deflection amount of the cantilever 131. In the first embodiment, the semiconductor laser is used. The 4-division position sensor photodiode 112 is a photodiode having four light-receiving surfaces obtained by dividing the light-receiving surface in the form of a cross. This photodiode is used to detect the deflection amount of the cantilever 131. The photodiode 112 detects the moving amount of a beam spot on the light-receiving surfaces with a change in the deflection of the cantilever 131 The collimator lens 106 is an optical system which is focused on the cantilever 131.

The laser source 105, the collimator lens 106, the polarizing beam splitter 107, the λ/4 plate 108, and the 4-division position sensor photodiode 112 are fixed on a support substrate 104 so as to allow position adjustment.

This atomic force microscope has a first reflecting member 109 in addition to the second and third reflecting members 110 and 111. The first reflecting member 109 is fixed to the support substrate 104 right above the bimorph type piezoelectric driving member 101 at a position closer to the Z-direction piezoelectric driving member 102 than the middle position of the bimorph type piezoelectric driving member 101 in the longitudinal direction.

These reflecting members are used to cause light from the laser source 105 to be incident on the cantilever 131 and to be reflected thereby to be incident on the 4-division position sensor photodiode 112. More specifically, light from the laser source 105 is reflected by the first reflecting member 109 to be incident on the second reflecting member 110. The light incident on the second reflecting member 110 is reflected to be incident on the third reflecting member 111. The light incident on the third reflecting member 111 is reflected to be incident on the cantilever 131. The light reflected by the cantilever 131 is incident on the 4-division position sensor photodiode 112 via the reverse route.

Measurement of the deflection amount of the cantilever 131 of the atomic force microscope shown in FIG. 10 will be described next.

Since light from the laser source 105 is polarized light, the plane of polarization is adjusted in advance such that the light is reflected by the polarizing beam splitter 107. In this manner, the light from the laser source 105 is reflected by the polarizing beam splitter 107. The reflected light is circularly polarized by the λ/4 plate 108. The circularly polarized light is reflected by the second and third reflecting members 110 and 111 to be incident on the cantilever 131. The light incident on the cantilever 131 is reflected with its optical path changing in accordance with the deflection amount of the cantilever 131. The light reflected by the cantilever 131 is incident on the λ/4 plate 108 via the third reflecting member 111, the second reflecting member 110, and the first reflecting member 109. At this time, the reflected light from the cantilever 131 has a plane of polarization which is perpendicular to the incident light from the laser source 105. The light is then transmitted through the polarizing beam splitter 107 and is incident on the 4-division position sensor photodiode 112 to form a beam spot. At this time, the position of the beam spot is obtained as current data respectively obtained from the light-receiving surfaces of the 4-division position sensor photodiode 112, thereby calculating the deflection amount of the cantilever 131.

Figure 13:
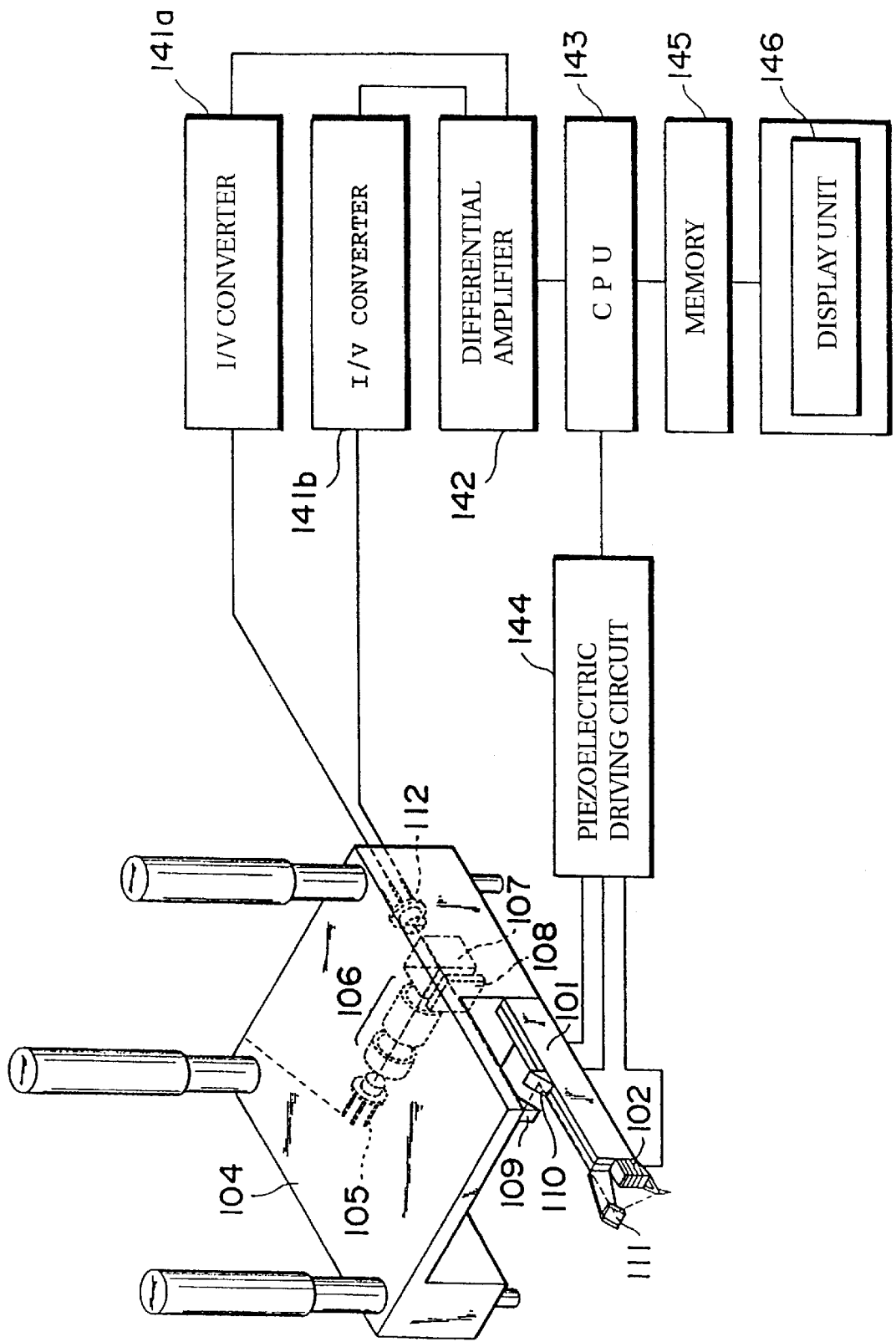
FIG. 13 is a view showing a detection system for the microscope in FIG. 10.

Calculation of the deflection amount of the cantilever 131 will be described with reference to FIG. 13. When the deflection amount of the cantilever 131 changes, the optical axis of a laser beam reflected by the cantilever 131 changes. This change in the optical axis of the reflected light appears as a change in the position of the beam spot on the 4-division position sensor photodiode 112. This change in the position of the beam spot is detected on the basis of the differences between currents obtained from the light-receiving surfaces of the 4-division position sensor photodiode 112. The currents respectively obtained from the four light-receiving surfaces are converted into voltages corresponding to the currents by I/V converters 141a and 141b. The voltages obtained by the I/V converters 141a and 141b are input to a differential amplifier 142. The differences between the respective voltages are calculated and input to a CPU 143. The CPU 143 calculates a change in the deflection amount of the cantilever 131 from the respective voltage differences. The CPU 143 then outputs a signal for displacing the Z-direction piezoelectric driving member 102 to a piezoelectric driving circuit 144 to displace the Z-direction piezoelectric driving member 102 to make the deflection amount of the cantilever 131 constant. The expansion/contraction amount of each piezoelectric driving member is input from the piezoelectric driving circuit 144 to the CPU 143. The CPU 143 calculates the sizes of uneven portions of the sample surface at the respective positions from the expansion/contraction amounts of the piezoelectric driving members, and outputs the resultant data to a memory 145.

The position data and the information of the uneven portions at the respective positions are output altogether from the memory 145 to a display unit 146. The display unit 146 three-dimensionally displays an image of the sample surface.

The function of each reflecting member in driving the bimorph type piezoelectric driving member 101 will be described below.

A case wherein the bimorph type piezoelectric driving member 101 is deflected to be driven so as to move the probe 103 will be described. FIGS. 11A and 11B show a sate wherein the bimorph type piezoelectric driving member 101 is operated. FIG. 11A shows a state wherein the bimorph type piezoelectric driving member 101 is deflected. FIG. 11B shows the relationship between the second reflecting member 110, the optical path of light incident on the second reflecting member 110, and the optical path of light reflected by the second reflecting member 110, provided that the radius of curvature of the deflected bimorph type piezoelectric driving member 101 is represented by $R_1$, and the center of the radius of curvature $R_1$ is represented by $O_1$. Referring to FIGS. 11A and 11B, the position of the second reflecting member 110 is represented by $M_1$; the distance from the fixing end of the bimorph type piezoelectric driving member 101 which is fixed to the support substrate 104 to the second reflecting member 110, $d_1$; and the other end of the bimorph type piezoelectric driving member 101, $B_1$.

Letting $2\theta_1$ be an angle $A_1O_1B_1$ when the bimorph type piezoelectric driving member 101 has the radius of curvature $R_1$, a change in angle of the reflecting surface of the second reflecting member 110 is equal to the angle defined by a line segment $M_1O_1$ and a line segment $A_1O_1$ in FIG. 11B. The second reflecting member 110, therefore, is inclined at an angle $\theta_1$. When the second reflecting member 110 is inclined at the angle $\theta_1$, the angle defined by the optical axis of the light incident on the second reflecting member 110 and the optical axis of the reflected light becomes the angle $2\theta_1$. As a result, the optical path of the reflected light coincides with the tangent line on the other end of the bimorph type piezoelectric driving member 101 having the radius of curvature $R_1$.

That is, the optical axis of light reflected by the second reflecting member 110 is parallel to the tangent line on the other end of the bimorph type piezoelectric driving member 101 regardless of deflection amounts of the bimorph type piezoelectric driving member 101. Therefore, light reflected by the second reflecting member 110 can be incident on the same portion of the third reflecting member 111 arranged on the extended line of the bimorph type piezoelectric driving member 101 regardless of deflection amounts of the bimorph type piezoelectric driving member 101.

When the bimorph type piezoelectric driving member 101 is driven in the longitudinal direction (parallel to the X-axis), since the optical path of reflected light from the second reflecting member 110 is parallel to the axis of the bimorph type piezoelectric driving member 101, the light reflected by the second reflecting member 110 is always irradiated on the third reflecting member 111 fixed to the bimorph type piezoelectric driving member 101.

With only the second and third reflecting members 110 and 111, light from the laser source 105 fixed on the support substrate 104 cannot be irradiated on the cantilever 131. For this reason, in the first embodiment, the first reflecting member 109 is arranged right above the bimorph type piezoelectric driving member 101. In the first embodiment, the first reflecting member 109 is used to cause light to be incident on the second reflecting member 110 while making the light almost parallel to the X-axis. This operation will be described next.

Figure 12A:
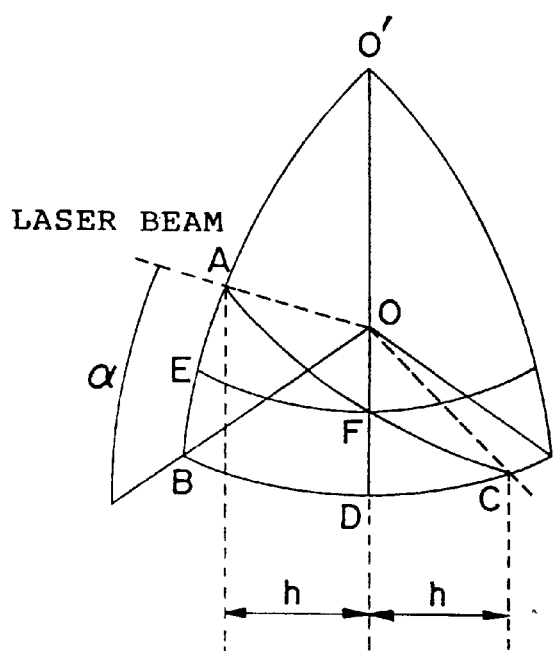
FIGS. 12A to 12C are views each showing the path of light reflected by a reflecting member.
Figure 12C:
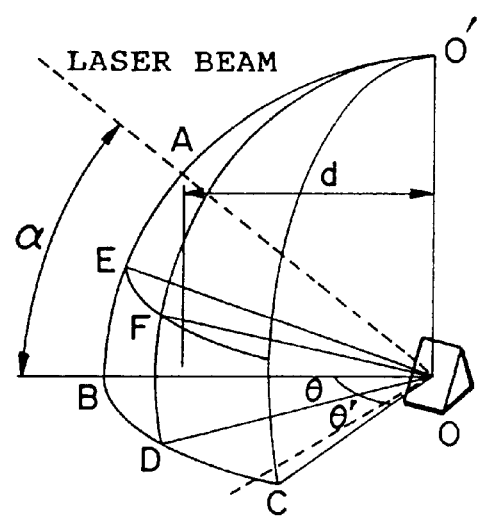
Figure 12B:
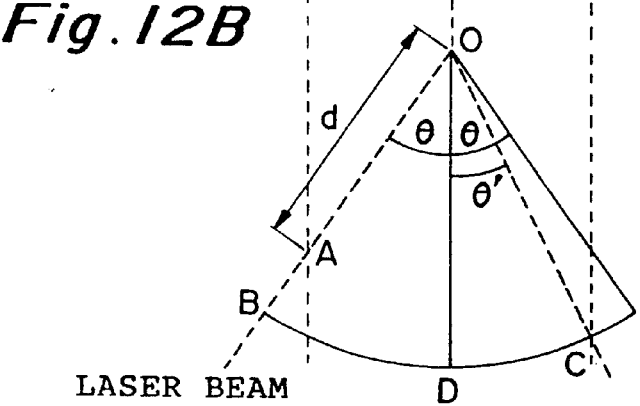

FIGS. 12A to 12C show a state wherein the second reflecting member 110 undergoes an angle change of θ on the X-Y plane when the bimorph type piezoelectric driving member 101 deflects. FIG. 12A shows the state when viewed from above the normal of the reflecting surface of the second reflecting member 110. FIG. 12B shows the state when viewed from a normal of the X-Y plane. FIG. 12C is a perspective view of the state. Referring to FIGS. 12A to 12C, reference symbol O denotes the light reception position of the second reflecting member 110; O', a point on a normal with respect to the X-Y plane, i.e., a normal extending from the position O; BO, the projection of the optical path of light incident on the X-Y plane; DO, the projection of a normal extending from the reflecting surface of the second reflecting member 110 on the X-Y plane; OC, the optical path of light reflected by the second reflecting member 110, and AO, the optical path of light incident on the second reflecting member 110. A surface EFO is perpendicular to the reflecting surface of the second reflecting member 110. The point O' and points A, B, C, D, E, and F are at the same distance from the position O. For the sake of descriptive convenience, the distance from each point to the position O is assumed to be 1.

When the second reflecting member 110 undergoes an angle change of θ upon driving of the bimorph type piezoelectric driving member 101, a normal EO of the reflecting surface of the second reflecting member 110 changes to a normal FO. With this change, the optical path of the light reflected by the second reflecting member 110 changes in direction from a direction BO to a direction OC. Letting θ' be the angle defined by the OC and the DO, the angle θ' is smaller than the angle θ. The reason will be described with reference to FIG. 12A. The angle defined by the optical path AO of the incident light and the normal FO of the reflecting surface of the second reflecting member 110 is equal to the angle defined by the optical path OC of the reflected light and the normal FO. When the optical path AO of the incident light and the optical path OC of the reflected light are projected on the X-Y plane, the respective angles with respect to the normal DO differ from each other. As a result, the angle θ' becomes smaller than the angle θ.

The angle θ' will be represented by the angle θ.

Letting α be the angle defined by the X-Y plane and the optical path of light reflected by the first reflecting member 109 and incident on the second reflecting member 110, A be the intersection between the optical path of the incident light and an arc O'B, and d be the distance from the intersection A to an axis OO', the distance d can be given by $$d = \cos \alpha \tag{1-1}$$

Letting h be the distance from the line segment DO to the intersection A and from the line segment DO to the point C when the intersection A is mapped on the X-Y plane, the distance h can be given by $$h = \sin \theta = d \times \sin \theta \tag{1-2}$$

A substitution of equation (1-1) into equation (1-2) yields equation (1-3):

$$\sin \theta' = \cos \alpha \times \sin \theta \tag{1-3}$$

The angle change at the middle point of the bimorph type piezoelectric driving member 101 is very small. Therefore, with substitutions of sin θ=θ and sin θ'=θ', $$\theta' = \theta \times \cos \alpha \quad (1\text{-}4)$$

The distance from the first reflecting member 109 to the sample surface, and the distance from the second reflecting member 110 to the sample surface can be decreased by bringing the optical path of light incident on the first reflecting member 109 closer to the second reflecting member 110. Therefore, α can be set to be about 10°. With a substitution of α of 10°, the angle θ can be given by $$\theta' = 0.98\theta \quad (1\text{-}5)$$

As is apparent from equation (1-5), the angle defined by the optical path of light incident on the second reflecting member 110 and the optical path of light reflected thereby when they are mapped on the X-Y plane is 1.98θ, which is approximate to 2θ.

Assume that when light reflected by the first reflecting member 109 is irradiated on the second reflecting member 110, and light reflected by the second reflecting member 110 is irradiated on the third reflecting member 111, the bimorph type piezoelectric driving member 101 deflects to be displaced. In this case, a slight offset from the optical axis occurs. However, since this offset is a very small error, the deflection amount of the cantilever can be detected without being influenced by the offset.

The influences of the offset can be reduced as follows. The magnitude of offset from the optical axis is determined in proportion to the deflection amount of the bimorph type piezoelectric driving member 101. For this reason, a signal associated with the deflection amount of the bimorph type piezoelectric driving member 101 is input from the piezoelectric driving circuit 144 to the CPU 143. The CPU 143 then corrects data associated with the deflection amount of the cantilever on the basis of the signal.

Figure 14:
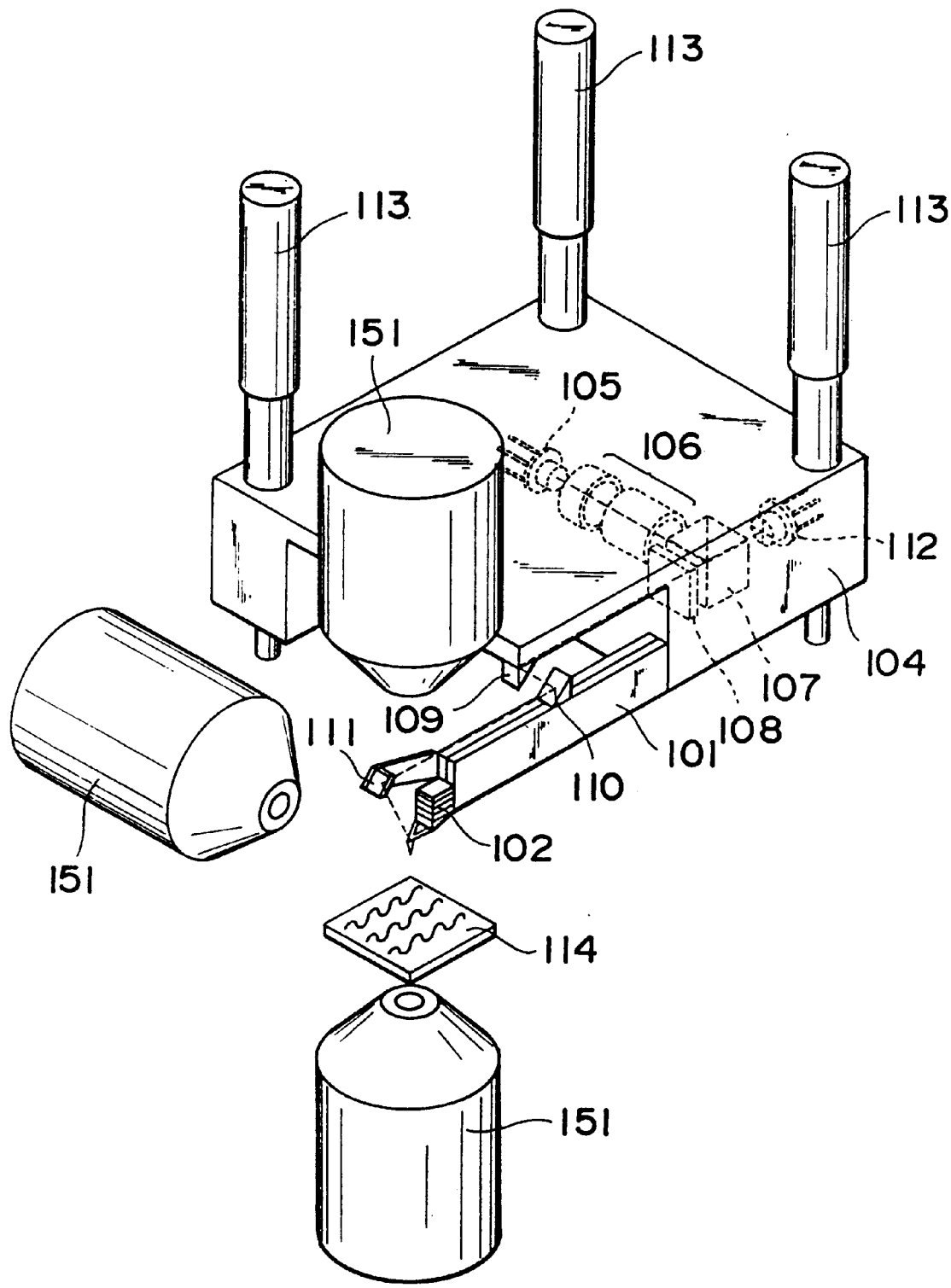
FIG. 14 is a perspective view of an atomic force microscope using objective lenses.

In the atomic force microscope of the first embodiment of the present invention described above, since only the third reflecting member 111 is arranged near the probe 103, an objective lens 151 of an optical microscope can be arranged, as shown in FIG. 14. With this arrangement, while the sample surface is observed with the atomic force microscope of the first embodiment in a narrow range, the sample surface can be observed with the optical microscope in a wide range, this allows the user to quickly move the probe 103 of the atomic force microscope to a predetermined position while watching an object to be observed with the atomic force microscope.

Figure 15:
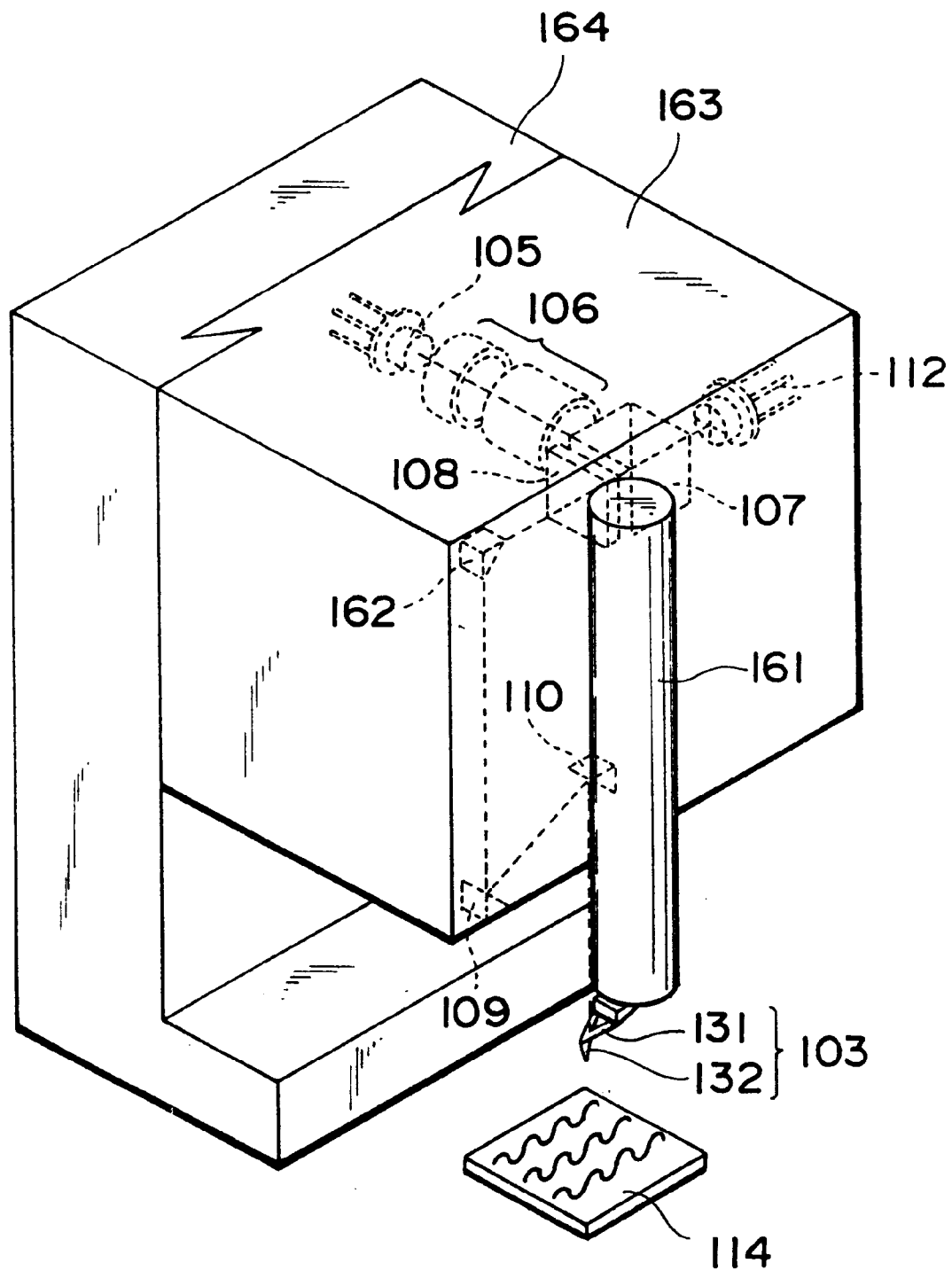
FIG. 15 is a perspective view of an atomic force microscope using a tube type piezoelectric element.

FIG. 15 shows another embodiment. In this atomic force microscope, a tube type piezoelectric driving member 161 is used in place of the bimorph type piezoelectric driving member 101 and the Z-direction piezoelectric driving member 102 in FIG. 10. In addition, support substrates 163 and 164 are used in place of the support substrate 104. A laser source 105, a collimator lens 106, a polarizing beam splitter 107, and a λ/4 plate 108, which are identical to those in the first embodiment, are arranged on the support substrate 163. In addition, the tube type piezoelectric driving member 161 is fixed to the support substrate 163. The support substrate 163 includes a third reflecting member 162 for irradiating light from the laser source 105 onto a first reflecting member 109. The third reflecting member 162 serves to only irradiate light from the laser source 105 onto the first reflecting member 109. The fourth reflecting member 162, therefore, need not be used if light from the laser source 105 is directly irradiated on the first reflecting member 109.

The support substrates 163 and 164 are detachable. The same reference numerals in this embodiment denote the same parts as in the first embodiment, and hence a description thereof will be omitted.

The tube type piezoelectric driving member 161 is designed such that an electrode is formed on the entire inner surface of a cylindrical piezoelectric element, and a plurality of electrodes are formed on the outer surface of the piezoelectric element. Voltages are applied to the electrode on the inner surface and the elements on the outer surface. More specifically, by applying arbitrary voltages to the respective electrodes on the inner surface, the probe 103 can be moved to arbitrary positions. When the probe 103 is to be moved in a direction parallel to the sample surface, the tube type piezoelectric driving member 161 is deflected to move the probe 103 as in the case of the bimorph type piezoelectric driving member 101. By the same method described with reference to FIG. 10, therefore, light from the laser source 105 can be irradiated on a cantilever 131.

In this AFM, light from the laser source 105 passes through the polarizing beam splitter 107 and the λ/4 plate 108 to be reflected by the third reflecting member 162. The light is then incident on the first reflecting member 109. The light reflected by the first reflecting member 109 is irradiated on the second reflecting member 110 having a reflecting surface whose angle changes as the tube type piezoelectric driving member 161 is driven. The light is then reflected by the second reflecting member 110 to be irradiated on the cantilever 131. The light reflected by the cantilever 131 reaches the second reflecting member 110 to be reflected to the first reflecting member 109. The light is transmitted through the polarizing beam splitter 107 via the first reflecting member 109, the third reflecting member 162, and the λ/4 plate 108 to reach a 4-division position sensor photodiode 112. At this time, if the deflection amount of the cantilever 131 has changed, the position of the beam spot on the 4-division position sensor photodiode 112 changes. In this case, the deflection amount of the cantilever 131 can be detected by detecting currents from the respective light-receiving surfaces of the 4-division position sensor photodiode 112. As described above, with the use of a single piezoelectric driving member like the tube type piezoelectric driving member 161 which can be three-dimensionally driven, light from the light source can be irradiated on the cantilever 131 and the reflected light can be guided to the 4-division position sensor photodiode 112 without using the third reflecting member.

An atomic force microscope of still another embodiment will be described next.

Figure 16:
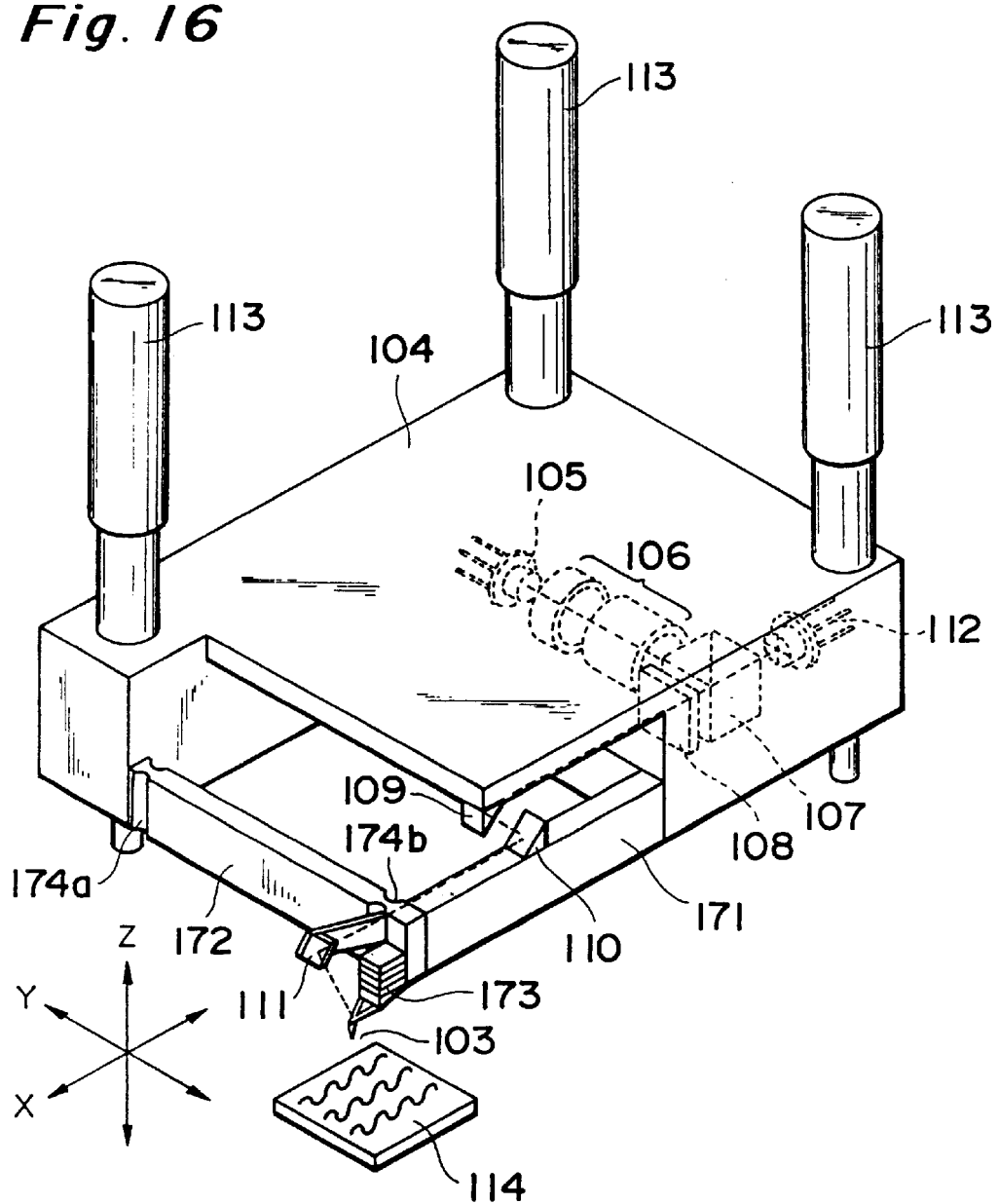
FIG. 16 is a perspective view of an atomic force microscope according to another embodiment of the present invention.

FIG. 16 is a perspective view of this atomic force microscope.

In this AFM, in place of the bimorph type piezoelectric driving member 101 in FIG. 10, an X-direction piezoelectric driving member 171 having one end fixed to a support substrate 104 and capable of expanding/contracting in the X direction within a plane parallel to a sample surface is arranged, together with a Y-direction piezoelectric driving member 172 having hinges 174a and 174b arranged on its both sides and capable of expanding/contracting in a direction perpendicular to the X direction and parallel to the sample surface. The hinge 174b has an inflexible block portion. The other end of the X-direction piezoelectric driving member 171 is fixed to the block portion of the hinge 174b. When the Y-direction piezoelectric driving member 172 expands/contracts in the Y direction, the X-direction piezoelectric driving member 171 is deflected. When the X-direction piezoelectric driving member 171 expands/contracts, the hinges 174a and 174b are bent so as not to bend the Y-direction piezoelectric driving member 172.

A Z-direction piezoelectric driving member 173 capable of expanding/contracting in a direction perpendicular to the sample surface is arranged on the block portion of the hinge 174b. A probe 103 is arranged on one end of the Z-direction piezoelectric driving member 173 which is located on the sample surface side.

The probe 103 can be moved to an arbitrary position by using the X-direction piezoelectric driving member 171, the Y-direction piezoelectric driving member 172, and the Z-direction piezoelectric driving member 173.

A second reflecting member 110 is arranged at the middle position of the X-direction piezoelectric driving member 171 in the longitudinal direction. A third reflecting member 111 is arranged on the block portion of the hinge 174b. A first reflecting member 109 is mounted on the same portion as that in the first embodiment.

The route along which light from a laser source 105 is incident on a cantilever 131 and the route along which light reflected by the cantilever 131 is incident on a 4-division position sensor photodiode 112 are the same as those in the first embodiment, and hence a description thereof will be omitted. Since the same reference numerals in this embodiment denote the same parts as in the first embodiment, a description thereof will be omitted.

Figure 17:
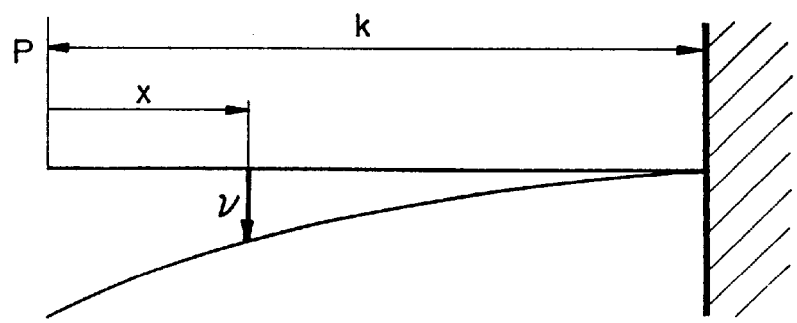
FIG. 17 is a view showing the principle of strain amount detection.

The X-direction piezoelectric driving member 171 deflects in the same manner as a cantilever having a free end on which a load concentrates. Referring to FIG. 17, letting k be the length of the cantilever, P be the concentrated load on the free end, x be the distance from the free end, and v be the inclination of the cantilever, the inclination v can be given by:

$$v = \frac{Px^2}{2EI} - \frac{Pl2}{2EI} \qquad (1\text{-}6)$$

where E is the Young's modulus, and I is the geometrical moment of inertia.

In order to compare the inclination of the free end of the cantilever with that of the middle portion of the cantilever, x=0 and x=½ are substituted into equation (1-6) to calculate the ratios. In this case, the inclination of the free end of the cantilever: the inclination of the middle portion of the cantilever=4:3. As is apparent from this comparison, the second reflecting member 110 arranged on the middle portion of the X-direction piezoelectric driving member 171 undergoes an angle change larger than that the second reflecting member 110 in the first embodiment undergoes. According to equation (1-4), therefore, the angle θ' at which light is reflected by the second reflecting member 110 can be decreased by adjusting the angle α defined by the optical path of light incident on the second reflecting member 110 and the X-Y plane. Similar to the AFMs in FIGS. 10 and 15, in the AFM in FIG. 16, the angle of light reflected by the second reflecting member 110 must be ½ the angle at which the free end is deflected. For this purpose, the angle θ' of the light reflected by the second reflecting member 110 may be set to be (⅔)θ. According to equation (1-3), therefore, α=48.2° may be set. In this manner, the position and angle of the first reflecting member are adjusted to set the angle of light incident on the second reflecting member to 48.2°. With this operation, light can always be irradiated on the cantilever even while the probe is scanned.

Figure 18:
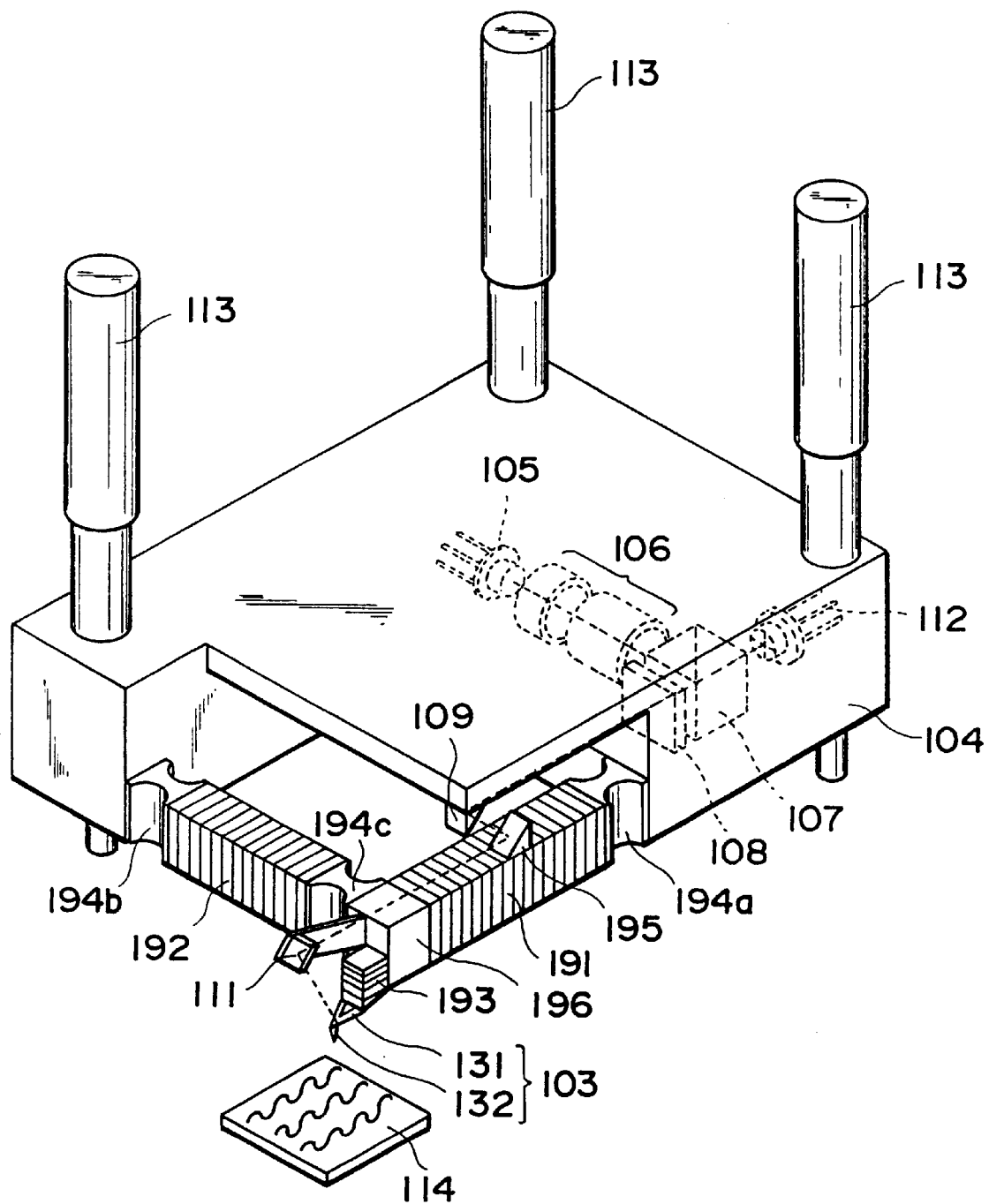
FIG. 18 is a perspective view of an atomic force microscope.

FIG. 18 is a perspective view of an atomic force microscope according to still another embodiment.

The same reference numerals in FIG. 18 denote the same parts as in FIG. 10, and hence a description thereof will be omitted.

In the AFM in FIG. 18, in place of the bimorph type piezoelectric driving member 101 in FIG. 10, an X-direction piezoelectric driving member 191 having a plurality of piezoelectric elements stacked in the X direction and capable of expanding/contracting in only the X direction is used, together with a Y-direction piezoelectric driving member 192 having a plurality of piezoelectric elements stacked in the Y direction and capable of expanding/contracting in only the Y direction. One end of the X-direction piezoelectric driving member 191 is fixed to a support substrate 104 via a hinge 194a. A block 196 is fixed to the other end of the X-direction piezoelectric driving member 191. One end of the Y-direction piezoelectric driving member 192 is fixed to the support substrate 104 via a hinge 194b. The other end of the Y-direction piezoelectric driving member 192 is fixed to the block 196 via a hinge 194c. In this manner, the X-direction piezoelectric driving member 191 and the Y-direction piezoelectric driving member 192 are mounted at a right angle via the hinges 194c and the block 196.

The hinges 194a, 194b, and 194c are members which can be bent within the X-Y plane including the X and Y directions. When the X- or Y-direction piezoelectric driving member 191 or 192 is driven to be displaced, these hinges 194a to 194c are bent. For this reason, in the AFM in FIG. 18, even if the X- and Y-direction piezoelectric driving members 191 and 192 are displaced, they will not deflect. With this arrangement, since no stress is exerted on the X- and Y-direction piezoelectric driving members 191 and 192, each piezoelectric driving member is free from the problem of cracking and the like.

A third reflecting member 111 having a reflecting surface supported by a support member is fixed to the block 196. A Z-direction piezoelectric driving member 193 capable of expanding/contacting in a direction perpendicular to the sample surface is mounted on the block 196. A probe 103 is arranged on one end of the Z-direction piezoelectric driving member 193 which is located on the sample surface side.

The X-direction piezoelectric driving member 191 includes a second reflecting member 195 for reflecting light emitted from a laser source 105 and reflected by a first reflecting member 109 to cause the light to be incident on the third reflecting member 111. The second reflecting member 195 is fixed to have a reflecting surface at a position where the distance from the bending center of the hinge 194a to the second reflecting member 195 is equal to the distance from the second reflecting member 195 to a cantilever 131 via the third reflecting member 111. At this position, the reflecting surface reflects light from the laser source 105.

Since a method of detecting the deflection amount of the cantilever in FIG. 18 is the same as that in the embodiment shown in FIG. 10, a description thereof will be omitted.

When the Y-direction piezoelectric driving member 192 is driven, light emitted from the laser source 105 is irradiated on the cantilever 131. This operation will be described next.

FIGS. 19A and 19B show the angle at which the X-direction piezoelectric driving member 191 is inclined about the hinge 194a when the Y-direction piezoelectric driving member 192 is driven and displaced.

While the Y-direction piezoelectric driving member 192 is not driven, the optical path of light incident on the second reflecting member 195 coincides with the optical path of light reflected thereby. When the Y-direction piezoelectric driving member 192 is driven, the optical path of light incident on the second reflecting member 195 differs from the optical path of light reflected thereby. FIG. 19A shows this state. Referring to FIG. 19B, the axis of the inclined X-direction piezoelectric driving member 191 is represented by $O_2B_2$. Reference symbol $O_2$ denotes the bending center of the hinge 194a; $A_2$, the position where the second reflecting member 195 receives light from the laser source 105 when the Y-direction piezoelectric driving member 192 is driven; $B_2$, the position corresponding to a straight line representing the sum of the distance from the second reflecting member 195 to the third reflecting member 111 and the distance from the third reflecting member 111 to the cantilever 131 when the Y-direction piezoelectric driving member 192 is driven; $C_2$, the position where the second reflecting member 195 receives light from the laser source 105 while the Y-direction piezoelectric driving member 192 is not displaced; and $L_2$, the distance from the bending center $O_2$ of the hinge 194a to the position $C_2$.

Assume that the X-direction piezoelectric driving member 191 is inclined about the center $O_2$ at an angle $\theta_2$ when the Y-direction piezoelectric driving member 192 is driven. In this case, the reflecting surface of the second reflecting member 195 has the same inclination as that of a line segment $A_2C_2$ with respect to the optical path of incident light. The second reflecting member 195 is also inclined at the angle $\theta_2$. At this time, the angle defined by the optical path of the light incident on the second reflecting member 195 and that of the light reflected thereby is represented by $2\theta_2$. Therefore, the light reflected by the second reflecting member 195 reaches the position $B_2$. This will be proved as follows.

Consider triangles $O_2A_2C_2$ and $B_2A_2C_2$.

① Angles $O_2C_2A_2$ and $B_2C_2A_2$ are equal to each other and right angles.

② The distance between the points $O_2$ and $C_2$ is equal to the distance between the points $C_2$ and $B_2$.

③ The triangles $O_2A_2C_2$ and $B_2A_2C_2$ share a line segment $A_2C_2$.

From ①, ②, and ③, the triangle $O_2A_2C_2$ is congruent with the triangle $B_2A_2C_2$. The triangles $O_2A_2C_2$ and $B_2A_2C_2$ are symmetrical about the line segment $A_2C_2$. If a laser beam is not reflected by a reflecting surface $A_2C_2$ of the second reflecting member 195, the laser beam reaches the point $O_2$. If the laser beam which has reached the point $O_2$ is reflected by the reflecting surface $A_2C_2$, the reflected light reaches the point $B_2$ which is symmetrical to the point $O_2$ about the line segment $A_2C_2$. Therefore, the light reflected by the second reflecting member 195 can be irradiated on the third reflecting member 111 regardless of displacement amounts of the Y-direction piezoelectric driving member 192.

Assume that the X-direction piezoelectric driving member 191 is driven. In this case, since the driving amount is sufficiently smaller than that of the Y-direction piezoelectric driving member 192, the second reflecting member 195 is always located almost in the middle of the distance from the bending center of the hinge 194a to the cantilever 131. For this reason, light from the laser source 105 can be irradiated on the cantilever 131.

Figure 19:
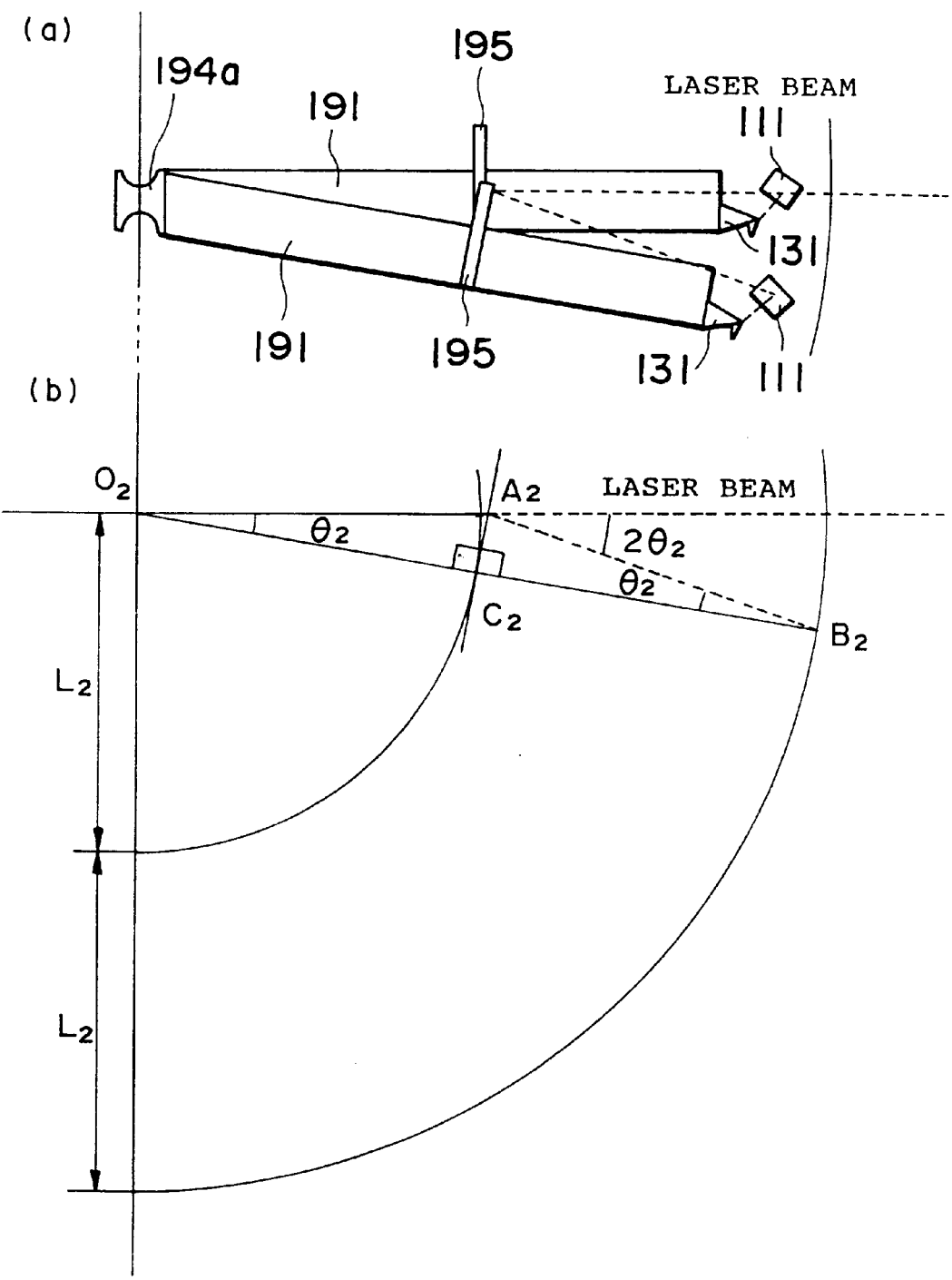
FIG. 19 is a view for explaining the path of a reflected beam.

Similar to the AFM in FIG. 10, in the AFM in FIG. 18, when light from the laser source 105 is to be reflected by the first reflecting member 109 toward the second reflecting member 195, the light is not necessarily incident in a direction parallel to the expanding/contracting direction of the X-direction piezoelectric driving member 191, as shown in FIG. 19. However, as described above in the first embodiment with reference to FIG. 3, no problem is posed because the light is incident within almost an allowable error range with respect to the axis of the X-direction piezoelectric driving member 191. If, however, this error poses a problem, the error can be corrected by the same method as that in the apparatus in FIG. 10.

In the above embodiment, if the reflecting surface of the third reflecting member 111 is arranged such that the optical path of light reflected by the third reflecting member 111 is perpendicular to the reflecting surface of the cantilever 131, a change in the reflected light on the 4-division position sensor photodiode 112, which is caused upon deflection of the cantilever 131, increases. As a result, a high measurement detection sensitivity can be set.

In each of the atomic force microscopes of the first, third, and fourth embodiments described above, only two reflecting members are used as members supported by the piezoelectric driving members and serving to detect an interatomic force. For this reason, the mass to be scanned can be relatively reduced, and the probe 103 can be scanned in either the X direction or the Y direction at a high speed. In addition, since the mass to be scanned can be reduced, the resonance frequency can be increased. Since the resonance frequency can be increased in this manner, the influence on vibrations can be reduced, and the resolution can be increased even if the probe 103 is scanned.

Light incident on the cantilever 131 and light reflected thereby take the same route. By inserting the $\lambda/4$ plate 108 and the polarizing beam splitter 107 between the first reflecting member 109 and the laser source 105, the laser source 105 and the 4-division position sensor photodiode 112 can be arranged to be close to each other. Therefore, the atomic force microscope in each embodiment described above can be more compact than the conventional microscope.

In each of the atomic force microscopes shown in FIGS. 10 to 19B, since the laser source and the 4-division position sensor photodiode are not arranged on the probe 103, the objective lenses of the optical microscope can be arranged right above, right below, and on one side of the probe. In the embodiments described above, since the laser source and the 4-division position sensor photodiode need not be arranged above the probe, a low-profile microscope can be realized. When, therefore, this atomic force microscope is to be mounted in an optical microscope, not a change in the design of the optical microscope nor remodeling is required, and simultaneous observation is allowed with the optical microscope and the atomic force microscope with the maximum function of the existing optical microscope. Since observation in a narrow range is performed with the atomic force microscope, and observation in a wide range is performed with the optical microscope, the utilization of the microscope greatly improves.

In each of the embodiments described above, as the first and second reflecting mirrors in this embodiment, either mirrors or prisms may be used as long as the optical path of a laser beam can be changed.

If reflected light from the cantilever is sufficiently strong, a half mirror may be used in place of the $\lambda/4$ plate and the polarizing beam splitter.

In each of the AFMs, the reflecting member is arranged on the sample surface scanning/driving member capable of being displaced within a plane parallel to a sample surface at the position where the distance from the reflecting member to the displacing end of the sample surface scanning/driving member is ½ the total length of the displacing portion of the sample surface scanning/driving member. With this arrangement, the displacement amount of the cantilever can be detected without arranging the light source and the light-receiving member right above or right below the cantilever. In addition, a very compact atomic force microscope can be obtained.

Furthermore, since the route along which light from the light source is incident on the cantilever is the same as the route along which light reflected by the cantilever is incident on the light-receiving member, the light-receiving member and the light source can be arranged to be relatively close to each other. For this reason, the space required for this atomic force microscope can be reduced. In addition, the length of the optical path from the cantilever to the light-receiving member is long in consideration of the required space as compared with the conventional atomic force microscope. The change amount of the position of a beam spot on the light-receiving member increases in proportion to the length of the optical path. Consequently, the detection sensitivity with respect to the deflection amount of the cantilever is greatly improved.

A moving amount detection mechanism for the scanning device shown in FIG. 1A will be described next.

The apparatuses shown in FIGS. 20 to 25 will be briefly described first.

A driving device for three-dimensionally moving the probe in a scanning type probe microscope is designed to measure the uneven shape of a sample surface while keeping the distance from the sample surface to the probe constant. For this purpose, the driving device requires an X-Y plane scanning/driving device for scanning a sample surface parallel, and a Z-direction driving device for keeping the distance from the sample surface to the probe constant in a scanning operation.

Figure 26:
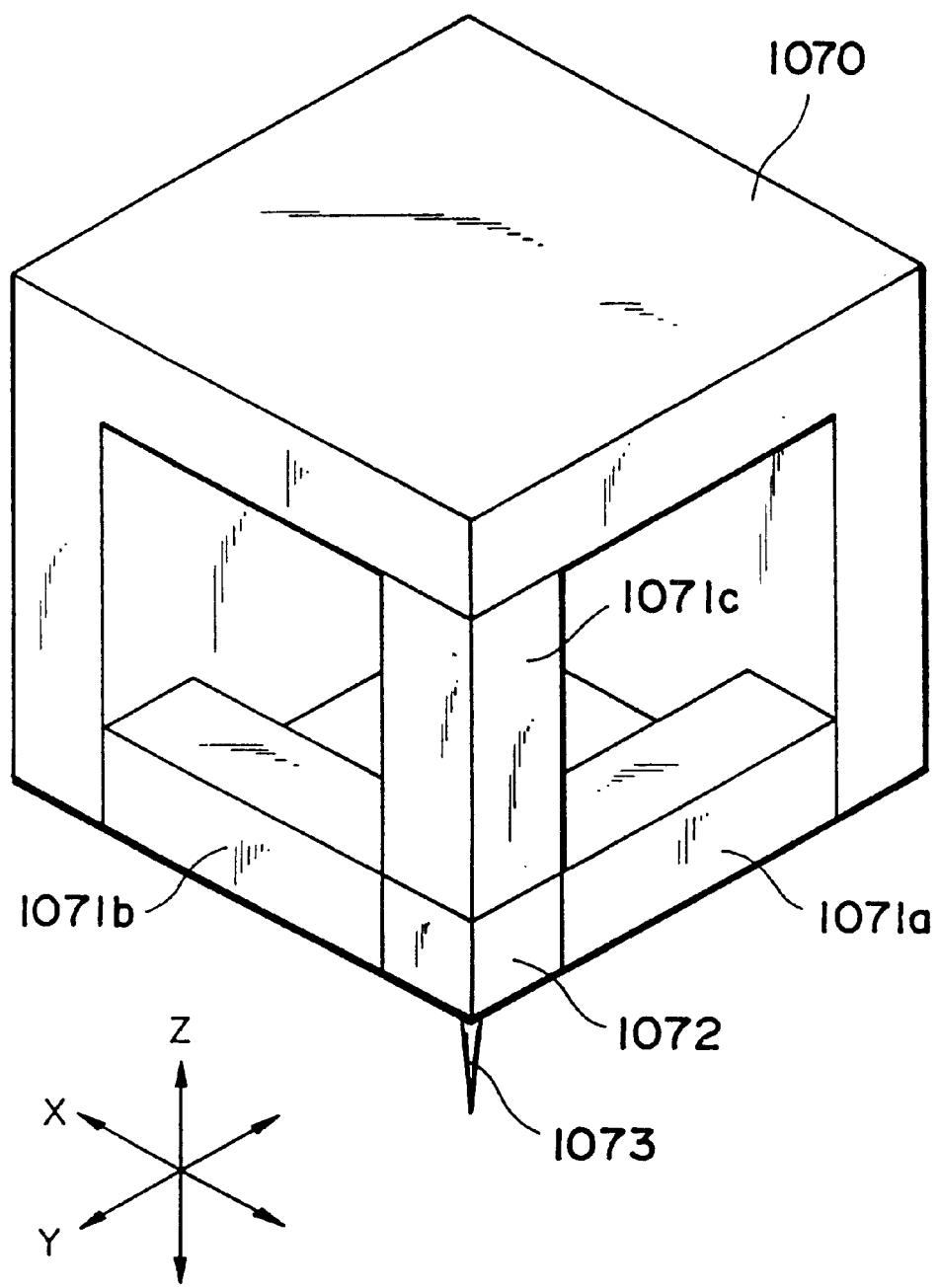
FIG. 26 is a perspective view of a conventional scanning device.
Figure 27:
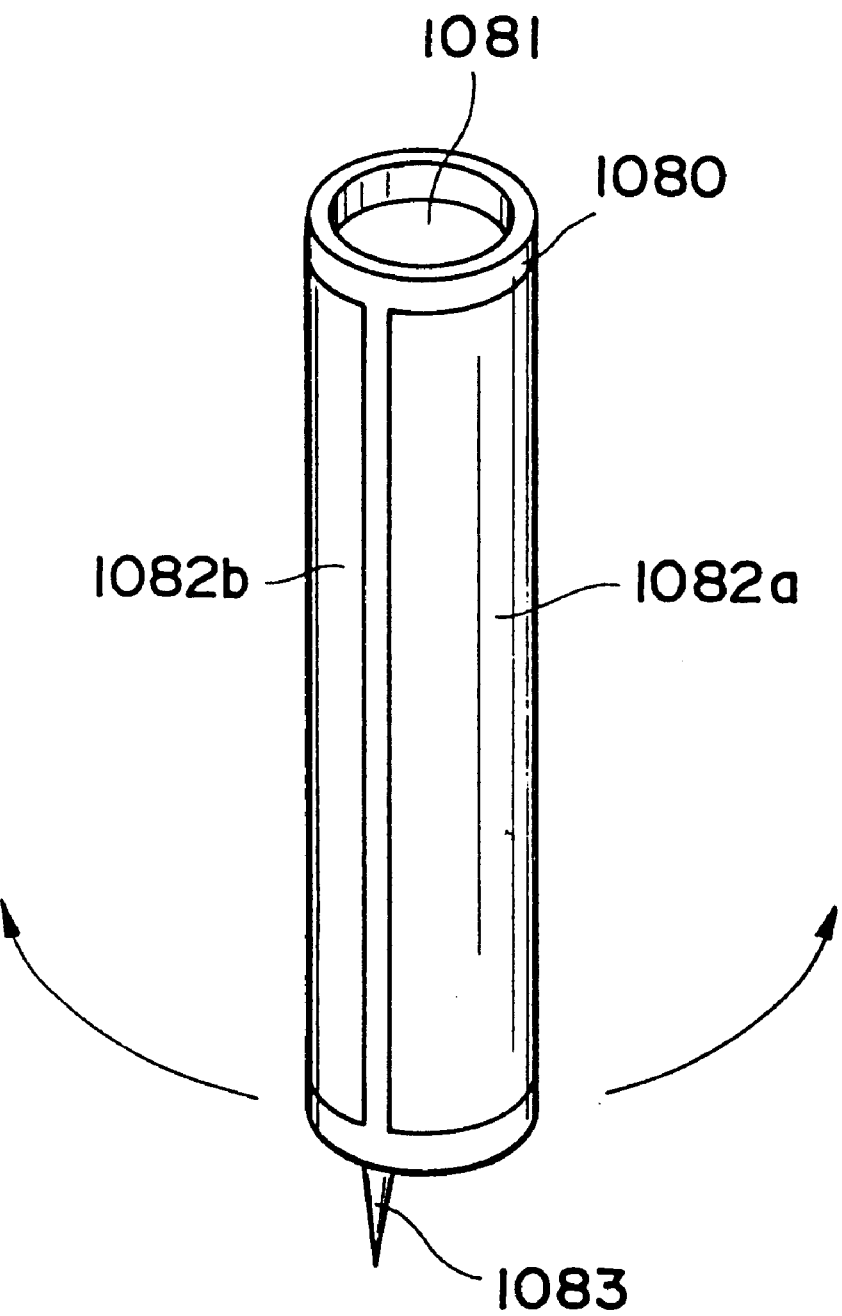
FIG. 27 is a perspective view of another conventional scanning device.

A conventional driving device for the probe or a sample in a scanning type probe microscope includes a tripod type piezoelectric driving device like the one shown in FIG. 26 and a tube type piezoelectric driving device like the one shown in FIG. 27. The former device has three piezoelectric driving members 1071a, 1071b, and 1071c respectively fixed to a support substrate 1070 at a right angle. In addition, one end of each piezoelectric driving member is fixed to a block 1072. A probe 1073 fixed to the block 1072 is three-dimensionally driven. The latter device has a cylindrical piezoelectric element 1080. An electrode 1081 is formed on the entire inner surface of the element 1080, and electrodes 1082a and 1082b are formed on the outer surface of the element 1080. With this arrangement, a probe 1083 is driven.

Each of these piezoelectric driving devices uses piezoelectric elements. Since these piezoelectric elements have hysteresis and creep characteristics, the driving amounts are difficult to control. In addition, when an image is obtained by scanning the probe using the piezoelectric elements, the obtained image exhibits a shape different from the actual surface shape of the sample because of the influences of the hystereses and creeps.

Conventionally, in order to reduce the influence of the hysteresis of each piezoelectric element, the hysteresis curve of the piezoelectric element is measured in advance, and a quadratic curve approximate to the hysteresis curve is selected. When the piezoelectric driving member is to be actually driven, a voltage is applied to each piezoelectric element in consideration of the change amount of the quadratic curve. In this method, however, it is difficult to completely correct the hystereses. In addition, in the method, no consideration is given to the influences of the creeps of the piezoelectric elements, and hence the influences cannot be eliminated.

With regard to a tube type piezoelectric driving member, a technique has been proposed (Japanese Patent Laid-Open Nos. 6-174460 and 6-229753 and U.S. Pat. No. 5,210,410), which is designed to directly measure the displacement of the piezoelectric driving member, instead of detecting the displacement amount by monitoring a voltage value, thereby controlling the displacement.

The above piezoelectric driving member is required to be accurately displaced within the range of a small displacement amount of about several nm. Even with such a small displacement, however, a displacement amount detection device having a high detection sensitivity cannot be obtained. There is no conventional device for controlling the displacement amount of a tripod type piezoelectric driving device in which a means to be driven within the X-Y plane parallel to a sample surface and a means to be driven in the-Z direction perpendicular to the X-Y plane are separately arranged.

The tripod type piezoelectric driving devices to be described with reference to FIGS. 20 to 25 can control displacement amounts.

Each of these devices comprises an expandable piezoelectric driving member having one end fixed to a support member, a light source, a reflecting member having a reflecting surface which reflects light from the light source and changes in angle with respect to the optical path of the light from the light source in accordance with the expansion/contraction amount of the piezoelectric driving member, and a light-receiving member, having a plurality of divided light-receiving surfaces, for receiving light reflected by the reflecting member and detecting the moving amount of the spot of the reflected light which has moved in accordance with a change in the angle of the reflecting surface with respect to the optical axis. Each device detects the expansion/contraction amount of the piezoelectric driving member.

The reflecting member preferably includes a deformation member having one end and the other end, which are fixed to the two ends of the piezoelectric driving member, and at least one portion to be bent or curved in accordance with the displacement amount of the piezoelectric driving member, and a reflecting mirror, arranged on the deformation member, for reflecting light from the light source. With this arrangement, the angle of the reflecting surface with respect to the optical axis is preferably changed as the deformation member is bent or curved in accordance with the expansion/contraction amount of the piezoelectric driving member. In addition, the deformation member preferably has a plurality of flexible hinges between one end and the other end.

The reflecting member preferably includes a reflecting mirror support member having one end fixed to the support member and the other end fixed to the piezoelectric driving member, and a reflecting mirror for reflecting light from the light source.

Hinges are preferably mounted on the two ends of the reflecting mirror support member.

This device comprises an X-direction piezoelectric driving member having one end fixed to a support member and capable of expanding/contracting in the X direction, a Y-direction piezoelectric driving member having one end fixed to the support member and capable of expanding/contracting in the Y direction different from the X direction, a Z-direction piezoelectric driving member capable of expanding/contracting in the Z direction perpendicular to the X and Y directions, and a probe arranged on one end of the Z-direction piezoelectric driving member on the sample surface side. The other end of the X-direction piezoelectric driving member, the other end of the Y-direction piezoelectric driving member, and the other end of the Z-direction piezoelectric driving member are connected to each other. The device further includes a Y-direction displacement amount detection reflecting member having a reflecting surface and arranged on the X-direction piezoelectric driving member, for reflecting light, an X-direction displacement amount detection reflecting member having a reflecting surface and arranged on the Y-direction piezoelectric driving member, for reflecting light, an X-direction displacement amount detection light source for irradiating a light beam on the X-direction displacement amount detection reflecting member, a Y-direction displacement amount detection light source for irradiating a light beam on the Y-direction displacement amount detection reflecting member, an X-direction displacement amount detection light-receiving member, having a plurality of light-receiving surfaces, for receiving light reflected by the X-direction displacement amount reflecting member, and a Y-direction displacement amount detection light-receiving member, having a plurality of light-receiving surfaces, for receiving light reflected by the Y-direction displacement amount reflecting member. With this arrangement, the intensities of signals respectively obtained from the light-receiving surfaces of the X-direction displacement amount detection light-receiving member are compared with each other to detect the displacement amount of the X-direction piezoelectric driving member, and the intensities of signals respectively obtained from the light-receiving surfaces of the Y-direction displacement amount detection light-receiving member are compared with each other to detect the displacement amount of the Y-direction piezoelectric driving member.

One end of each of the X- and Y-direction piezoelectric driving members, which is fixed to the support member, and the other end of one of the X- and Y-direction piezoelectric driving members preferably have X-Y plane flexible hinges which are bent within the X-Y plane including the X and Y directions.

In addition, this device comprises an X-direction piezoelectric driving member having one end fixed to a support member, a Y-direction piezoelectric driving member having one end fixed to the support member, a Z-direction piezoelectric driving member fixed to a portion to which the other end of each of the X- and Y-direction piezoelectric driving members is fixed, a first light source, a second light source, a first reflecting member arranged on one of the X- and Y-direction piezoelectric driving members and having a reflecting portion for reflecting light from the first light source, a deformation member which is fixed to one end and the other end of the Z-direction piezoelectric driving member and is easily bent or curved in accordance with the displacement amount of the Z-direction piezoelectric driving member, a second reflecting member arranged on the deformation member and having a reflecting portion for reflecting light from the second light source, a first light-receiving member whose light-receiving surface for detecting reflected light from the first reflecting member is divided into two parts, and a second light-receiving member whose light-receiving surface for detecting reflected light from the second reflecting member is divided into four parts.

One end of each of the X- and Y-direction piezoelectric driving members, which is fixed to the support member, and the other end of one of the X- and Y-direction piezoelectric driving members preferably have X-Y plane flexible hinges which are bent within the X-Y plane including the X and Y directions.

In the displacement amount detection device having the above means, light from the light source is irradiated on the reflecting member while the angle of the reflecting surface changes in accordance with the expansion/contraction amount of the piezoelectric driving member. The light reflected by the reflecting member reaches the light-receiving member having the two divided light-receiving surfaces. At this time, the optical path of the light reflected by the reflecting member undergoes an angle change as the angle of the reflecting member changes. More specifically, the optical path of the reflected light undergoes an angle change twice that of the reflecting member. With this angle change, the position of the spot of the reflected light on the light-receiving surfaces moves by an amount larger than the displacement amount of the piezoelectric driving member.

The change amount of the angle of the reflecting surface is detected, as the displacement amount of the piezoelectric driving member, on the basis of the difference in intensity between signals respectively obtained from the light-receiving surfaces of the light-receiving member. Since the difference in intensity between the signals obtained from the respective light-receiving surfaces changes in proportion to the expansion/contraction amount of the piezoelectric driving member, the expansion/contraction amount of the piezoelectric driving member can be detected on the basis of the change amount of the difference in intensity between the signals obtained from the respective light-receiving surfaces.

In the present invention, the reflecting member further includes a deformation member and a reflecting mirror.

This deformation member is fixed to one end and the other end of the piezoelectric driving member. The angle or radius of curvature at which the deformation member is bent or curved changes in accordance with the expansion/contraction of the piezoelectric driving member. The reflecting mirror is arranged on the deformation member. The angle of the reflecting mirror changes with a change in the angle or radius of curvature at which the deformation member is bent or curved. With this arrangement, light from the light source is irradiated on the reflecting mirror, and the light reflected thereby is received by the light-receiving member having a plurality of light-receiving areas isolated each other. When the moving amount of the spot of the reflected light on the light-receiving surfaces of the light-receiving member is detected, the expansion/contraction amount of the piezoelectric driving member can be detected.

If the deformation member has a plurality of flexible portions, the mounting angle of the reflecting mirror with respect to the piezoelectric driving member increases, and a change in the angle of the reflecting mirror with respect to the expansion/contraction amount of the piezoelectric driving member further increases.

The reflecting mirror is fixed to a reflecting mirror support portion having two ends fixed to the piezoelectric driving member and the support member. With this arrangement, when the piezoelectric driving member is displaced, the reflecting mirror support member between the piezoelectric driving member and the support member deflects or partly bends, thereby causing an angle change with respect to the optical path of light from the light source. As a result, the reflecting mirror fixed to the reflecting mirror support member also undergoes an angle change with respect to the optical axis. Therefore, by detecting a change in the spot of light reflected by the reflecting mirror, the expansion/contraction amount of the piezoelectric driving member can be detected.

If the two ends of the reflecting mirror support member are fixed via hinges, the reflecting mirror support member is not deflected. As a result, the load on the piezoelectric driving member decreases, and damage to the member due to fatigue can be prevented.

According to the present invention, there is provided a displacement detection device suitable for a tripod type piezoelectric driving member, comprising X- and Y-direction piezoelectric driving members capable of expanding/contracting in different directions, and a Z-direction piezoelectric driving member capable of expanding/contracting in the Z direction perpendicular to both the X and Y directions, wherein one end of each of the X- and Y-direction piezoelectric driving members is fixed to a support member, and the other end of the X-direction piezoelectric driving member is fixed to the other end of the Y-direction piezoelectric driving member.

Reflecting members are respectively arranged on the X- and Y-direction piezoelectric driving members of the above tripod type piezoelectric driving member. A light source and a light-receiving member are arranged for each reflecting member. With this arrangement, when the X-direction piezoelectric driving member is driven, the Y-direction piezoelectric driving member is inclined with respect to the optical path of light from the light source. At the same time, the reflecting member mounted on the Y-direction piezoelectric driving member also undergoes an angle change. In consideration of such a behavior, the displacement amount of the X-direction piezoelectric driving member is detected. The displacement amount of the Y-direction piezoelectric driving member is also detected by the same method. The position of the probe arranged on the Z-direction piezoelectric driving member can be detected on the basis of the detection results.

In detecting the displacement amount of the X-direction piezoelectric driving member, a change in the angle of the reflecting surface of the X-direction displacement detection reflecting member arranged on the Y-direction piezoelectric driving member is detected by comparing changes in the intensities of signals obtained from the respective light-receiving surfaces of the X-direction displacement amount detection light-receiving member having the two divided light-receiving surfaces using light from the X-direction displacement detection light source. Similarly, in detecting the displacement amount of the Y-direction piezoelectric driving member, a change in the angle of the reflecting surface of the Y-direction displacement detection reflecting member arranged on the Y-direction piezoelectric driving member is detected by comparing changes in the intensities of signals obtained from the respective light-receiving surfaces of the Y-direction displacement amount detection light-receiving member having the two divided light-receiving surfaces using light from the Y-direction displacement detection light source.

The reason why a change in the angle of the light-receiving surface of each reflecting member occurs will be described by exemplifying the case wherein the X-direction piezoelectric driving member is displaced. The Y-direction piezoelectric driving member pivots about one end fixed to the support member as the X-direction piezoelectric driving member is displaced. As a result, the angle of the Y-direction piezoelectric driving member with respect to a light beam from the X-direction displacement amount detection light source changes after the displacement. When the angle of the Y-direction piezoelectric driving member changes, the angle of the X-direction displacement amount detection reflecting member also changes accordingly. Since the optical path of the light reflected by the X-direction displacement amount detection reflecting member also changes, the displacement amount of the X-direction piezoelectric driving member can be detected by detecting this change using the X-direction displacement amount detection light-receiving member.

The displacement amount of the Y-direction piezoelectric driving member is also detected in the same manner as the detection of the displacement amount of the X-direction piezoelectric driving member.

In the above tripod type piezoelectric driving device, a first reflecting member is arranged on one of the X- and Y-direction piezoelectric driving members, a member whose angle or radius of curvature changes in accordance with expansion/contraction of the Z-direction piezoelectric driving member is fixed to one end and the other end of the Z-direction piezoelectric driving member, and a second reflecting member is arranged on the member whose angle or radius of curvature changes. With this arrangement, the displacement amount of the Z-direction piezoelectric driving member can be detected, in addition to the displacement amounts of the X- and Y-direction piezoelectric driving members.

Light reflected by the first reflecting member arranged on one of the X- and Y-direction piezoelectric driving members is received by the first light-receiving member, and changes in the intensities of signals from the respective light-receiving surfaces are detected, thereby detecting the expansion/contraction amount of the piezoelectric driving member on which the first reflecting member is not arranged. In addition, according to the present invention, the angle of the reflecting surface (on the X-Y plane including the X and Y directions) of the second reflecting member arranged on the Z-direction piezoelectric driving member changes with respect to the optical path of light from the light source in accordance with the displacement amount of the piezoelectric driving member on which the first reflecting member is arranged. Similarly, when the Z-direction piezoelectric driving member expands/contracts, the angle of the reflecting surface (on a plane parallel to the Z direction) changes. The expansion/contraction of the piezoelectric driving member on which the first reflecting member is arranged, and the expansion/contraction amount of the Z-direction piezoelectric driving member can be detected by detecting a change in angle of the reflecting surface of the second reflecting member on the X-Y plane and a change in angle of the reflecting surface on the plane parallel to the Z direction using the second light-receiving member having the four divided light-receiving surfaces.

In this manner, the expansion/contraction amounts of the respective piezoelectric driving members independently arranged in the three directions can be detected by using the two reflecting members.

The devices shown in FIGS. 20 to 25 will be described in more detail next.

Figure 20:
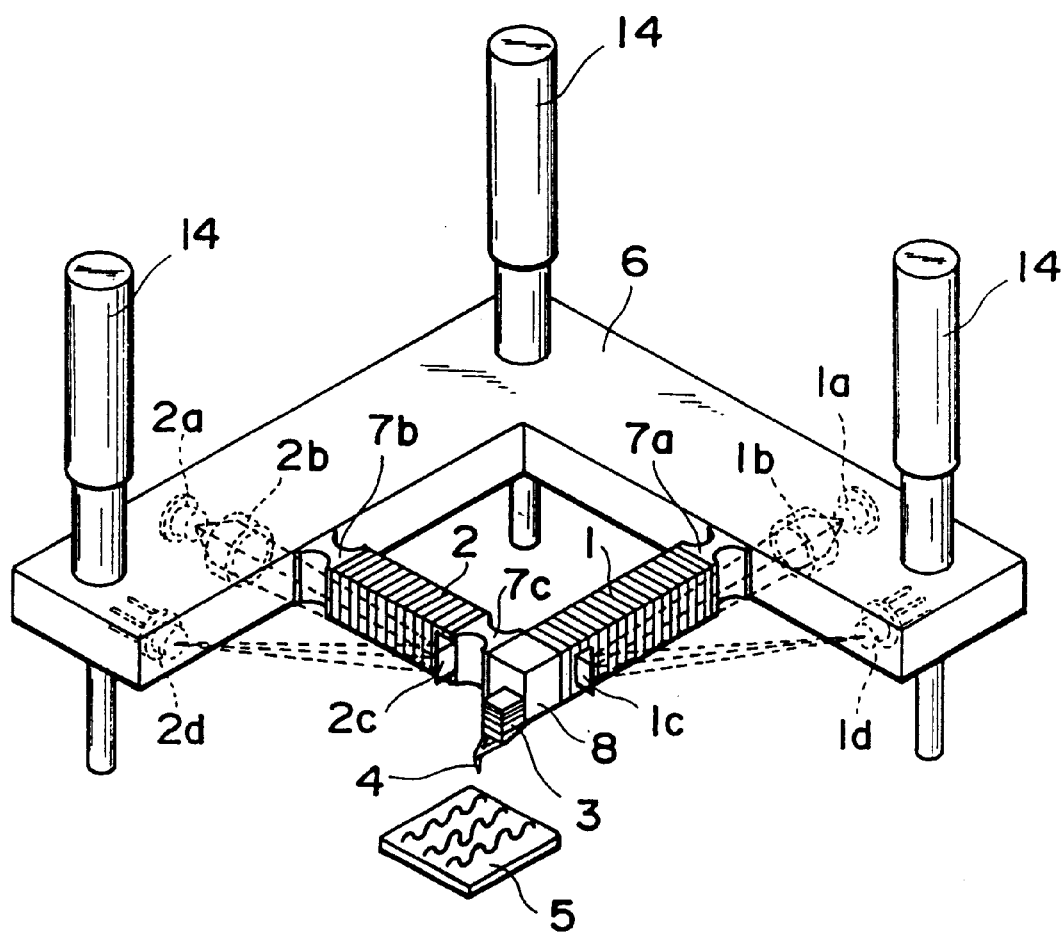
FIG. 20 is a perspective view for explaining the scanning amount (the moving amount of the probe) of a scanning mechanism.

FIG. 20 is a perspective view of a scanning type probe microscope using a piezoelectric driving device.

This piezoelectric driving device includes an X-direction piezoelectric driving member 1 which expands/contracts in the X direction within the X-Y plane parallel to a sample surface of a sample 5, and a Y-direction piezoelectric driving member 2 which expands/contracts in the Y direction perpendicular to the X direction on the X-Y plane. The X- and Y-direction piezoelectric driving members 1 and 2 are fixed to a support substrate 6 via hinges 7a and 7b at a right angle. The X- and Y-direction piezoelectric driving members 1 and 2 are fixed at a right angle via a hinge 7c and a block 8.

A Z-direction piezoelectric driving member 3 which expands/contracts in the Z direction perpendicular to the X-Y plane is arranged on the block 8. A probe 4 for an atomic force microscope is arranged on one end of the Z-direction piezoelectric driving member 3 which is located on the sample 5 side. This probe 4 includes a cantilever and a stylus arranged on the distal end thereof.

Each of the X-, Y-, and Z-direction piezoelectric driving members 1, 2, and 3 is obtained by stacking a plurality of piezoelectric elements in the direction in which each member expands/contracts. These piezoelectric driving members can expand/contract in the respective directions upon application of voltages to the respective piezoelectric elements. The X-direction piezoelectric driving member 1 has a Y-direction displacement amount detection reflecting mirror 1c. The Y-direction displacement amount detection reflecting mirror 1c is fixed near an end of the X-direct ion piezoelectric driving member 1 to which the block 8 is fixed. The Y-direction piezoelectric driving member 2 has an X-direction displacement amount detection reflecting mirror 2c. This mirror 2c is fixed near the hinge 7c of the Y-direction piezoelectric driving member 2.

The support substrate 6 has an L shape like the one shown in FIG. 20. The support substrate 6 is supported by three micrometers 14 for adjusting the positions of the sample 5 and the probe 4.

Light-emitting elements 2a and 1a, lenses 2b and 1b, and 2-division photodiodes 2d and 1d are arranged on the support substrate 6. As the light-emitting elements 2a and 1a, light-emitting diodes are used.

The light-emitting element 2a is a light source for emitting light to be irradiated on the X-direction displacement amount detection reflecting mirror 2c. The light-emitting element 1a is a light source for emitting light to be irradiated on the Y-direction displacement amount detection reflecting mirror 1c. These light-emitting elements are constituted by light-emitting diodes.

These photodiodes 2d and 1d are arranged such that their light-receiving surfaces are perpendicular to the sample surface, and the lines dividing the light-receiving surfaces are perpendicular to the surface of the sample 5.

The lens 2b focuses light emitted from the light-emitting element 2a on the photodiode 2d. Similarly, the lens 1b focuses light emitted from the light-emitting element 1a on the photodiode 1d.

In performing measurement with the scanning type probe microscope having the above arrangement, the X- and Y-direction piezoelectric driving members 1 and 2 are driven to scan the probe 4 parallel to the surface of the sample 5. The deflection amount of the cantilever of the probe 4 is detected to measure the fine shape of the surface of the sample 5.

In a scanning operation of the probe 4, since the X- and Y-direction piezoelectric driving members 1 and 2 are fixed to each other via the hinge 7c, when a voltage is applied to one of the piezoelectric driving members to displace it, the other piezoelectric driving member is inclined in accordance with the displacement amount of one piezoelectric driving member. The reflecting mirror arranged on the other piezoelectric driving member is also inclined in accordance with this inclination. When the reflection mirror is inclined, the optical axis of light reflected by the reflecting mirror is also inclined, and the position of the beam spot on the photodiode changes. By detecting this change, the displacement amount of one piezoelectric driving member can be detected.

This state will be described in more detail by exemplifying the case wherein the Y-direction piezoelectric driving member 2 is displaced. A description about the displacement of the X-direction piezoelectric driving member 1 will be omitted because it is equivalent to the detection of the displacement amount of the Y-direction piezoelectric driving member 2.

When a voltage is applied to the Y-direction piezoelectric driving member 2, the X-direction piezoelectric driving member 1 expands/contracts. With this operation, the X-direction piezoelectric driving member 1 fixed to the Y-direction piezoelectric driving member 2 is inclined about the hinge 7b to change the inclination with respect to the support substrate 6. When this X-direction piezoelectric driving member 1 is inclined, the Y-direction displacement amount detection reflecting mirror 1c mounted thereon is also inclined by the same amount by which the X-direction piezoelectric driving member 1 is inclined. As a result, the optical path of the light reflected by the reflecting mirror 1c is inclined.

The displacement amount of a beam spot which is displaced on the photodiode 1d when the displacement amount detection reflecting mirror is inclined will be described with reference to FIG. 21.

Figure 21:
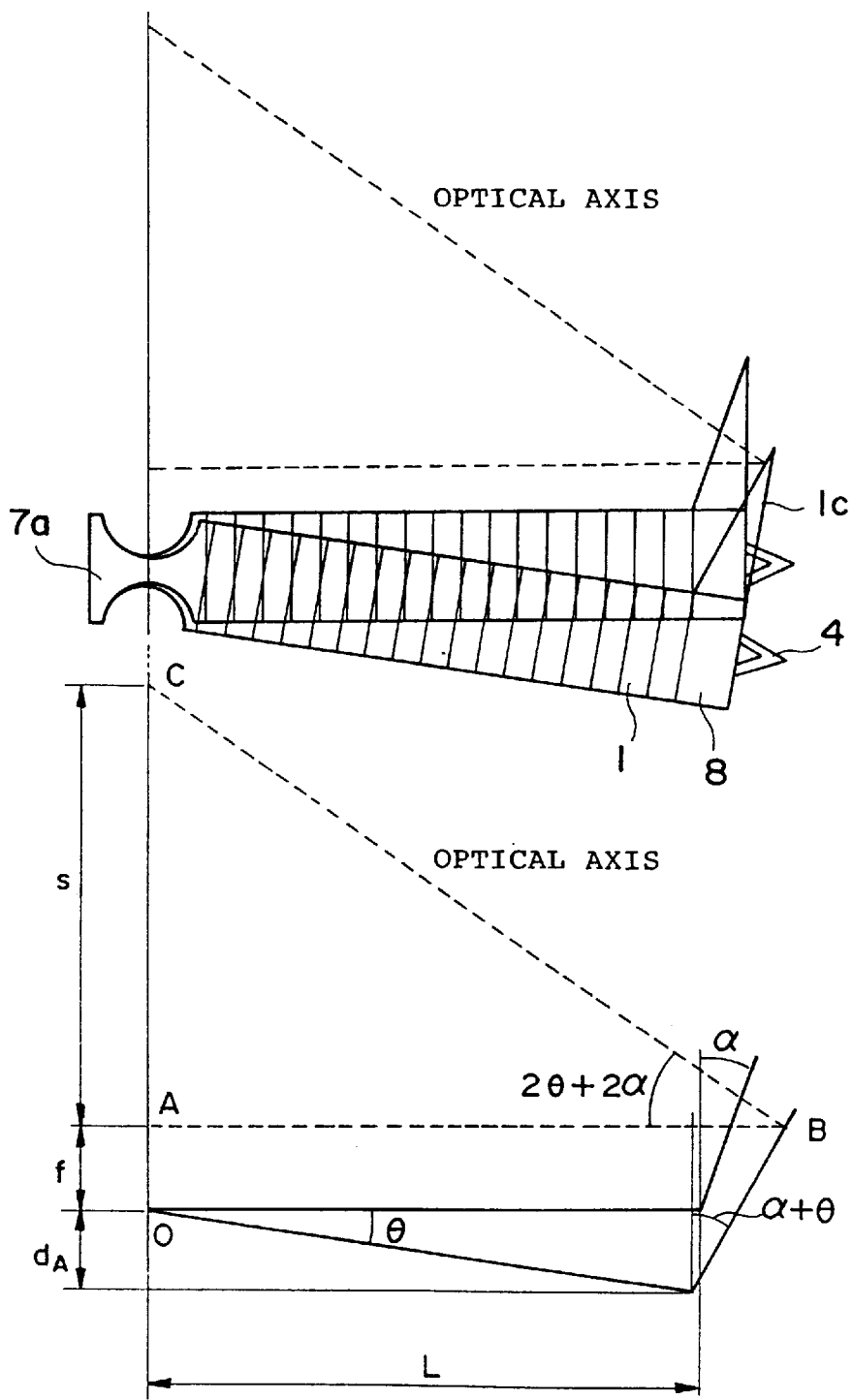
FIG. 21 is a view for explaining the optical path of a beam reflected by a mirror.
Figure 22:
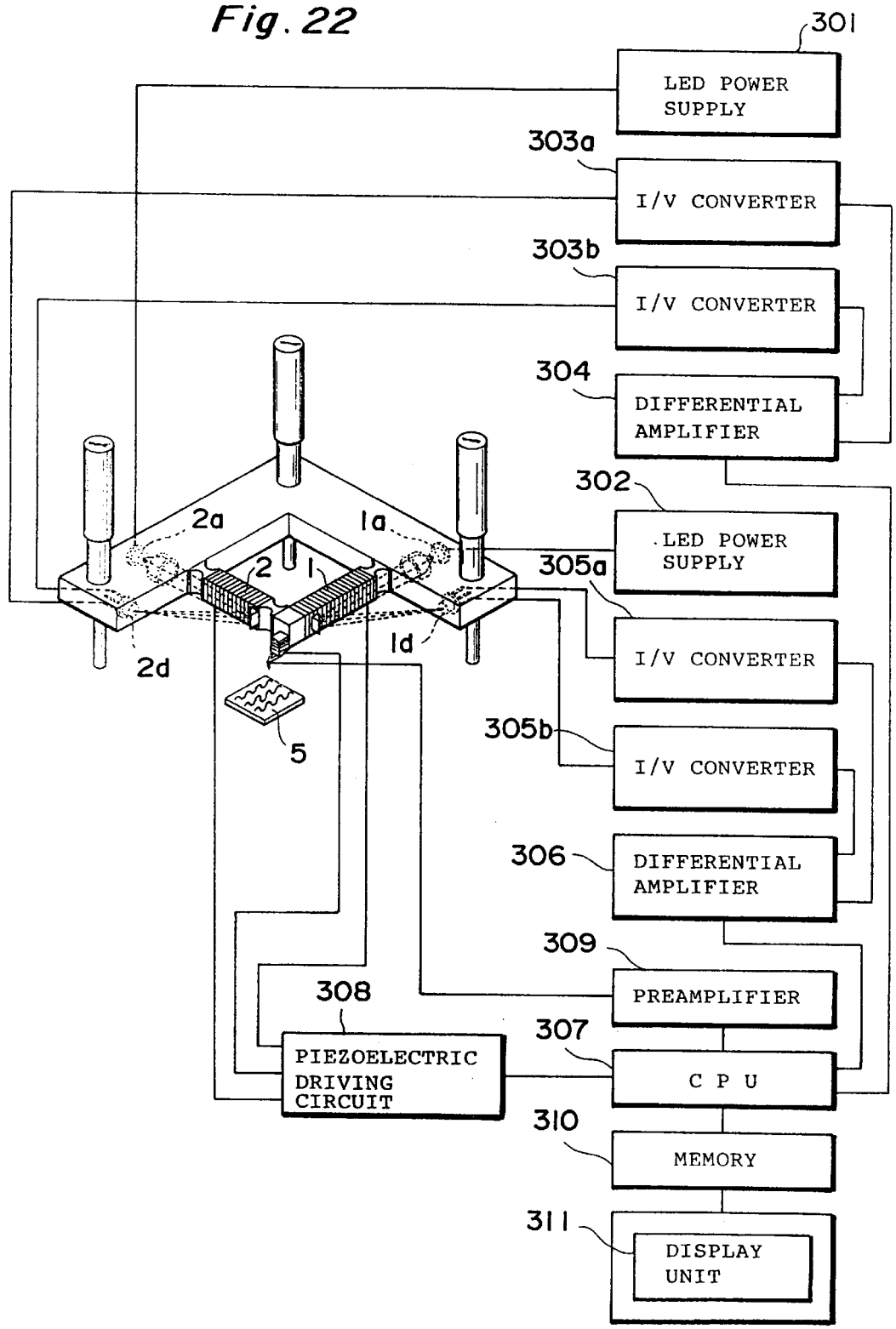
FIG. 22 is a view showing a detection system for detecting the moving amount of a probe.

FIG. 21 illustrates the displacement amount of a beam spot which is displaced on the photodiode when the Y-direction displacement amount detection reflecting mirror 1c is inclined upon displacement of the Y-direction piezoelectric driving member 2.

Let O be the bending center of the hinge 7a, A be the position of the light-emitting element 1a, B be the position of a portion for reflecting light from the light-emitting element 1a, and C be the position of a beam spot when the Y-direction displacement amount detection reflecting mirror 1c is inclined.

Let θ be the angle at which the X-direction piezoelectric driving member 1 is inclined upon displacement of the Y-direction piezoelectric driving member 2, α be the angle at which the Y-direction displacement amount detection reflecting mirror 1c is mounted on the X-direction piezoelectric driving member 1, f be the distance from the axis of the X-direction piezoelectric driving member 1 to the light-emitting element 1a, L be the distance from the center O to the Y-direction displacement amount detection reflecting mirror 1c, and $d_A$ be the displacement amount of the Y-direction piezoelectric driving member 2.

When the Y-direction piezoelectric driving member 2 is displaced by the distance corresponding to the displacement amount $d_A$, the X-direction piezoelectric driving member 1 is inclined by the angle θ. At this time, a distance S from the position A to a beam spot C is given by:

$$S(\theta, \alpha) = \overline{AB} \times \tan(2\alpha + 2\theta) \quad (2\text{-}1)$$

The distance from the position A of the light-emitting element 1a to the position B is given by:

$$\overline{AB} = L \times \cos\theta + (d_A + f) \times \tan)\alpha + \theta) \quad (2\text{-}2)$$

The relationship between the angle θ, the distance L, and the displacement amount $d_A$ can be expressed by:

$$\sin\theta = \frac{d_A}{L} \quad (2\text{-}3)$$

When equation (2-1) is substituted for equation (2-2), the angle θ can be expressed by the displacement amount $d_A$ according to equation (2-3), as follows:

$$S(d_A, \alpha) = \left[ (d_A + f) \frac{\sin\alpha \times \sqrt{L^2 - d_A^2} + d_A \times \cos\alpha}{\cos\alpha \times \sqrt{L^2 - d_A^2} - d_A \times \sin\alpha} + \sqrt{L^2 - d_A^2} \right] \times \quad (2\text{-}4)$$

$$\frac{(L^2 - 2d_A^2) \times \sin 2\alpha + 2d_A \times \sqrt{L^2 - d_A^2} \times \cos 2\alpha}{(L^2 - 2d_A^2) \times \cos 2\alpha - 2d_A \times \sqrt{L^2 - d_A^2} \times \sin 2\alpha}$$

Since the change amount of the distance S with respect to the change amount of the displacement amount $d_A$ is twice the change amount detected above, the distance S is differentiated by the displacement amount $d_A$ with respect to equation (2-4). With a substitution of $d_A=0$, equation (2-5) is established. The reason why 0 is substituted for $d_A$ is that the differential value of S does not almost change with respect to the value of $d_A$.

$$\frac{dS(0,\alpha)}{d\,d_A} = \left[\tan\alpha + \frac{1}{4\cos^2\alpha}\right] \times \tan 2\alpha + \left[\frac{\tan\alpha}{4} + 1\right] \times \frac{2}{\cos^2 2\alpha} \qquad (2\text{-}5)$$

Let an actual value substitute for α of equation (2-5). Since the reflecting mirror is mounted at an angle of 15° in FIG. 20, this value is substituted for α.

With this substitution, the displacement amount of the beam spot is about 3.15 times the displacement amount of the Y-direction piezoelectric driving member according to equation (2-5).

As is apparent from equation (2-5), the displacement amount of the beam spot on the photodiode 2d becomes larger than the displacement amount of the Y-direction piezoelectric driving member 2.

In the device shown in FIG. 20, as described above, the actually detected displacement amount is larger than the displacement amount of each piezoelectric driving member which is directly measured. Therefore, a displacement detection device with a high resolution can be obtained.

A control system for controlling the displacement amounts of the X- and Y-direction piezoelectric driving members 1 and 2 by detecting the displacement amounts will be described with reference to FIG. 22. FIG. 22 is a block diagram showing the control system in FIG. 20. Hinges 7a, 7b, and 7c are not illustrated in FIG. 22.

The control system includes I/V converters 303a, 303b, 305a, and 305b for converting current values into voltage values, differential amplifiers 304 and 306 for outputting the differences between voltage values from the I/V converters, and a CPU 307 for calculating the position of the probe 4 from signals from the respective differential amplifiers. The control system further includes a piezoelectric driving circuit 308 for applying proper voltages to the X-, Y-, and Z-direction piezoelectric driving members 1, 2, and 3.

The device also includes the following components other than those of the control system: a preamplifier 309 for amplifying a voltage associated with the displacement amount of the cantilever of the probe 4 and supplying the information of the uneven portions of the surface of the sample 5 to the CPU 307, a memory 310 for storing the position information of the probe 4 on the sample surface and the information of the corresponding uneven portions of the sample surface, which are output from the CPU 307, and a display unit 311 for displaying the sample information and the information of the uneven portions of the sample surface which correspond to the respective positions as images.

The device further includes LED power supplies 301 and 302 for supplying power to the photodiodes 2d and 1d.

The I/V converter 303a receives a current amount corresponding to the amount of light irradiated on one light-receiving surface of a photodiode 2d. The I/V converter 303a outputs a voltage corresponding to the input current amount. Similarly, the I/V converter 303b receives a current amount corresponding to the amount of light irradiated on the other light-receiving surface of the photodiode 2d and outputs a voltage corresponding to the current amount. The voltage values output from the I/V converters 303a and 303b are input to the differential amplifier 304. The differential amplifier 304 outputs a signal associated with the difference between the voltage values from the I/V converters 303a and 303b to the CPU 307. The CPU 307 calculates the displacement amount of the X-direction piezoelectric driving member 1 from the signal associated with the voltage difference.

The I/V converter 305a receives a current amount corresponding to the amount of light irradiated on one light-receiving surface of the photodiode 1d. The I/V converter 305a outputs a voltage corresponding to the input current amount. Similarly, the I/V converter 305b receives a current amount corresponding to the amount of light irradiated on the other light-receiving surface of the photodiode 1d, and outputs a voltage corresponding to the current amount. The voltages output from the I/V converters 305a and 305b are input to the differential amplifier 306. The differential amplifier 306 outputs a signal associated with the difference between the voltage values from the I/V converters 305a and 305b to the CPU 307. The CPU 307 calculates the displacement amount of the Y-direction piezoelectric driving member 2 from the signal associated with the voltage difference.

The CPU 307 calculates the differences between the calculated displacement amounts of the X- and Y-direction piezoelectric driving members 1 and 2 and a predetermined displacement amount, and supplies feedback signals to the piezoelectric driving circuit 308. In this manner, the displacement amounts of the X- and Y-direction piezoelectric driving members 1 and 2 are controlled to predetermined displacement amounts.

The Z-direction piezoelectric driving member 3 is controlled in accordance with the deflection amount of the cantilever of the probe 4 to prevent the cantilever from being extremely deflected. A signal associated with the deflection amount of the cantilever of the probe 4 is input from the preamplifier 309 to the CPU 307. The CPU 307 inputs a feedback signal to a piezoelectric driving circuit 308 to deflect the cantilever by a desired deflection amount. In this manner, the cantilever of the probe 4 is controlled to be deflected by the desired deflection amount.

The CPU 307 inputs the position of the probe 4 on the sample, which is calculated from signals from the differential amplifiers 304 and 306, and the information of the uneven portions of the sample 5, which correspond to the respective positions and obtained from signals associated with interatomic forces acting between the sample 5 and the probe 4, to the memory 310. The shaped of the surface of the sample 5 is then three-dimensionally displayed by the display unit 311 on its screen in accordance with the signals input to the memory 310.

In the above manner, the display unit 311 displays the shape of the surface of the sample 5 observed with the atomic force microscope to the user.

As the displacement control method for the X- and Y-direction piezoelectric driving members 1 and 2, a follow-up control method based on proportional control. However, a differential or integral control method, which is a control method with good response characteristics may be used. This differential control method is a method of performing feedback control with respect to the steepness of the actual change amount of each piezoelectric driving member. The integral control method is a method of performing control in consideration of the average value of the values of voltages applied as feedback values in the past and the actual feedback amounts of the piezoelectric driving members. If control is performed by a combination of proportional control, differential control, and integral control, control with better response characteristics can be realized.

Since the scanning type probe microscope needs no members above and below the probe 4, the microscope can be mounted in an inverted microscope or an erect microscope having a long work distance. The scanning type probe microscope allows observation in a narrower visual field than an optical microscope. For this reason, when a large sample is observed with the scanning type probe microscope, the user cannot discriminate a currently observed portion from the remaining portion. If, however, this scanning type probe microscope is combined with the erect microscope, and an object lens is arranged above the probe 4, such a problem can be solved.

Figure 23:
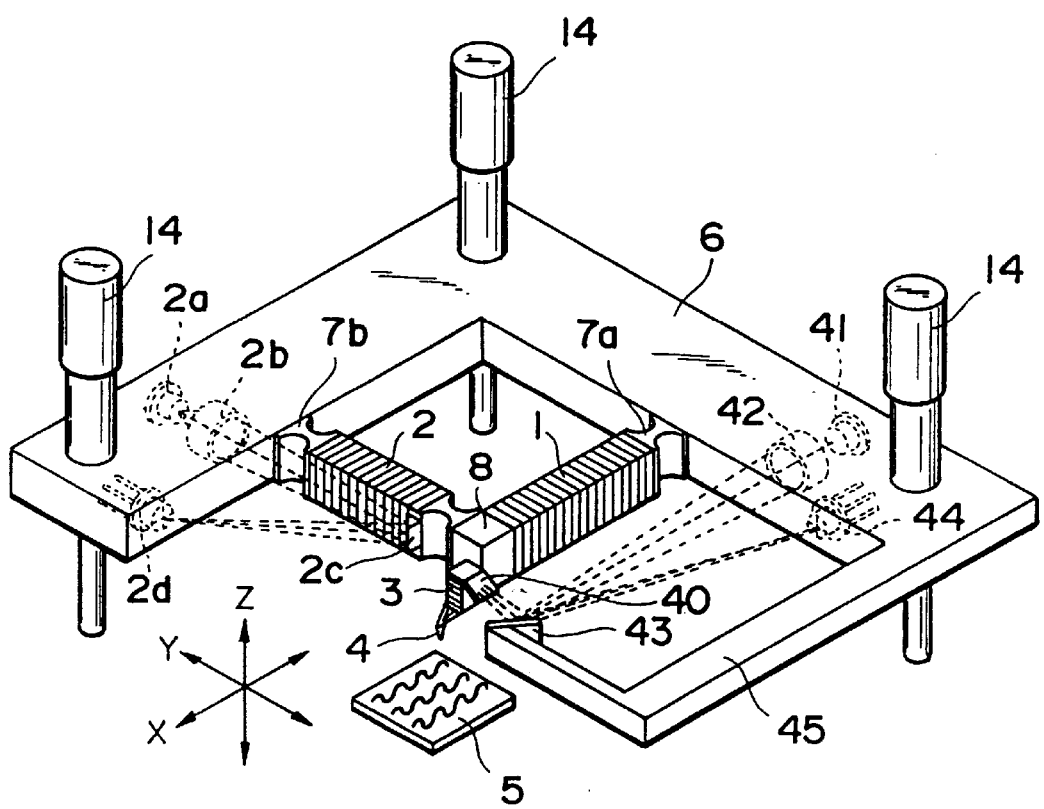
FIG. 23 is a perspective view showing a scanning amount detection mechanism whose arrangement is different from that shown in FIG. 20.

FIG. 23 shows the arrangement of a scanning type probe microscope according to still another embodiment.

The same reference numerals in FIG. 23 denote the same parts as in FIG. 20, and hence a description thereof will be omitted.

This apparatus does not include the light-emitting element 1a, the lens 1b, the Y-direction displacement amount detection reflecting mirror 1c, and the photodiode 1d in FIG. 20. The apparatus shown in FIG. 23 has the following new components: a Y-Z-direction displacement amount detection member 40, a light-emitting element 41, a lens 42, a mirror 43, a photodiode 44, and a mirror support member 45. With this arrangement, the displacement amount of a Z-direction piezoelectric driving member 3 can be detected, in addition to the displacement amounts of X- and Y-direction piezoelectric driving members 1 and 2.

Figure 24:
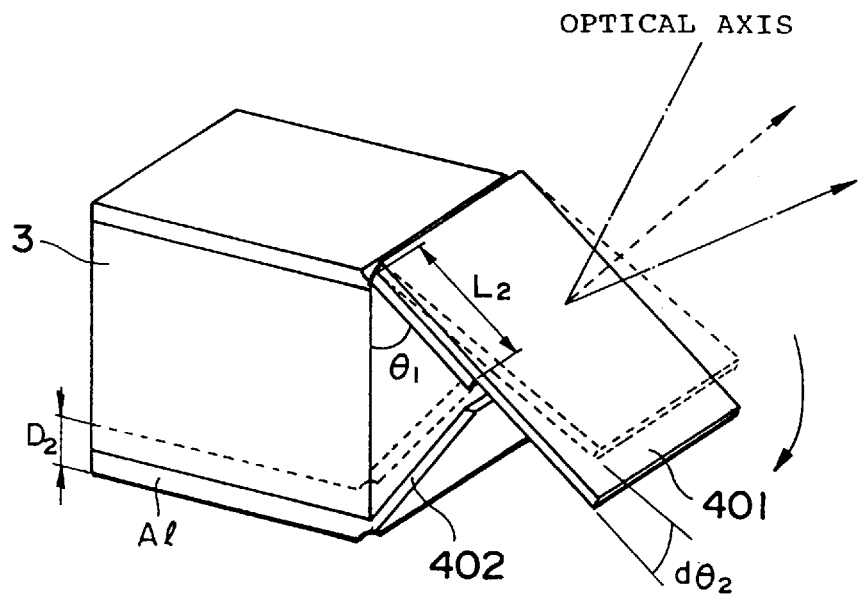
FIG. 24 is an enlarged view of a portion of the mechanism in FIG. 23.

The Y-Z-direction displacement amount detection member 40 is constituted by a Y-Z-direction displacement amount detection reflecting mirror support portion 402 having a flexible hinge at its central portion, and a Y-Z-direction displacement amount detection reflecting mirror 401, and is mounted on the Z-direction piezoelectric driving member 3, as shown in FIG. 24.

The Y-Z-direction displacement amount detection member 40, the light-emitting element 41, the lens 42, the mirror 43, the photodiode 44, and the mirror support member 45 are used to detect the inclination of the Y-Z-direction displacement amount detection reflecting mirror 401 on the X-Y plane and the inclination on the Y-Z plane as a plane including Z and Y directions, thereby detecting the displacement amounts of the Y- and Z-direction piezoelectric driving members.

Although FIG. 24 does not show the state wherein the piezoelectric elements of the Z-direction piezoelectric driving member 3 are stacked on each other, the Z-direction piezoelectric driving member 3 is identical to the Z-direction piezoelectric driving member 3 in FIG. 23.

Referring to FIG. 23, the light-emitting element 41 is a light source for emitting a light beam to be irradiated on the Y-Z-direction displacement amount detection member 40. A light-emitting diode is used as the-light-emitting element 41.

The photodiode 44 is a lens designed to focus light from the light-emitting element 41 on the photodiode 44.

The mirror 43 is arranged to irradiate a light beam emitted from the light-emitting element 41 onto the Y-Z-direction displacement amount detection member 40.

The photodiode 44 has four divided light-receiving surfaces. Similar to the photodiode 2d, the photodiode 44 is arranged such that its light-receiving surfaces are perpendicular to the sample surface. As shown in FIG. 23, the four equally divided light-receiving surfaces are obtained by dividing the entire light-receiving surface of the photodiode 44 with a line perpendicular to the sample surface and also dividing the divided surfaces with a line crossing the above line at a right angle.

The mirror support member 45 is an arm mounted on a support substrate 6 to allow the mirror 43 to be arranged at a proper position.

Detection of the displacement amounts of the Y- and Z-direction piezoelectric driving members 2 and 3 will be described next.

When the Y-direction piezoelectric driving member 2 is driven, the distal end of the X-direction piezoelectric driving member 1 which is located on the Z-direction piezoelectric driving member side is displaced so as to draw an arc about a hinge 7a. Along with this movement, the reflecting surface of the Y-Z-direction displacement amount detection member 40 arranged beside the Z-direction piezoelectric driving member 3 changes in inclination on the X-Y plane. The position of the spot of a light beam emitted from the light-emitting element 41 and reflected by the Y-Z-direction displacement amount detection member 40 changes on the light-receiving surfaces of the photodiode 44.

In the AFM in FIG. 23, since the optical path from the Y-Z-direction displacement amount detection member 40 to the photodiode 44 is long, the displacement amount of the beam spot with respect to the displacement amount of the Y-direction piezoelectric driving member 2 is larger than in the AFM FIG. 20.

Detection of the displacement amount when the Z-direction piezoelectric driving member 3 is driven will be described next. The Z-direction piezoelectric driving member 3 has the Y-Z-direction displacement amount detection reflecting mirror support portion 402 having a flexible hinge at its central portion, as shown in FIG. 24. An end portion of the Y-Z-direction displacement amount detection reflecting mirror support portion 402 is fixed to one end and the other end of the Z-direction piezoelectric driving member 3.

The angle at which the central portion of the Z-direction piezoelectric driving member 3 is bent increases or decreases in accordance with the displacement amount of the Z-direction piezoelectric driving member 3. Along with this operation, the Y-Z-direction displacement amount detection reflecting mirror 401 arranged on the Y-Z-direction displacement amount detection reflecting mirror support portion 402 changes in inclination on the Y-Z plane. Therefore, the spot of a light beam emitted from the light-emitting element 41 and reflected by the Y-Z-direction displacement amount detection member 40 is displaced on the light-receiving surfaces of the photodiode 44.

Since this displacement amount is almost three times the displacement amount of the Y-direction piezoelectric driving member 2 as in the apparatus in FIG. 20, a high resolution can be obtained as in the apparatus in FIG. 20.

The displacement amount of the beam spot on the photodiode 44 upon displacement of the Y-direction piezoelectric driving member 2 in the apparatus in FIGS. 23 can be calculated by comparing signals from the right and left halves of the light-receiving surface when viewed in FIG. 24.

The relationship between the displacement amount of the Z-direction piezoelectric driving member 3 and a change in the angle of the Y-Z-direction displacement amount detection reflecting mirror 401 is represented by:

$$d\theta_2 = \frac{D_2}{2 \times L_2 \times \theta_1} \tag{2-6}$$

where $d\theta_2$ is the change in the angle of the Y-Z-direction displacement amount detection reflecting mirror 401 upon displacement of the Z-direction piezoelectric driving member 3, $D_2$ is the displacement amount of the Z-direction piezoelectric driving member 3, $L_2$ is the length of a portion of the Y-Z-direction displacement amount detection reflecting mirror support portion 402 which supports the Y-Z- direction displacement amount detection reflecting mirror 401, and $\theta_1$ is the angle (unit: radian) defined by the portion of the Y-Z-direction displacement amount detection reflecting mirror support portion 402 which supports the Y-Z-direction displacement amount detection reflecting mirror 401 and the Z-direction piezoelectric driving member 3.

As is apparent from equation (2-6), when the Z-direction piezoelectric driving member 3 is displaced, the angle of the Y-Z-direction displacement amount detection reflecting mirror 401 also changes accordingly. By detecting a change in the angle of the Y-Z-direction displacement amount detection reflecting mirror 401 on the basis of the displacement amount of a beam spot on the photodiode 44, the displacement amount of the Z-direction piezoelectric driving member 3 can be detected with a higher sensitivity.

A displacement amount $\Delta S_1$ of a beam spot is given by equation (2-7). In this case, the optical path length is the distance from the Y-Z-direction displacement amount detection member 40 to the photodiode 44 via the mirror 43.

$$\Delta S_1 = d\theta_2 \times (\text{optical path length}) \qquad (2\text{-}7)$$

Let equation (2-6) substitute for equation (2-7), and practical numerical values in the apparatus in FIG. 23 substitute for the equation. Assume that $L_2=2$ mm, $\theta_1=\pi/6$, and the optical path length from the Y-Z-direction displacement amount detection reflecting mirror 401 to the photodiode 44 is 40 mm. In this case, the displacement amount $\Delta S1_1$ of the beam spot is about 19 times the displacement amount of the Z-direction piezoelectric driving member 3.

With regard to the displacement amount of the Y-direction piezoelectric driving member 2, when the angle of the Y-Z-direction displacement amount detection reflecting mirror 401 changes by an angle $\theta$, the angle of the optical path of the reflected light changes by an angle $2\theta$, as in the first embodiment. The displacement amount of the beam spot on the photodiode 44, therefore, becomes almost three times the displacement amount of the Y-direction piezoelectric driving member 2. In this manner, a displacement amount detection device with a high resolution can be obtained.

As a control system for the Z-direction piezoelectric driving member 3 in FIG. 23, the same control system as that for detecting the displacement amount of the X-direction piezoelectric driving member 1 described with reference to the apparatus in FIG. 20 may be further arranged for the Z-direction piezoelectric driving member 3. That is, for the Y- and Z-direction piezoelectric driving members 2 and 3, the following components may be additionally arranged: I/V converters arranged for the respective light-receiving surfaces of the photodiode 44 to convert currents output from the light-receiving surfaces into voltage values; a differential amplifier for outputting the difference between the voltage values respectively output from the I/V converters; and a CPU for calculating the displacement amounts of the Y- and Z-direction piezoelectric driving members 2 and 3 in accordance with signals output from the differential amplifier. Especially in the second embodiment, since the photodiode 44 is divided parallel to the Y-Z plane, the displacement amount of the Z-direction piezoelectric driving member 3 can be calculated by comparing signals from the upper and lower half light-receiving surfaces. The displacement amount of the Y-direction piezoelectric driving member 2 can be calculated by comparing signals from the right and left half light-receiving surfaces.

If a flexible member having a mirror surface is used as the Y-Z-direction displacement amount detection reflecting mirror support portion 402, the Y-Z-direction displacement amount detection reflecting mirror 401 need not be used.

As is apparent from equation (2-6), the change in the angle of the Y-Z-direction displacement amount detection reflecting mirror 401 further increases with respect to the displacement amount of the Z-direction piezoelectric driving member 3 by reducing the length of the portion of the Y-Z-direction displacement amount detection reflecting mirror support portion 402 which supports the Y-Z-direction displacement amount detection reflecting mirror 401 and the angle defined between the Z-direction piezoelectric driving member 3 and the portion of the Y-Z-direction displacement amount detection reflecting mirror support portion 402 which supports the Y-Z-direction displacement amount detection reflecting mirror 401. If, therefore, a large number of flexible hinges are arranged between one end and the other end of the Y-Z-direction displacement amount detection reflecting mirror support portion 402, a displacement amount detection device with a high resolution can be obtained.

If the surface of the Y-Z-direction displacement amount detection reflecting mirror support portion 402 is a mirror surface, the Y-Z-direction displacement amount detection reflecting mirror 401 need not specially be arranged. With this arrangement, the Z-direction piezoelectric driving member 3 can be reduced in weight.

Figure 25:
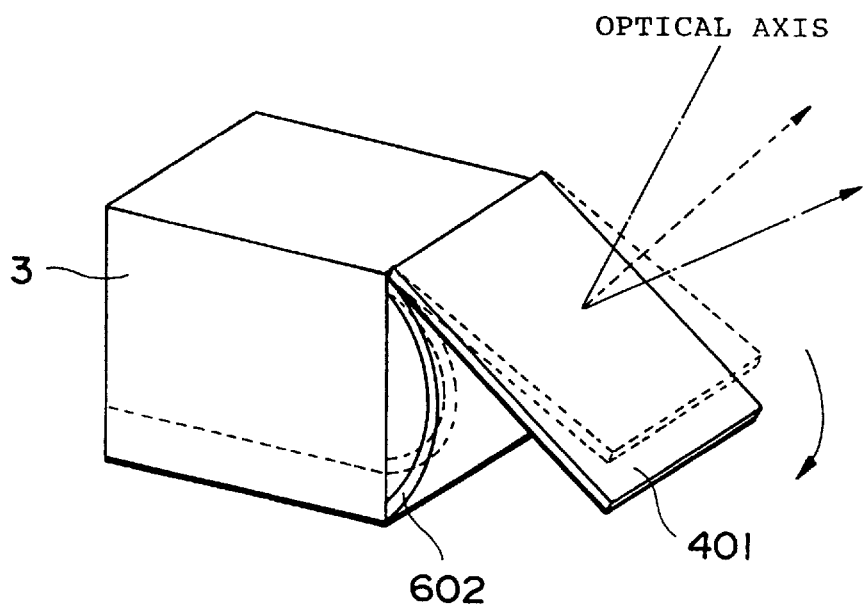
FIG. 25 is a perspective view showing a modification of the mechanism in FIG. 24.

As the Y-Z-direction displacement amount detection reflecting mirror support portion 402, a Y-Z-direction displacement amount reflecting mirror support member 602 which can be curved as shown in FIG. 25 can be used. Similar to the support member shown in FIG. 25, this support member is fixed to the Z-direction piezoelectric driving member 3. The Y-Z-direction displacement amount detection reflecting mirror 401 may be fixed to a portion of the Y-Z-direction displacement amount reflecting mirror support member 602 with an adhesive or the like.

Assume that the Y-Z-direction displacement amount reflecting mirror support member 602 is used. In this case, as is apparent from equation (2-6), a reduction in the surface of the Y-Z-direction displacement amount reflecting mirror support member 602 on which the Y-Z-direction displacement amount detection reflecting mirror 401 is fixed will increase the change in the angle of the optical axis of light reflected by the Y-Z-direction displacement amount detection reflecting mirror 401 upon displacement of the Z-direction piezoelectric driving member 3. As a result, a high resolution can be obtained. The same effect as described above can be obtained by minimizing the degree of curvature. In addition, a better effect can be expected by taking both the measures described above.

In the apparatuses shown in FIGS. 20 and 23, a piezoelectric driving member having a large number of piezoelectric elements stacked on each other in the expanding/contracting direction is used. When a force is applied to this piezoelectric driving member in the bending direction, cracks tend to be developed in the stacking surfaces, and damage may be caused. For this reason, as shown in FIG. 23, the hinges which are bent on the X-Y plane are arranged between the support substrate 6 and the respective piezoelectric driving members. In addition, at least one hinge which is bent on the X-Y plane is arranged between the X- and Y-direction piezoelectric driving members.

With this arrangement, even if the X- and Y-direction piezoelectric driving members are displaced, no deflection occurs.

The devices shown in FIGS. 20 and 23 have been described as displacement amount detection devices for the respective piezoelectric driving members. However, these devices can measure the moving distance from a given position of the probe 4 as a reference position to a position to which the probe 4 is displaced by driving the piezoelectric driving members.

In each of the apparatuses shown in FIGS. 20 to 25, the displacement amount of each piezoelectric driving member can be detected with a high resolution and a high sensitivity. If the displacement amount detection device for the piezoelectric driving members according to the present invention is incorporated in a piezoelectric driving device having piezoelectric driving members respectively arranged in three different directions, a compact device can be realized, with these piezoelectric driving members and the members used for displacement amount detection in the present invention being included. Therefore, a piezoelectric driving device which can be arranged between the objective lens of an erect optical microscope and a stage can be obtained.

AFMs using bimorph structures will be described next with reference to FIGS. 28 to 32.

A three-dimensional driving device for the probe of a scanning type probe microscope must be moved in the Z direction perpendicular to a sample surface while the distance between the sample surface and the probe is kept constant, and must also be scanned within a plane in the X and Y directions parallel to the sample surface to measure the uneven portions of the sample surface on the atomic order.

As a conventional driving device for the probe or a sample in a scanning type probe microscope, a tripod or tube type driving device has been used.

Figure 31:
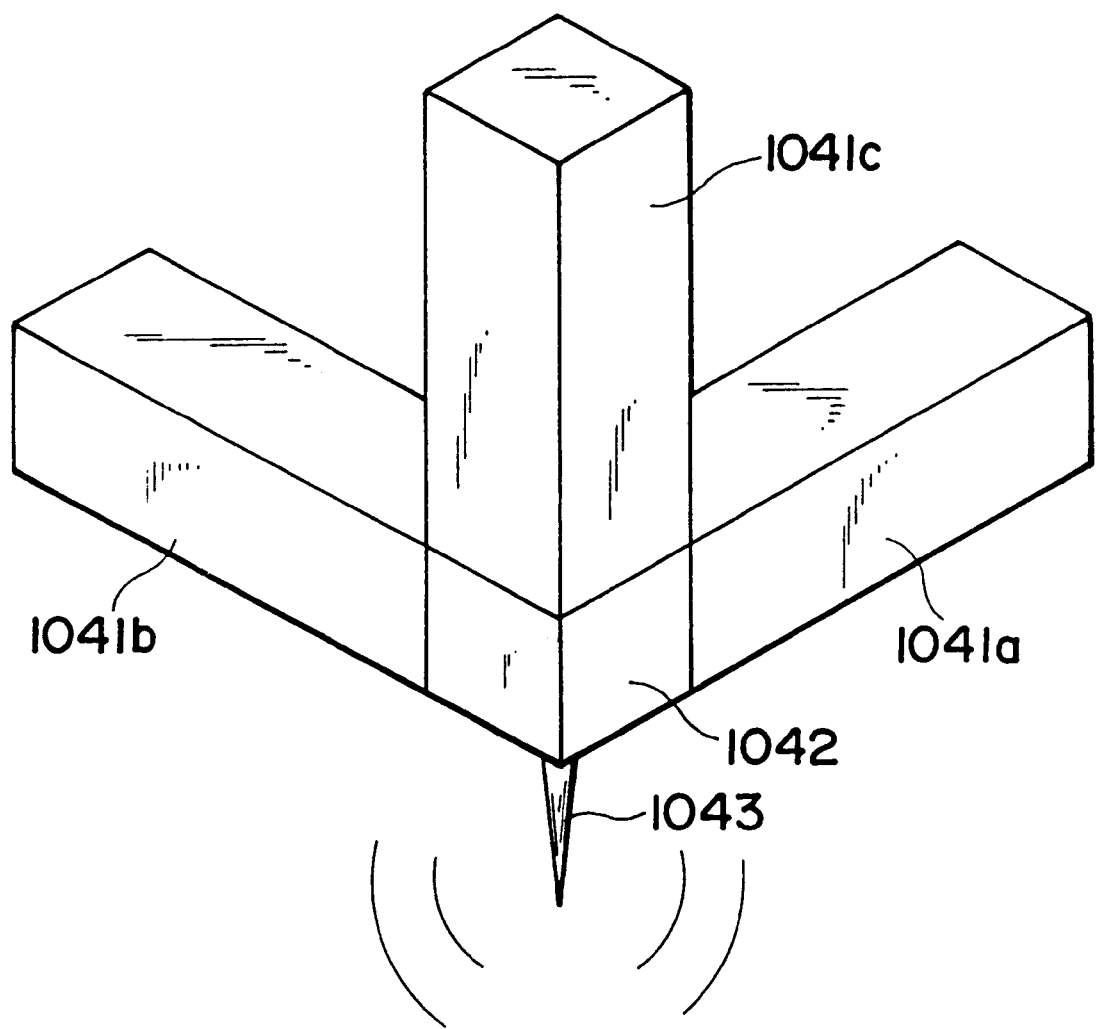
FIG. 31 is a perspective view of still another conventional scanning device.

FIG. 31 shows a tripod type driving device. The tripod type driving device has piezoelectric driving members 1041a, 1041b, and 1041c which are expandable in the X, Y, and Z directions, respectively, and are arranged on a vertex. One end of each of the three piezoelectric driving members is fixed via a block 1042. The other end of each of the piezoelectric driving members 1041a, 1041b, and 1041c is fixed to a support member. A probe 1043 is fixed to the block 1042. These piezoelectric driving members 1041a, 1041b, and 1041c freely expand/contract to move the probe 1043.

Figure 32:
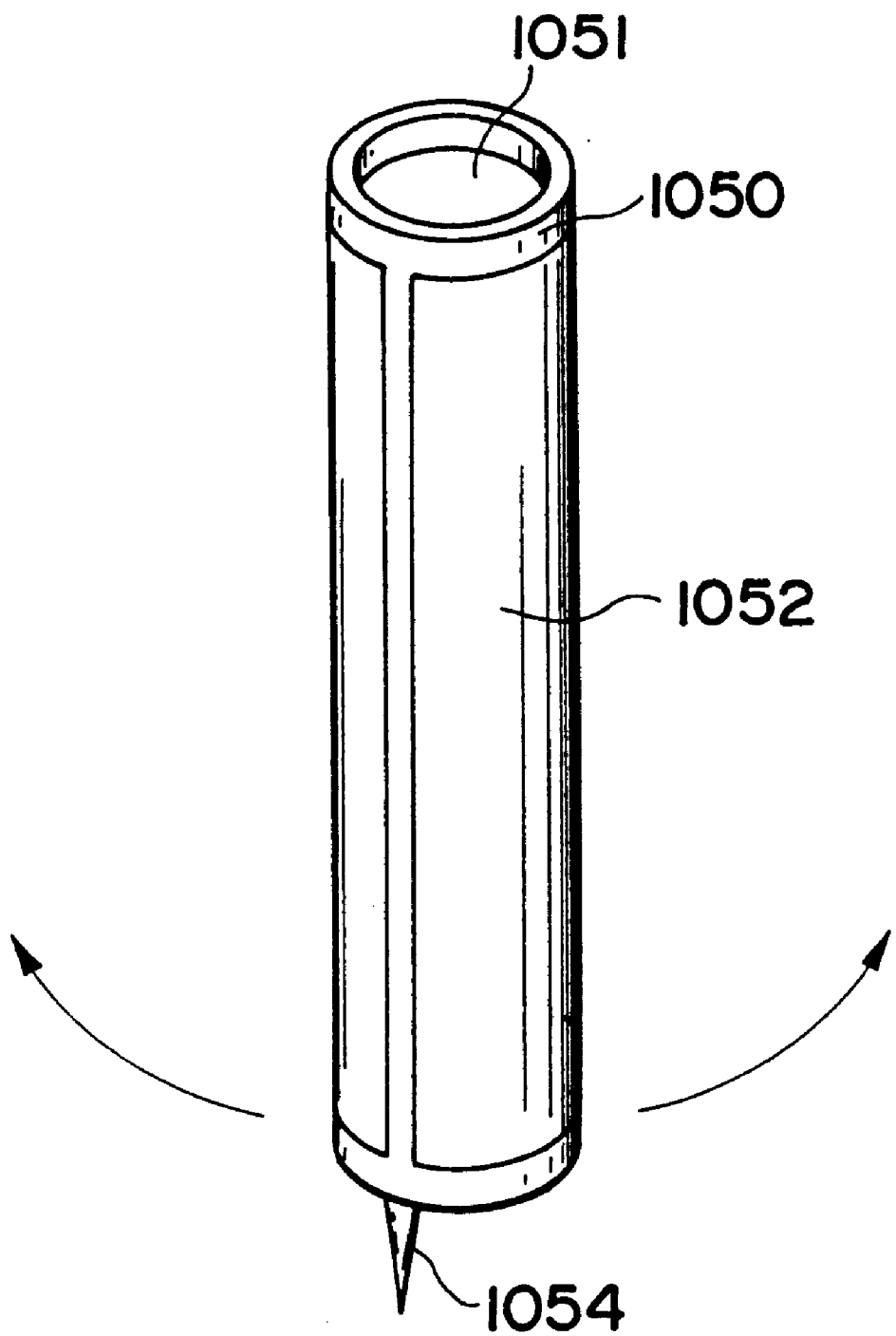
FIG. 32 is a perspective view of still another conventional scanning device.

FIG. 32 shows a tube type driving device different from the tripod type driving device. This tube type driving device has been proposed by G. Binnig (Rev. Sci. Instrum. 57(8) 1688–89, 1986). The tube type driving device is designed such that a ground electrode 1051 is formed on the inner surface of a tube type piezoelectric driving member 1050, and four divided electrodes 1052 are formed on the outer surface of the member 1050. This device is driven by the following method. Positive and negative opposite voltages are respectively applied to opposing electrodes on the outer surface to deflect the tube type piezoelectric driving member in the lateral direction (indicated by the arrows in FIG. 32). As a result, a probe 1054 is scanned/driven in the X or Y direction. The probe is driven in the Z direction by applying offsets of the same voltage to the electrodes 1052 on the outer surface to cause the tube type piezoelectric driving member to expand/contract. As a result, a fine driving operation is realized.

It is also required for the scanning type probe microscope to increase the speed of a probe scanning operation so as to observe a swift, dynamic phenomenon on a sample surface.

The above tripod type driving device requires independent piezoelectric driving members to drive the probe in the X, Y, and Z directions. That is, three piezoelectric driving members are required to drive the probe in all directions. For this reason, the probe scanning type microscope using this tripod type driving device increases in size.

Since the respective piezoelectric driving members of the above tripod type driving device are fixed to the support member, the piezoelectric driving members deflect to move the probe. For this reason, the probe cannot be moved at a high speed. Similarly, no conventional tube type driving device can scan the probe at a high speed.

Each of the devices described with reference to FIGS. 28 to 30 allows a reduction in the size of a probe driving device and is designed to provide a piezoelectric driving device capable of scanning the probe at a high speed.

This device is a piezoelectric driving device having an X-Y plane scanning member for scanning on the X-Y plane parallel to a sample surface and a Z-direction driving member which is driven in the Z direction perpendicular to the X-Y plane. The device comprises a support member, a Z-direction driving member having a plurality of Z-direction piezoelectric driving elements stacked on each other, an X-Y plane scanning/driving member arranged between the support member and the Z-direction driving member, having a plurality of X-Y plane scanning piezoelectric elements stacked on each other in a direction perpendicular to the stacking direction of the Z-direction piezoelectric driving elements and the direction in which the support member and the Z-direction driving member are connected, and having electrodes arranged on the surfaces of the X-Y plane scanning piezoelectric elements which are perpendicular to the stacking direction of the X-Y plane scanning piezoelectric elements, and an X-Y plane scanning piezoelectric driving member power supply for applying arbitrary voltages between the electrode surfaces arranged on the X-Y plane scanning piezoelectric elements.

The Z-direction driving member preferably has an electrode surface on its surface perpendicular to a probe arranged on one end of the Z-direction driving member which is located on the sample side and the stacking direction of the Z-direction piezoelectric driving elements, and a Z-direction driving member power supply for applying voltages between the respective electrodes to control the distance from the probe to the sample surface.

The X-Y plane scanning piezoelectric driving member preferably has two plate-like piezoelectric elements stacked on each other. The X-Y plane scanning piezoelectric driving member power supply preferably includes a controller section for generating signals corresponding to arbitrary expansion/contraction amounts, and a high-voltage amplifier for generating a high voltage to apply a desired voltage to each X-Y plane scanning piezoelectric element in accordance with a signal generated by the controller section.

A block for coupling the X-Y plane scanning/driving member to the Z-direction driving member is preferably arranged between the X-Y plane scanning/driving member and the Z-direction driving member.

As described above, the above problem can be solved by the piezoelectric driving device.

According to the piezoelectric driving device having the above arrangement, the probe can be moved from or to the support member by applying voltages of the same polarity to the respective piezoelectric elements of the X-Y plane scanning/driving device.

When the probe is to be moved in a direction parallel to the surface of the support member, voltages having opposite polarities may be applied to a piezoelectric element located in the moving direction and a piezoelectric element located on the opposite side thereto, or different voltages are respectively applied to a piezoelectric element located in the direction in which the probe is moved and a piezoelectric element located on the opposite side thereto.

This is because each piezoelectric element expands/contracts upon application of a voltage depending on the direction in which the voltage is applied. In addition, the volume of each piezoelectric element remains the same regardless of whether it expands/contracts. Therefore, when the distance between the electrodes decreases upon application of voltages of the same polarity to the respective piezoelectric elements, each piezoelectric element expands in a direction perpendicular to the direction in which the voltages are applied, thereby canceling out the decrease in volume.

When the distance between the electrodes increases upon application of voltages of the opposite polarity to that described above to the respective piezoelectric elements, each piezoelectric element expands in a direction perpendicular to the direction in which the voltages are applied, thereby canceling out the increase in volume.

A plurality of such piezoelectric elements are stacked on each other, and arbitrary voltages are applied to the respective piezoelectric elements, thereby moving the probe in all directions within a given plane.

If a Z-direction piezoelectric driving member is arranged on the distal end of such an X-Y plane scanning piezoelectric driving member, the position of the distal end of the probe can be changed in accordance with the uneven portions of a sample. Since this Z-direction piezoelectric driving member can be arranged on one end of the X-Y plane scanning piezoelectric driving member and is only required to be moved by an amount corresponding to the height of each uneven portion of the sample surface, a compact piezoelectric driving member can be used. If the piezoelectric driving device decreases in size, the resonance frequency of the device increases. The piezoelectric driving device, therefore, can satisfactorily follow up uneven portions which change in height at a high speed.

This device is especially effective for a scanning type probe microscope which is required to scan the probe on a sample surface having fine uneven portions at a high speed.

The AFM in FIG. 28 will be described in mode detail.

Figure 28:
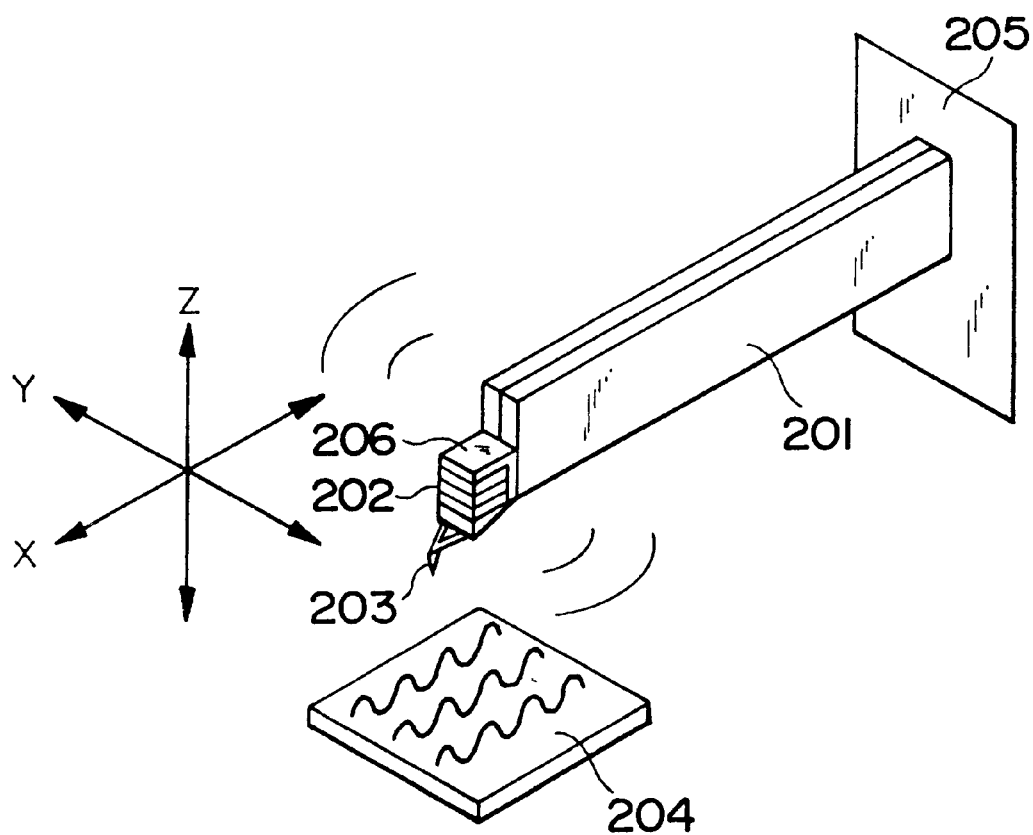
FIG. 28 is a perspective view of a bimorph type scanning device.

FIG. 28 shows the outer appearance of a piezoelectric driving device. The piezoelectric driving device of this embodiment includes a bimorph type piezoelectric driving member 201 having two piezoelectric elements bonded to each other as shown in FIG. 28 with one end of each of the elements being fixed to a support member 205, a block 206 arranged on the other end of the bimorph type piezoelectric driving member 201, a Z-direction piezoelectric driving member 202 fixed to the block 206 and having three small, thin piezoelectric elements bonded to each other, and a probe 203, arranged on the distal end of the Z-direction piezoelectric driving member 202 which is located on the sample side, for detecting an interatomic force between the probe and the sample surface. This device further includes high-voltage amplifiers A 210 and B 211 (shown in FIG. 29) for applying voltages to the bimorph type piezoelectric driving member 201. The device also has a Z-direction driving power supply (not shown) for applying a voltage to the Z-direction piezoelectric driving member 202 to control the expansion/contraction amount of the Z-direction piezoelectric driving member 202.

According to the piezoelectric driving device of this embodiment, when the probe 203 for detecting this interatomic force is sufficiently brought close to the sample surface until an interatomic force is generated, the probe 203 is scanning in a direction parallel to the sample surface to detect the interatomic force generated between a sample 204 and the probe 203. With this operation, the shape of the sample surface is measured.

The two piezoelectric elements constituting the bimorph type piezoelectric driving member 201 consists of a ceramic oxide material having a polycrystalline texture of $PbTiO_3$. More specifically, each piezoelectric element is formed by sintering a polycrystalline material. The respective piezoelectric elements are then stacked on each other by the green sheet method or the like with each element having a thickness of 20 $\mu$m to 40 $\mu$m.

As the block 206, an L-shaped member like the one shown in FIG. 28 is used. This block 206 is fixed to the bimorph type piezoelectric driving member 201 with the "L" shape being inverted, and the uppermost piezoelectric element of the Z-direction piezoelectric driving member 202 is bonded to the block 206, as shown in FIG. 28. By mounting the Z-direction piezoelectric driving member 202 via the block 206 in this manner, the Z-direction piezoelectric driving member 202 can be caused to freely expand/contract.

Figure 29:
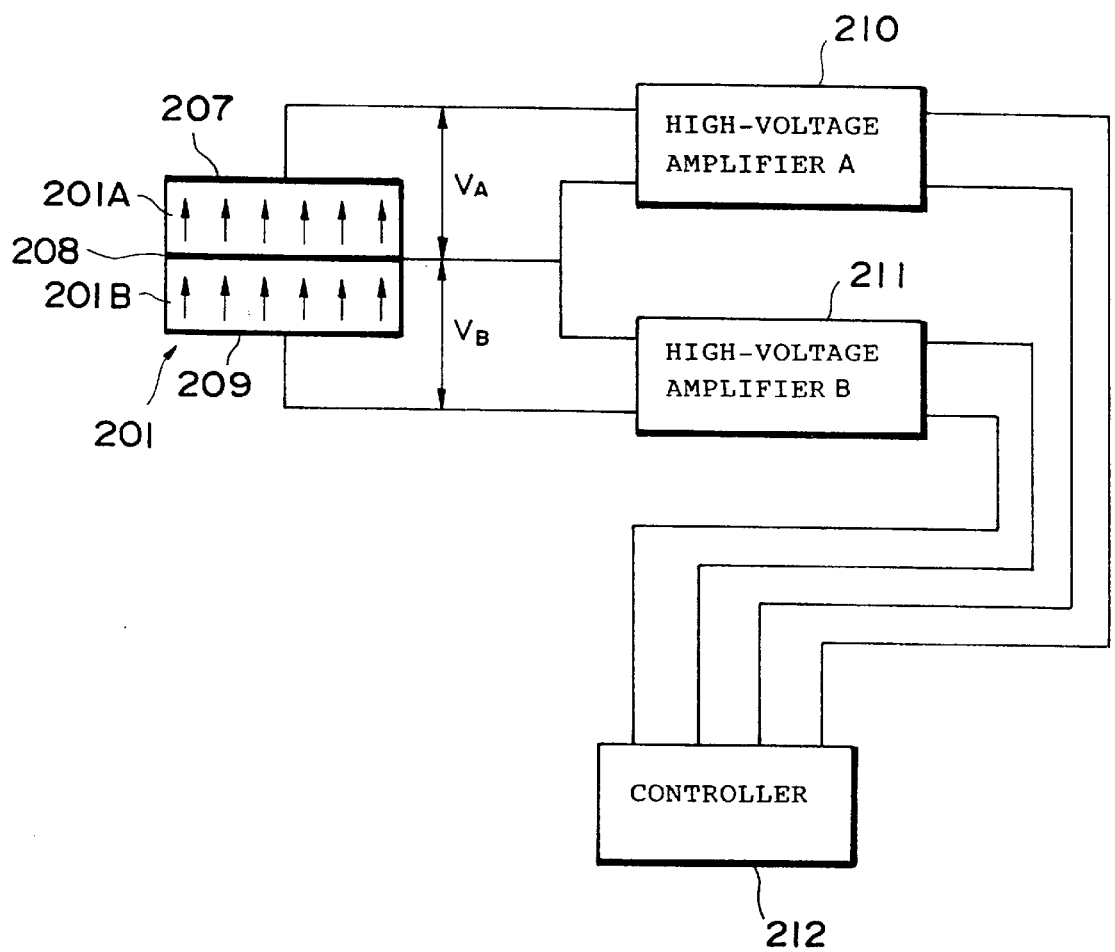
FIG. 29 is a block diagram showing a control system for the device in FIG. 28.

FIG. 29 shows a driving system for driving the bimorph type piezoelectric driving member 201. For the sake of convenience, the block 206, the Z-direction piezoelectric driving member 202, and the probe 203 are not shown in FIG. 29. FIG. 29 is a schematic view showing the characteristics of the bimorph type piezoelectric driving member 201 when viewed from above. The bimorph type piezoelectric driving member 201 is designed such that piezoelectric elements 201A and 201B are bonded to each other, and an electrode 208 is arranged therebetween. An electrode 207 is arranged on the surface of the piezoelectric element 201A which is located on the opposite side to the surface having the electrode 208 arranged thereon and is parallel thereto. An electrode 209 is arranged on the surface of the piezoelectric element 201B which is located on the opposite side to the surface having the electrode 208 arranged thereon and is parallel thereto. That is, the electrodes 207 and 208 are arranged on the two sides of the piezoelectric element 201A, and the electrodes 208 and 209 are arranged on the two sides of the piezoelectric element 201B. The high-voltage amplifier A 210 is connected to the electrodes 207 and 208 via conductive lines, and the high-voltage amplifier B 211 is connected to the electrodes 208 and 209 via conductive lines.

The high-voltage amplifier A 210 is a member for applying a desired voltage between the electrodes 207 and 208. The expansion/contraction amount of the piezoelectric element 201A is determined by the magnitude of a voltage $V_A$ applied between the electrodes 207 and 208. The high-voltage amplifier B 210 is a member for applying a desired voltage between the electrodes 208 and 209. The expansion/contraction amount of the piezoelectric element 1B is determined by the magnitude of a voltage $V_B$ applied between the electrodes 208 and 209.

These high-voltage amplifiers A 210 and B 211 are connected to a controller 212. This controller 212 controls the voltages $V_A$ and $V_B$ output from the high-voltage amplifiers A 210 and B 211.

Figure 30A:
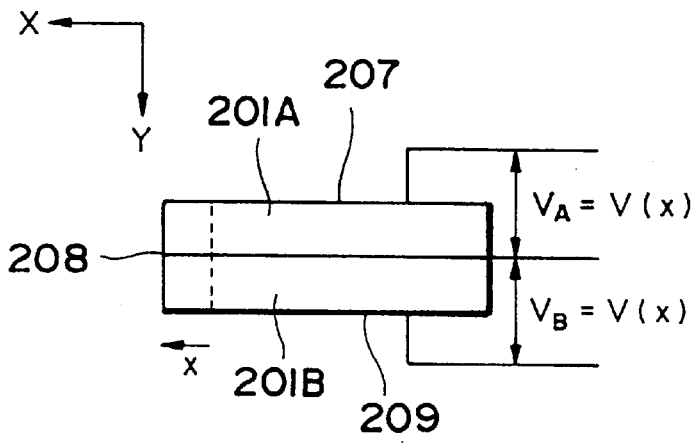
FIGS. 30A to 30C are views showing the relationship between voltages used for a scanning operation.
Figure 30B:
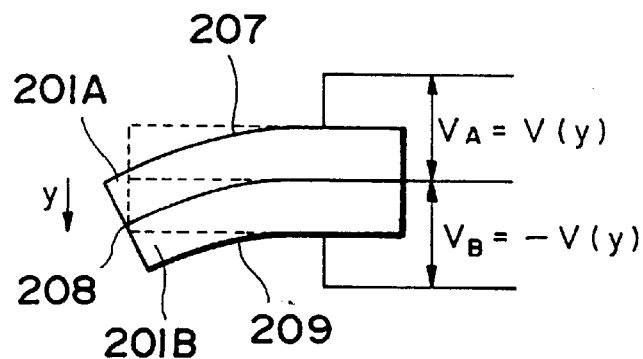

A method of driving the bimorph type piezoelectric driving member 201 will be described next with reference to FIGS. 30A to 30C. For the sake of convenience, the block 206, the Z-direction piezoelectric driving member 202, and the probe 203, which are mounted on the distal end of the bimorph type piezoelectric driving member 201, are not shown in FIGS. 30A to 30C. A case wherein the bimorph type piezoelectric driving member 201 is displaced in the X direction by a distance x will be described first. The bimorph type piezoelectric driving member 201 can be displaced in the X direction by the distance x by applying voltages V(x) corresponding to the displacement amount x and having the same polarity between the electrodes 207 and 208 arranged on the piezoelectric element 201A and between the electrodes 208 and 209 arranged on the piezoelectric element 201B, as shown in FIG. 30A. That is, the voltage $V_A$ applied between the electrodes 207 and 208 and the voltage $V_B$ applied between the electrodes 208 and 209 are respectively given by:

$$V_A = V(x) \tag{3-1}$$

$$V_B = V(x) \tag{3-2}$$

When the voltages given by equations (3-1) and (3-2) are applied between the respective electrodes, the piezoelectric elements 201A and 201B expand in the same direction by the distance x. As a result, the distal end of the bimorph type piezoelectric driving member 201 can be moved by the distance x.

When bimorph type piezoelectric driving member 201 is to be moved in the opposite direction to the X direction by the distance x, voltages −V(x) may be used as the voltage $V_A$ and $V_B$. With these voltages, the piezoelectric elements 201A and 201B contract in the same direction by the distance x. As a result, the distal end of the bimorph type piezoelectric driving member 201 can be moved by the distance x. Therefore, the probe 203 mounted on the distal end of the bimorph type piezoelectric driving member 201 via the block 206 and Z-direction piezoelectric driving member 202 can be scanned in the X direction.

A case wherein the bimorph type piezoelectric driving member 201 is displaced in the Y direction by a distance y will be described next. The bimorph type piezoelectric driving member 201 can be displaced in the Y direction by the distance y by applying voltages V(y) corresponding to the displacement amount y and having different polarities between the piezoelectric element 201A and the piezoelectric element 201B, as shown in FIG. 30B. That is, the voltage $V_A$ applied between the electrodes 207 and 208 and the voltage $V_B$ applied between the electrodes 208 and 209 are respectively given by $$V_A = V(y) \tag{3-3}$$

$$V_B = -V(y) \tag{3-4}$$

When the voltages given by equations (3-3) and (3-4) are applied between the respective electrodes, the piezoelectric element 201A expands by an amount corresponding to the voltage V(y). The piezoelectric element 201B contracts by an amount corresponding to −V(y). The piezoelectric elements 201A and 201B are firmly joined to each other. Therefore, the bimorph type piezoelectric driving member 201 is bent with the contracting piezoelectric element 201B facing downward. With the above operations, the distal end of the bimorph type piezoelectric driving member 201 can be moved in the Y direction by an amount corresponding to a distance y. Therefore, the probe 203 mounted on the distal end of the bimorph type piezoelectric driving member 201 via the block 206 and the Z-direction piezoelectric driving member 202 can be scanned in the Y direction.

When the bimorph type piezoelectric driving member 201 is to be moved in the opposite direction to the Y direction by the distance y, the voltages $V_A$ and $V_B$ are respectively set to −V(y) and V(y). with this operation, since the piezoelectric element 201A contracts and the piezoelectric element 201B expands, the bimorph type piezoelectric driving member 201 is bent with the piezoelectric element 201A facing inward. As a result, the distal end of the bimorph type piezoelectric driving member 201 can be moved by the distance y.

Figure 30C:
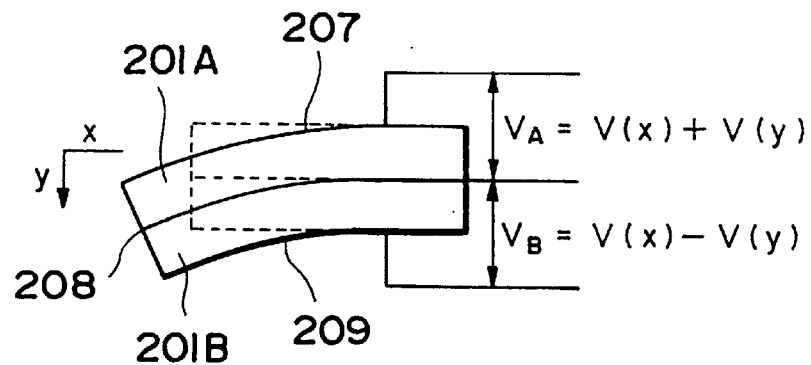

A case wherein the distal end of the bimorph type piezoelectric driving member 201 is moved in the X direction by the distance x and in the Y direction by the distance y, as shown in FIG. 30C, will be described next. This operation can be achieved by a combination of the operations shown in FIGS. 30A and 30B. A sum of the voltage V(x) for moving the distal end in the X direction by the distance x and the voltage V(y) for moving the distal end in the Y direction by the distance y is applied, as the voltage $V_A$, between the piezoelectric elements 207 and 208 of the piezoelectric element 201A. A sum of the voltage V(x) for moving the distal end in the X direction by the distance x and the voltage −V(y) for moving the distal end by in the Y direction by the distance y is applied, as the voltage $V_B$, between the piezoelectric elements 208 and 209 of the piezoelectric element 201B.

The voltages $V_A$ and $V_B$, therefore, are given as follows:

$$V_A = V(x) + V(y) \tag{3-5}$$

$$V_B = V(x) - V(y) \tag{3-6}$$

As is indicated by equations (3-5) and (3-6), by adding a voltage for causing the bimorph type piezoelectric driving member 201 to expand/contract in the X-axis direction to a voltage for bending the member in the Y-axis direction, the bimorph type piezoelectric driving member 201 can move the probe 203, arranged on the distal end of the member 201, in all directions.

The operation of the piezoelectric driving device of this embodiment in scanning the uneven shape of the sample 204 at a video rate with the probe 203 will be described next with reference to a practical example.

Assume that one image is acquired at a video rate of 30 Hz, and the probe is scanned on 256 lines per image.

In this case, the period of the displacement of the bimorph type piezoelectric driving member 201 in the Y-axis direction (the direction in which the probe 203 is moved upon deflection of the bimorph type piezoelectric driving member 201) is 30 Hz, and the period of the displacement of the bimorph type piezoelectric driving member 201 in the X-axis direction (the direction in which the probe 203 is moved upon expansion/contraction of the bimorph type piezoelectric driving member 201) is about 8 kHz (30×256= 7,680).

It is appropriate for the bimorph type piezoelectric driving member 201 capable of performing a scanning operation under the above conditions to have a resonance frequency of about 10 kHz with respect to displacement in the X-axis direction and a resonance frequency of about 230 Hz with respect to displacement in the Y-axis direction. As the bimorph type piezoelectric driving member 201 having the above resonance frequencies, a piezoelectric driving member exhibiting a displacement amount of 20 μm in the X-axis direction and a maximum displacement amount of 100 μm in the Y-axis direction is currently available.

The maximum frequency of sampling data for the Z-direction piezoelectric driving member 202 arranged on the distal end of the bimorph type piezoelectric driving member 201 is 128 times the resonance frequency in the X-axis direction. However, in consideration of visualization of actually obtained data, it is practical to perform visualization up to a frequency component having a frequency about 50 times the resonance frequency in the X direction. It suffices, therefore, for the Z-direction piezoelectric driving member 202 to have a resonance frequency of about 400 kHz, which is 50 times the resonance frequency of the bimorph type piezoelectric driving member 201 in the X-axis direction. In this embodiment, as the Z-direction piezoelectric driving member 202, a piezoelectric driving member having a resonance frequency of about 400 kHz and a maximum displacement amount of 3 μm is used.

As described above, in observing a sample with the probe under the above conditions, a piezoelectric driving member having a high resonance frequency is required as the Z-direction piezoelectric driving member 202. According to the arrangement of this embodiment, however, a piezoelectric driving member different from the bimorph type piezoelectric driving member 201 can be used for a driving operation in the Z-axis direction perpendicular to the sample surface, and a compact piezoelectric driving member can be used. For this reason, this embodiment can satisfactorily cope with such a high resonance frequency.

In the tube type piezoelectric driving device shown in FIG. 32, in order to obtain a displacement width of 20 μm, the resonance frequency associated with a driving operation in the Z direction can only be increased to about 5 kHz. This device, therefore, cannot scan the probe at a video rate based on a high-speed scanning operation as in this embodiment.

As described above, the piezoelectric driving device of this embodiment can perform a probe scanning operation corresponding to a video rate.

In addition, since a tube type piezoelectric driving device is arranged above a probe, the device cannot be arranged in an erect optical microscope such that the probe is located within the visual field of the microscope. In contrast to this, the piezoelectric driving device of this embodiment can be arranged between the objective lens and stage of an erect optical microscope in such a manner that the probe is located within the visual field of the optical microscope.

Note that a driving operation of the bimorph type piezoelectric driving member 201 in the Y-axis direction is a slow displacing operation of 30 Hz, and hence the influence of the mass of the Z-direction piezoelectric driving member 202, which is fixed to the free end of the bimorph type piezoelectric driving member 201, on a scanning operation can be neglected.

As described above, by using the piezoelectric driving device of this embodiment of the present invention, a wide probe scanning range can be ensured, and a high-speed probe scanning operation can be realized. In addition, since the piezoelectric driving device of the present invention allows a higher resonance frequency in the Z direction than a tube type piezoelectric driving device which has been widely used, the probe can be scanned at a higher speed while servo control is performed.

Although this embodiment has exemplified the atomic force microscope, the piezoelectric driving device can be used to drive the probe, of a tunnel microscope, which is constituted by a conductive member having a small distal end. In addition, the probe of the atomic force microscope can be constituted by, e.g., a cantilever portion, a stylus arranged on the distal end of the cantilever, and an optical system for detecting the displacement amount of the cantilever or a piezoelectric resistive element for detecting the displacement amount.

The bimorph type piezoelectric driving member 201 in this embodiment is obtained by stacking two piezoelectric elements on each other. However, the present invention may be applied to a piezoelectric driving member obtained by stacking two or more piezoelectric elements on each other. If, however, a piezoelectric driving member obtained by stacking two piezoelectric elements on each other is used as the bimorph type piezoelectric driving member 201, a simple arrangement can be realized, and the member can be easily curved to allow a scanning operation in a wide range. In this embodiment, the high-voltage amplifiers are respectively used for the piezoelectric elements as power supplies for driving the bimorph type piezoelectric driving member. With this arrangement, each piezoelectric element can be finely controlled, and scanning control of the probe is facilitated.

According to the arrangement of the driving device of the present invention, since a three-dimensional driving operation can be performed by using the two driving members, a compact driving device having a simple arrangement can be realized as compared with the conventional device. In addition, a scanning range almost as wide as that of a conventional scanning member can be ensured.

In a scanning/driving operation of a conventional tripod or tube type driving device, the displacements in the X, Y, and Z directions interfere with each other. An image obtained from a sample surface is distorted, as compared with the actual surface, owing to the interference between the displacements of the respective piezoelectric driving members. An AFM which can solve the above problems will be described next.

Figure 33:
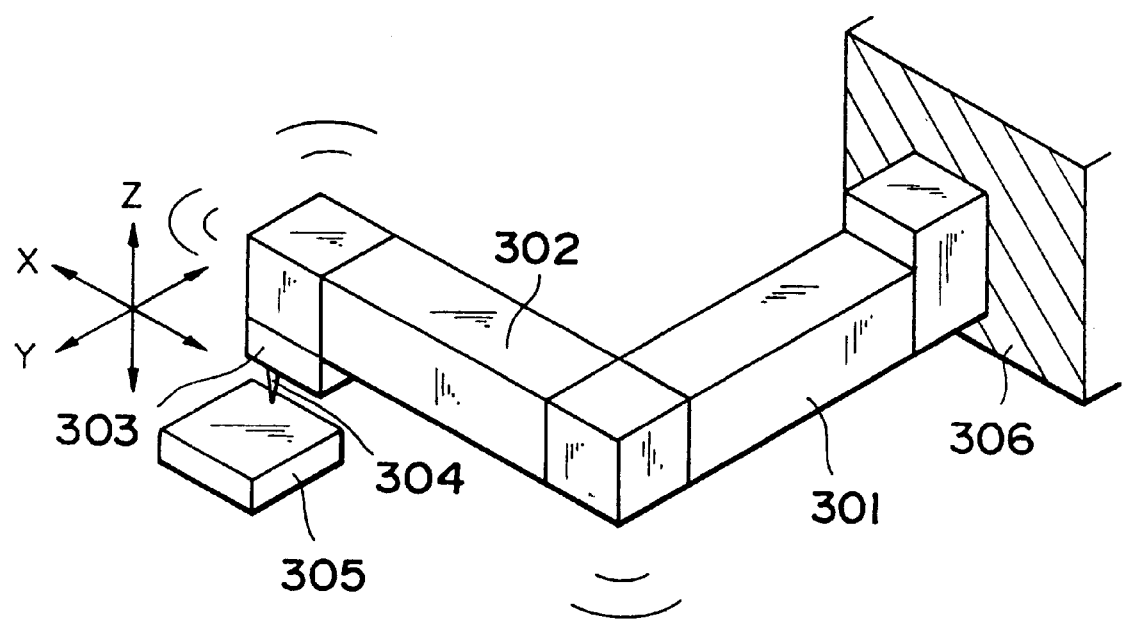
FIG. 33 is a perspective view of a cantilevered scanning device.
Figure 34:
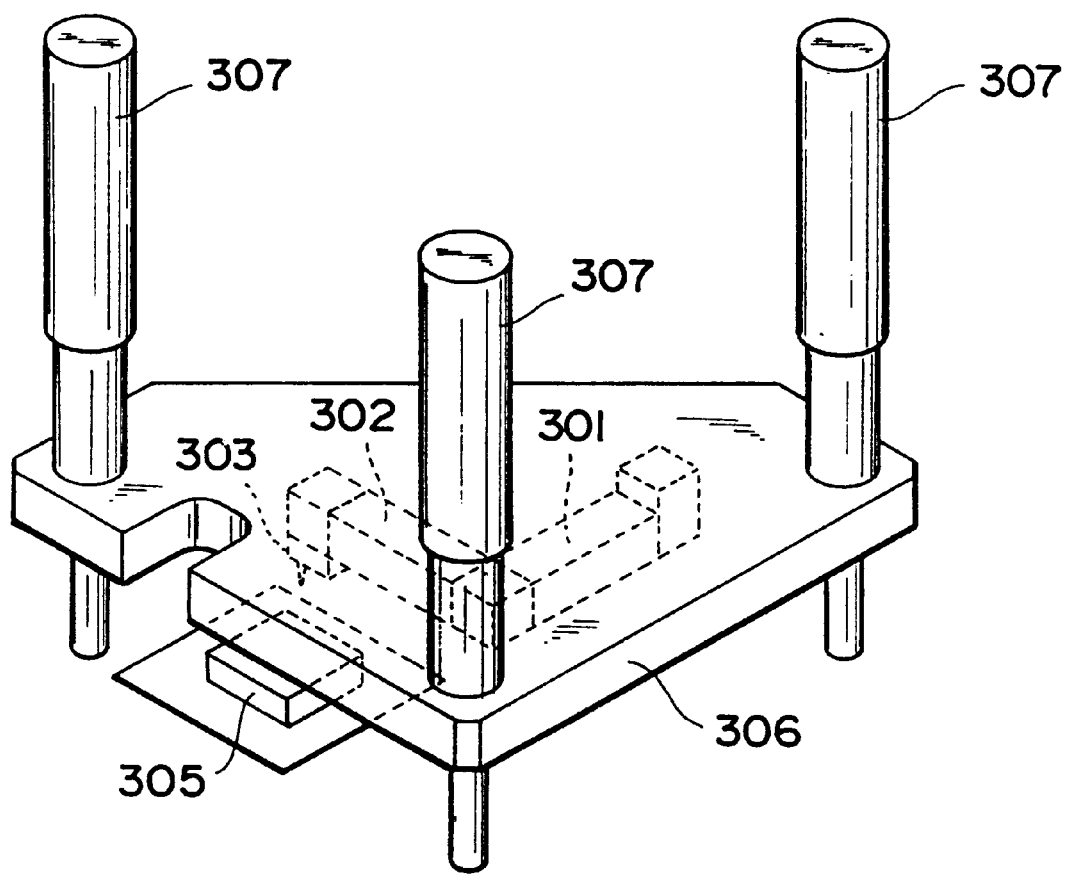
FIG. 34 is a perspective view of the main part of the atomic force microscope using the scanning device in FIG. 33.

The AFM shown in FIGS. 33 and 34 has a piezoelectric driving device which prevents interference between the displacements of piezoelectric driving members in the X, Y, and Z directions and allows a high-speed probe scanning operation.

This device will be briefly described first.

This device is characterized by comprising a first piezoelectric driving member which has one end fixed and is displaced in the Y direction, a second piezoelectric driving member which is arranged on the other end of the first piezoelectric driving member and is displaced in the X direction perpendicular to the displacing direction of the first piezoelectric driving member, a third piezoelectric driving member which is arranged on the free end side of the second piezoelectric driving member and is displaced in the Z direction perpendicular to the displacing directions of the first and second piezoelectric driving members, and a probe which is arranged on the free end side of the third piezoelectric driving member and is scanned on a sample to detect local information.

A piezoelectric driving member is the generic term for laminated piezoelectric elements and electrodes for driving them.

In order to measure the fine uneven shape of a sample surface, the control voltage is change over time. In this case, the resonance frequency of each piezoelectric driving member is a matter of concern. If the frequency component of the control voltage which changes over time is sufficiently lower than the resonance frequency of each piezoelectric driving member, a displacement with a small phase lag can be caused with a high efficiency in proportion to the amplitude of the control voltage. Therefore, as the resonance frequency of each piezoelectric driving member increases, the piezoelectric driving member can be caused to expand/contract (be displaced) with a higher efficiency at a high speed. Hence, the piezoelectric driving member can satisfactorily follow up a change in control voltage. According to the piezoelectric driving device of the present invention, no interference between displacements occurs, and the resonance frequency of the device can be increased.

This piezoelectric driving device is especially effective for a scanning type probe microscope which is required to scan the probe on a sample surface having fine uneven portions at a high speed.

The device shown in FIGS. 33 and 34 will be described in mode detail.

In this piezoelectric driving device, one end of a first piezoelectric driving member 301 which is displaced/driven in the Y-axis direction is fixed, and the other end thereof is a free end. One end of a second piezoelectric driving member 302 which is displaced/driven in the X-axis direction is fixed to the free end side of the first piezoelectric driving member 301 so as to be displaced in a direction perpendicular to the displacing direction of the first piezoelectric driving member 301. One end of a third piezoelectric driving member 303 which is displaced in the Z direction is fixed to the free end side of the second piezoelectric driving member 302 so as to be displaced in a direction perpendicular to the displacing directions of the first and second piezoelectric driving members. A probe 304 for scanning the surface of a sample 305 is arranged on the free end side of the third piezoelectric driving member 303.

Driving operations of the piezoelectric driving device in the X, Y, and Z directions will be described next.

While the first piezoelectric driving member 301 designed to be displaced in the Y direction expands/contracts in the Y direction, the second and third piezoelectric driving members 302 and 303 designed to be displaced in the X and Z directions, respectively, are only translated. For this reason, no interference occurs between the displacement in the Y direction and the displacements in the X and Z directions.

While the second piezoelectric driving member 302 designed to be displaced in the X direction expands/contracts, the third piezoelectric driving members 303 designed to be displaced in the Z direction is only translated. For this reason, no interference occurs between the displacements in the X and Z directions.

FIG. 34 shows the concept of an arrangement obtained by mounting the piezoelectric driving device of the present invention in a scanning type probe microscope.

The piezoelectric driving device of the present invention is fixed under a substrate 306 supported by three micrometers 307 for adjusting the positions of the sample 305 and the probe 304.

The operation of the piezoelectric driving device of the present invention in scanning the uneven shape of the surface of the sample 305 with the probe 304 at a video rate will be described below with reference to a practical example.

Assume that one image is sampled with 256 lines in a probe scanning operation. In this case, the video rate is 30 Hz. consequently, the first piezoelectric driving member 301 designed to be displaced in the Y direction must be scanned at 30 Hz; and the second piezoelectric driving member 302 designed to be displaced in the X direction, at about 8 kHz (30×256=7,680).

Of the currently available piezoelectric driving members, a member having a resonance frequency of about 35 kHz and a maximum displacement amount of 40 μm may be used as a member which can satisfy the requirements of resonance frequencies and allows a maximum scanning range.

Consider the resonance frequency required for the Z-direction piezoelectric driving member. When 256 data are to be sampled, the maximum frequency of sampling data is a resonance frequency 128 times the resonance frequency in the X direction. However, in consideration of visualization of actually obtained data, it is practical to perform visualization up to a frequency component having a frequency about 50 times the resonance frequency in the X direction. It suffices, therefore, for the Z-direction piezoelectric driving member to have a resonance frequency of about 400 kHz, which is 50 times the resonance frequency of the piezoelectric driving member in the X-axis direction.

Of the currently available piezoelectric driving members, a member having a resonance frequency of about 400 kHz and a maximum displacement amount of 3 μm is available as a member which can satisfy the requirements of resonance frequencies and allows a wide scanning range. By using these currently available piezoelectric driving members for the X, Y, and Z directions in the piezoelectric driving device of the present invention, a probe scanning operation can be easily performed at the video rate.

Since the second piezoelectric driving member 302, which is fixed to the fixing end 306 and is displaced/driven in the Y direction, is scanned at a relatively low speed of 30 Hz, the influences of the masses of the piezoelectric driving members 302 and 303 bonded to the free end side on a scanning operation can be neglected.

For the sake of comparison between the piezoelectric driving device of the present invention and a conventional tube type piezoelectric driving device, consider a case wherein a displacement width of 20 μm is to be obtained by using currently available piezoelectric driving members in the X, Y, and Z directions in the tube type piezoelectric driving device. The resonance frequencies in the X and Y directions are about 1 kHz, and the resonance frequency in the Z direction is about 50 kHz. For this reason, a probe scanning operation cannot be performed at a video rate.

As described above, by using the piezoelectric driving device of the present invention, a wide scanning range can be ensured, and a high-speed scanning operation can be easily performed by using currently available piezoelectric driving members.

According to the arrangement of the driving device of the present invention, driving operations in the X-, Y-, and Z-axis displacing directions do not interfere with each other. For this reason, the driving members can be easily and independently controlled/driven without requiring any correction circuit for control of driving voltages, and a wide scanning range can be ensured. Furthermore, the piezoelectric driving device of the present invention can use higher resonance frequencies than a conventional tube type piezoelectric driving device, which has been widely used, and hence can scan the probe at a higher speed.

Figure 40:
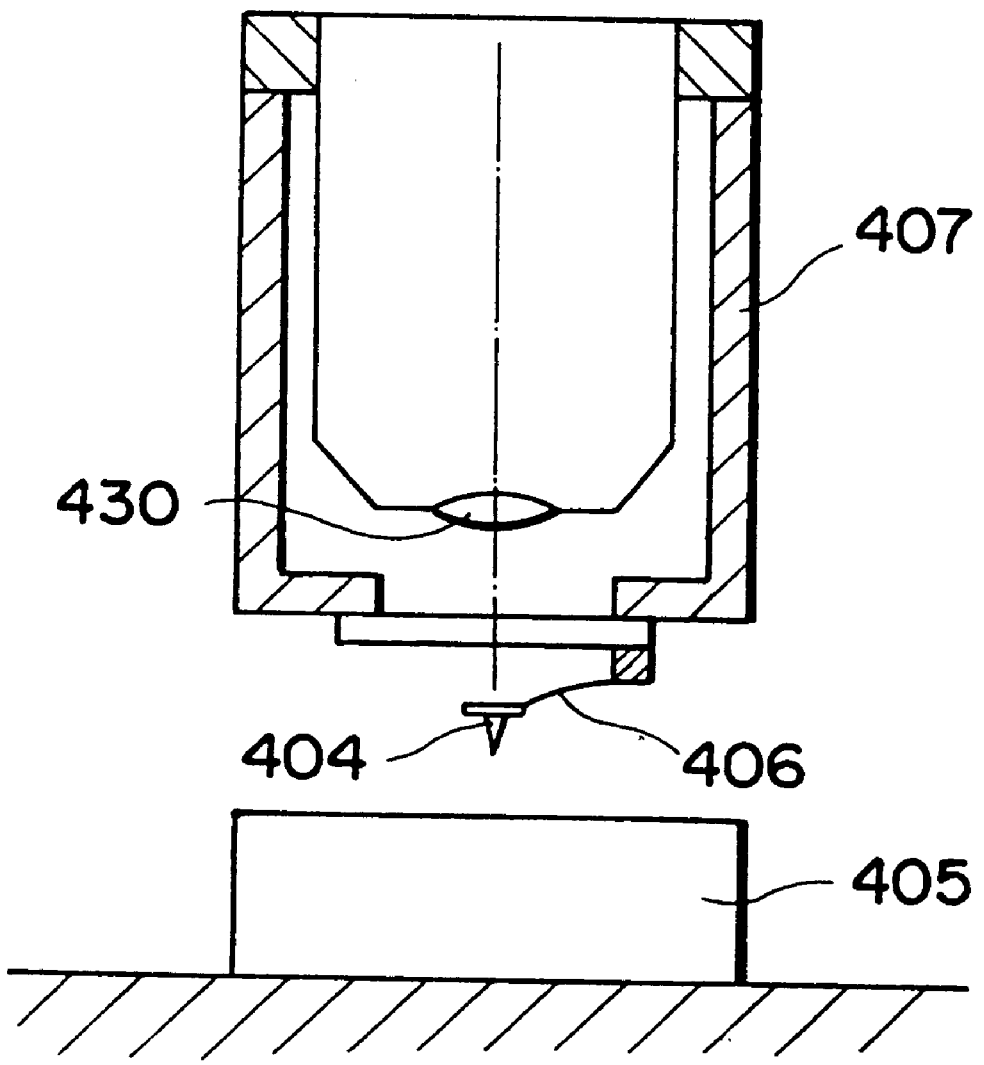
FIG. 40 is a view showing an atomic force microscope as a comparative example thereof.

FIG. 40 shows a cylindrical piezoelectric driving member disclosed in Japanese Patent Laid-Open No. 2-281103, in which an objective lens is arranged.

An atomic force microscope based on the optical lever method scans a sample. For this reason, when a sample having a large area is measured with the microscope, the resonance frequency of a piezoelectric driving member decreases to make it difficult to perform observation. In a method of scanning an overall force detection system by using the conventional optical lever method, since a large mass is inevitably scanned, a high-speed scanning operation cannot be performed. Furthermore, since a force detection laser beam is obliquely incident on a cantilever, a high measurement/detection sensitivity cannot be set.

A compact atomic force microscope which is designed to always irradiate a force detection laser beam on the cantilever during sample measurement so as to scan the probe at a high speed will be briefly described below.

This apparatus is characterized by comprising a probe for generating an interatomic force by scanning on a sample surface, a cantilever which is displaced by the interatomic force detected by the probe, a scanning means for scanning the cantilever on the sample surface, a laser source, a plurality of optical elements, arranged beside the scanning means, for irradiating a laser beam from the laser source onto the cantilever, and a photodetector for detecting light reflected by the cantilever.

This scanning means is constituted by three piezoelectric driving members in the X, Y, and Z directions. A driving operation of the scanning means will be described.

While a Y-axis piezoelectric driving member 301 expands/contracts, X- and Z-axis piezoelectric driving members 302 and 303 are translated, and hence no interference occurs. While the X-axis piezoelectric driving member 302 expands/contracts, the Z-axis piezoelectric driving member 303 is translated, hence no interference occurs. For this reason, an image obtained from the sample surface by this scanning means can be faithfully reproduced as an image of the actual state of the sample surface without being distorted.

The optical path of a laser beam for measurement is constituted by optical elements such as mirrors and prisms arranged beside the driving members, which are displaced in the respective directions, to extend along the driving members. With this arrangement, a laser beam for detection of the displacement of the cantilever is always irradiated vertically on the cantilever during sample measurement, stable measurement can performed by a probe scanning operation, which allows a high displacement measurement sensitivity, using a compact displacement measurement optical system.

As a result, measurement of a sample having a large area, which cannot be performed by a conventional sample driving/scanning technique, can be performed by using a simple probe scanning mechanism.

Some optical microscope incorporates a probe scanning type atomic force microscope to simultaneously allow optical observation and measurement. In such a conventional apparatus, however, since a laser beam cannot be directly irradiated on the cantilever, observation is performed at a position offset from the optical axis of the objective lens. For this reason, a complicated observation optical system is required. Even if, however, an optical microscope is mounted in the atomic force microscope of the present invention, measurement and observation can be simultaneously performed while an objective lens is arranged right above or below a sample without improving the optical system of the optical microscope.

This apparatus will be described in detail next with reference to FIGS. 35 to 39.

Figure 35:
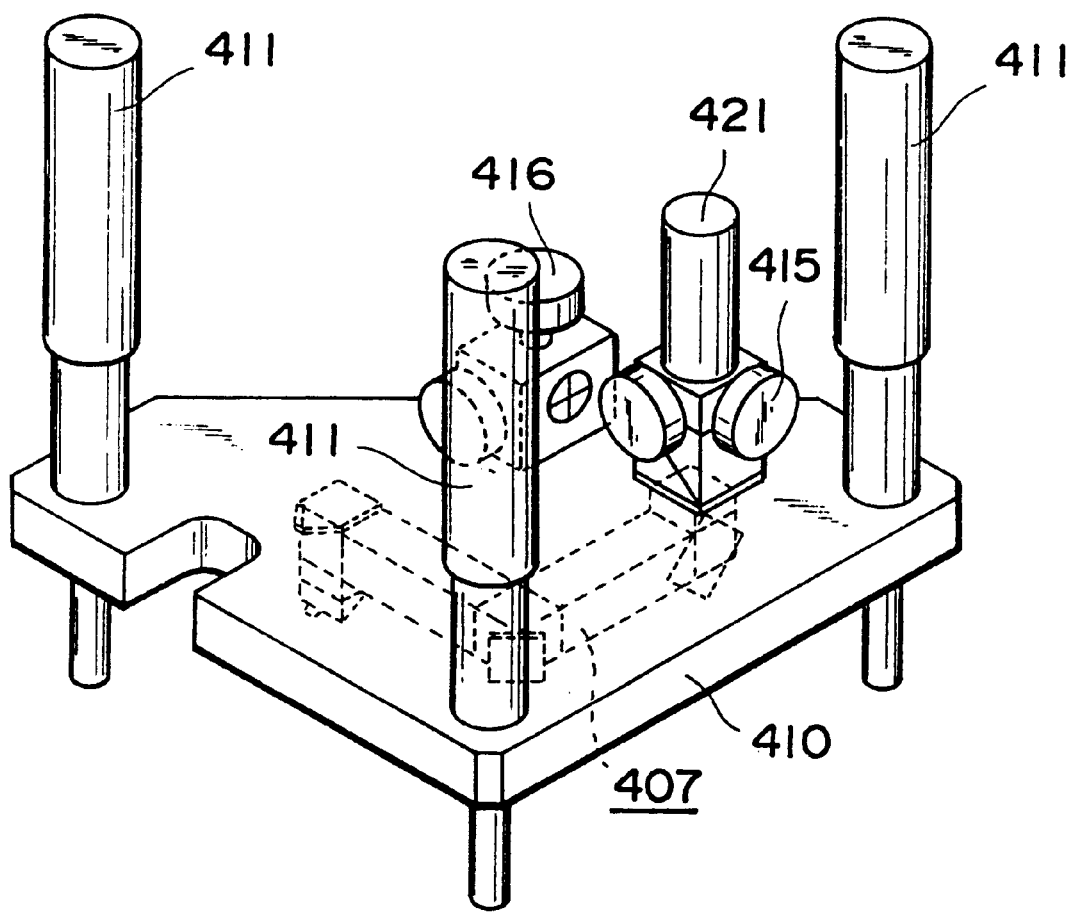
FIG. 35 is a perspective view showing an atomic force microscope including a scanning device having a mirror arranged beside a block.
Figure 36:
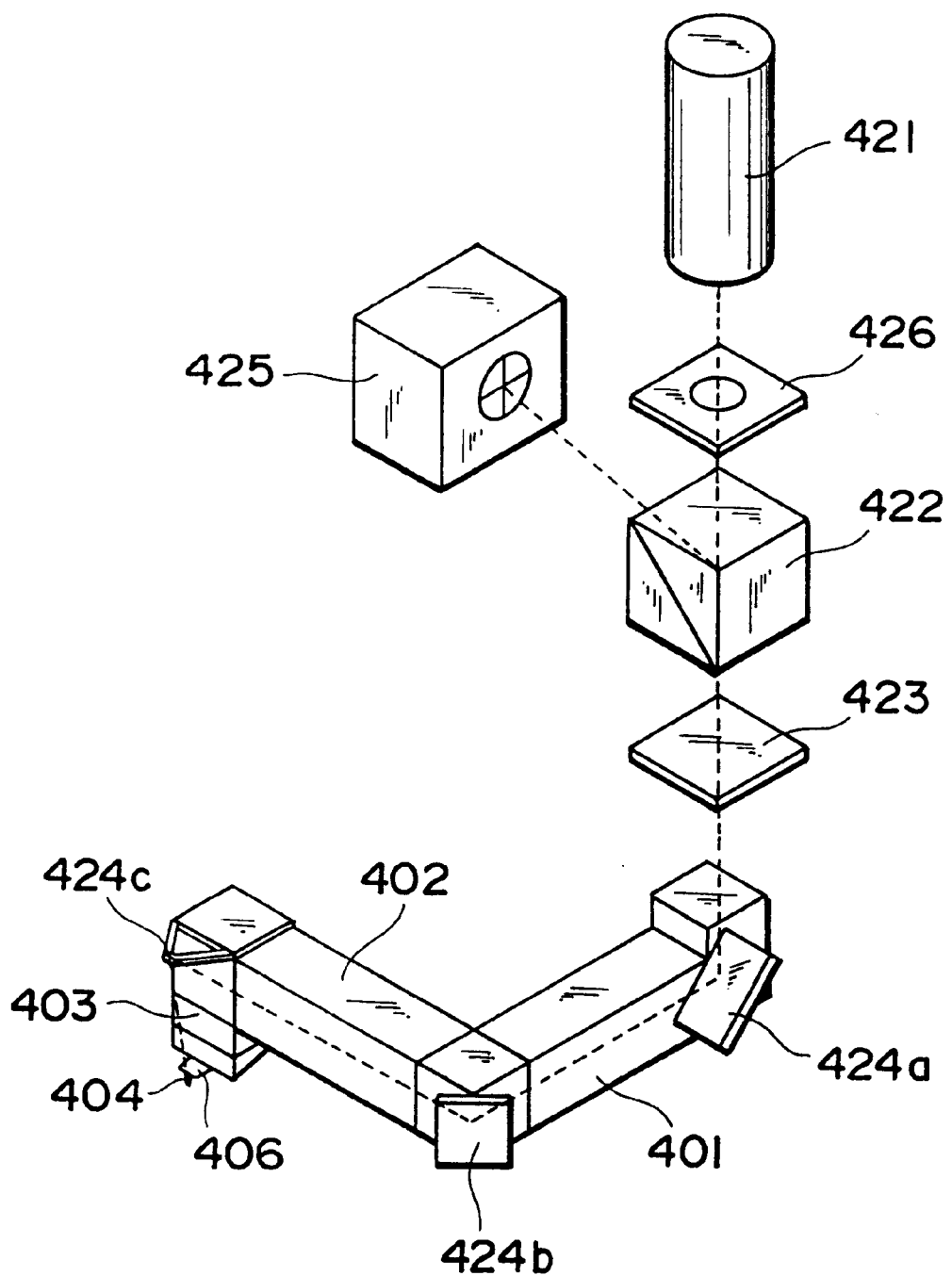
FIG. 36 is a perspective view for explaining a portion of the arrangement in FIG. 35 in detail.

FIG. 35 is a perspective view showing the overall arrangement of the atomic force microscope of the present invention. FIG. 36 shows the detailed arrangement of the atomic force microscope of the present invention.

This AFM includes a scanning means 407 under a substrate 410 supported by three micrometers 411 for adjusting the positions of a sample and the probe. The scanning means 407 is designed such that one end of a first piezoelectric driving member 401 which is displaced/driven in the Y direction is only fixed, but second and third piezoelectric driving members have free ends. A semiconductor laser 421 and a position sensor 425 of a photodetector are fixed to 2-axis fine movement mechanisms 415 and 416 fixed to a substrate 410. A polarizing beam splitter 422, a λ/4 plate 423, and the like are fixed to the substrate 410.

The atomic force microscope in FIG. 36 is constituted by the scanning means 407, a cantilever 406 for detecting a displacement in an interatomic force, and a displacement measurement optical system for measuring the displacement of the cantilever 406.

The scanning means 407 and the cantilever 406 for detecting an interatomic force are constituted by a scanning means including the first piezoelectric driving member 401 which has one end fixed and is displaced in the Y direction, a second piezoelectric driving member 402 which is arranged on the other end of the first piezoelectric driving member 401 and is displaced in the X direction perpendicular to the displacing direction of the first piezoelectric driving member 401, and a third piezoelectric driving member 403 which is arranged on the free end side of the second piezoelectric driving member 402 and is displaced in the Z direction perpendicular to the displacing directions of the first and second piezoelectric driving members, a probe 404 for generating an interatomic force on the free end side of the third piezoelectric driving member 403, and the cantilever 406 for supporting the probe 404 and detecting a displacement caused by the interatomic force.

The operation of the atomic force microscope in a case wherein the first piezoelectric driving member 401 which is to be displaced in the Y direction is driven will be described next.

The second and third piezoelectric driving members 402 and 403 arranged on the other end of the first piezoelectric driving member 401 which is displaced in the Y direction, optical elements 424b and 424c arranged beside the piezoelectric driving members, and the like are only translated in the Y direction. At this time, a laser beam is kept irradiated on the cantilever 406 via an optical element 424a and the optical elements 424b and 424c, and the position of the beam spot on the position sensor 425 does not change. When the second and third piezoelectric driving members 402 and 403, which are displaced/driven in the X and Z directions, are driven, the same operation as that described above is performed. With this arrangement, the piezoelectric driving members in the respective directions can be driven without causing any interference, and hence an image obtained from a sample surface exhibits little distortion as compared with the actual sample surface.

A displacement measuring operation of the atomic force microscope of the present invention will be described with reference to FIG. 36.

Since a laser beam from the semiconductor laser 421 is polarized, the beam is transmitted through the polarizing beam splitter 422 and is circularly polarized by the λ/4 plate 423. The laser beam is reflected by the optical element 424a such as a fixed mirror in a direction parallel to the first piezoelectric driving member 401. The laser beam is reflected by the mirror 424b fixed near the free end of the first piezoelectric driving member 401 in the same direction as that of the second piezoelectric driving member 402. The laser beam is further reflected by the mirror 424c fixed to the free end of the second piezoelectric driving member 402, which is displaced in the X direction, in a direction perpendicular to the cantilever 406. The laser beam reflected by the cantilever is reflected by the mirrors 424c, 424b, and 424a and is transmitted through the λ/4 plate 423. In this case, the plane of polarization of the semiconductor laser beam is made perpendicular to the plane of polarization of the incident laser beam by the λ/4 plate 423. The laser beam having this plane of polarization is reflected by the polarizing beam splitter 422 to be incident on the 4-division position sensor diode 425 as a detector. At this time, a reflected light component of the laser beam is transmitted through the polarizing beam splitter 422 and is incident on the semiconductor laser 421 to adversely affect the laser in terms of stability. For this reason, an optical isolator 426 is arranged in front of the semiconductor laser 421 to prevent incidence of a reflected laser beam on the semiconductor laser 421.

Figure 37:
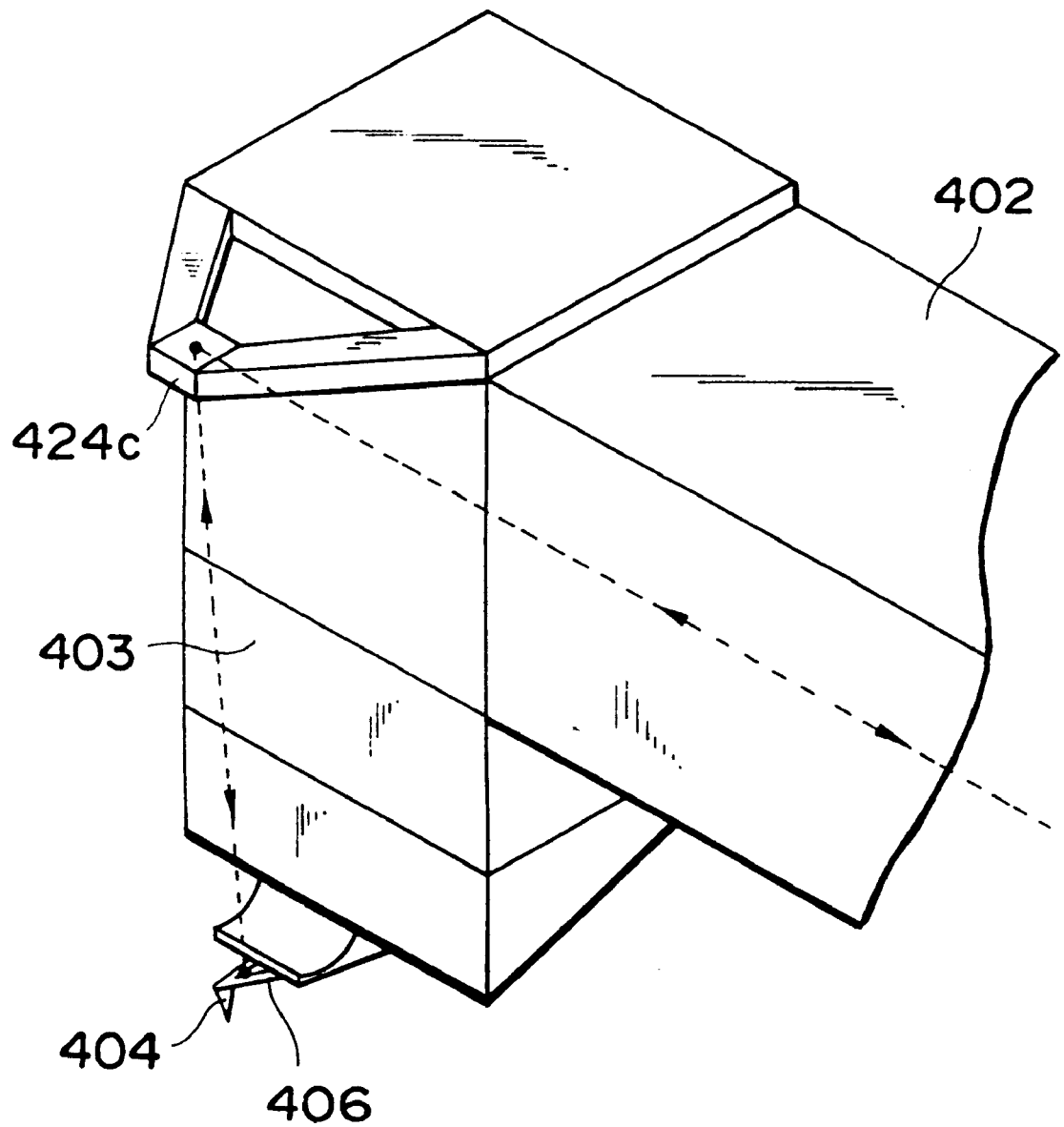
FIG. 37 is an enlarged view of a portion of the arrangement in FIG. 36.
Figure 38:
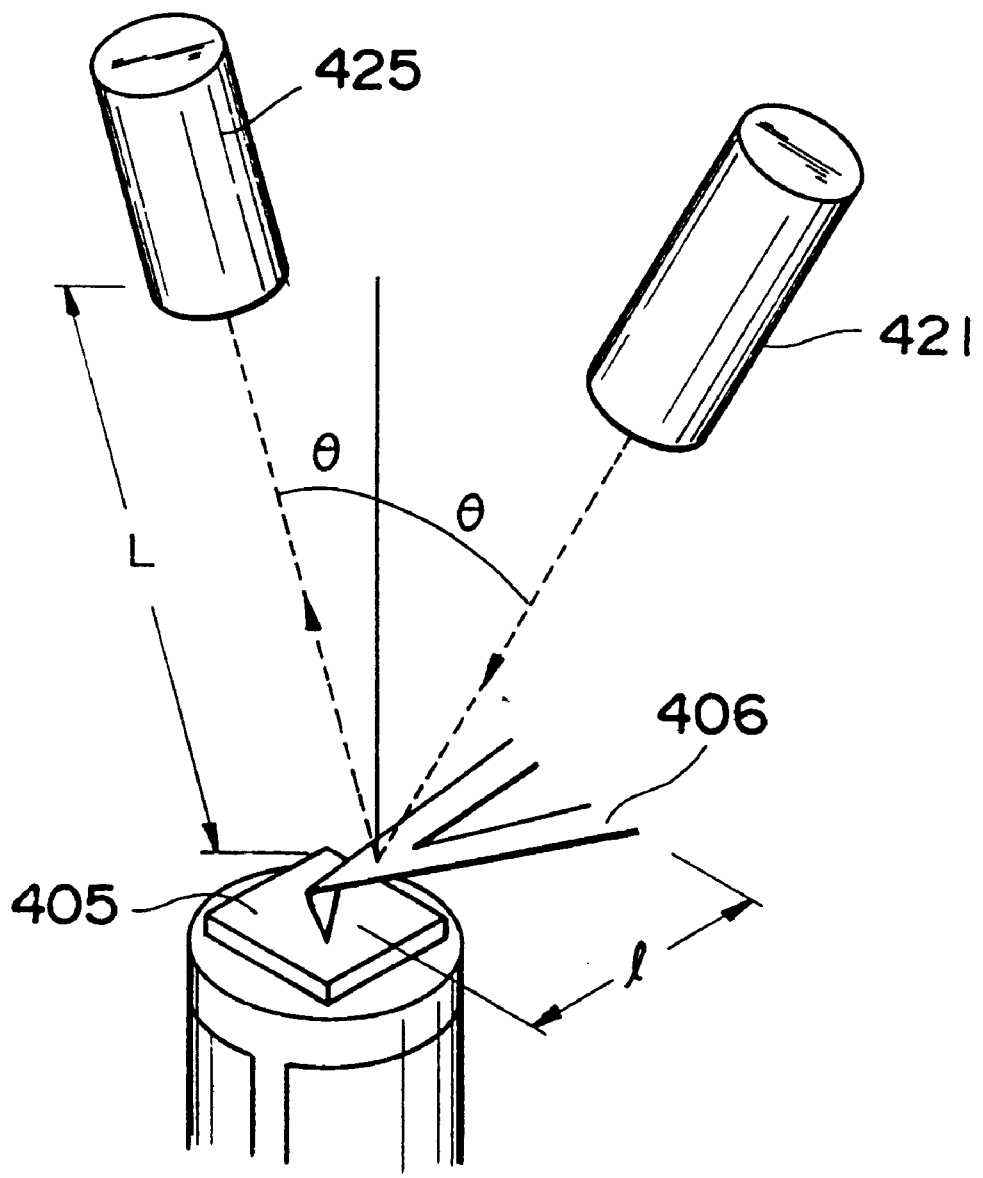
FIG. 38 is a perspective view showing the principle of an optical lever.

FIG. 37 shows the arrangement of a portion of the atomic force microscope in FIG. 36 which serves to detect an interatomic force. FIG. 37 also shows the optical path of a laser beam which is irradiated on the cantilever and reflected thereby during a probe driving operation.

A laser beam for measuring the displacement of the cantilever is incident on the displacement measurement optical system along an optical path constituted by the semiconductor laser 421 and the mirrors 424a and 424b arranged beside the first piezoelectric driving member 401 (Y direction) and the second piezoelectric driving member 402 (X direction). This incident light is reflected by the mirror 424b arranged on the free end side of the second piezoelectric driving member 402 to be irradiated on the cantilever 406 on which the probe 404 is arranged. The laser beam reflected by the cantilever is incident on the detector 425 for detecting the displacement of the cantilever via the above mirrors.

As shown in FIG. 37, the laser beam is incident on the mirror arranged on one end of the second piezoelectric driving member 402 via the mirrors arranged beside the second and third piezoelectric driving members 402 and 403. Thereafter, the laser beam is irradiated on the cantilever in the form of a spot, and the displacement of the cantilever is detected on the basis of the optical lever principle. The optical lever principle will be described below with reference to FIG. 38.

An optical lever magnification is given by the following equation:

lever magnification=2LCOSθ/l where L is the optical path length from the cantilever to the detector, θ is the incident angle of a laser beam with respect to the cantilever, and l is the length of the cantilever.

In the present invention, since a laser beam is incident on the cantilever at an almost right angle, θ=0 according to the common sense. That is, the maximum optical lever magnification can be theoretically obtained.

Figure 39:
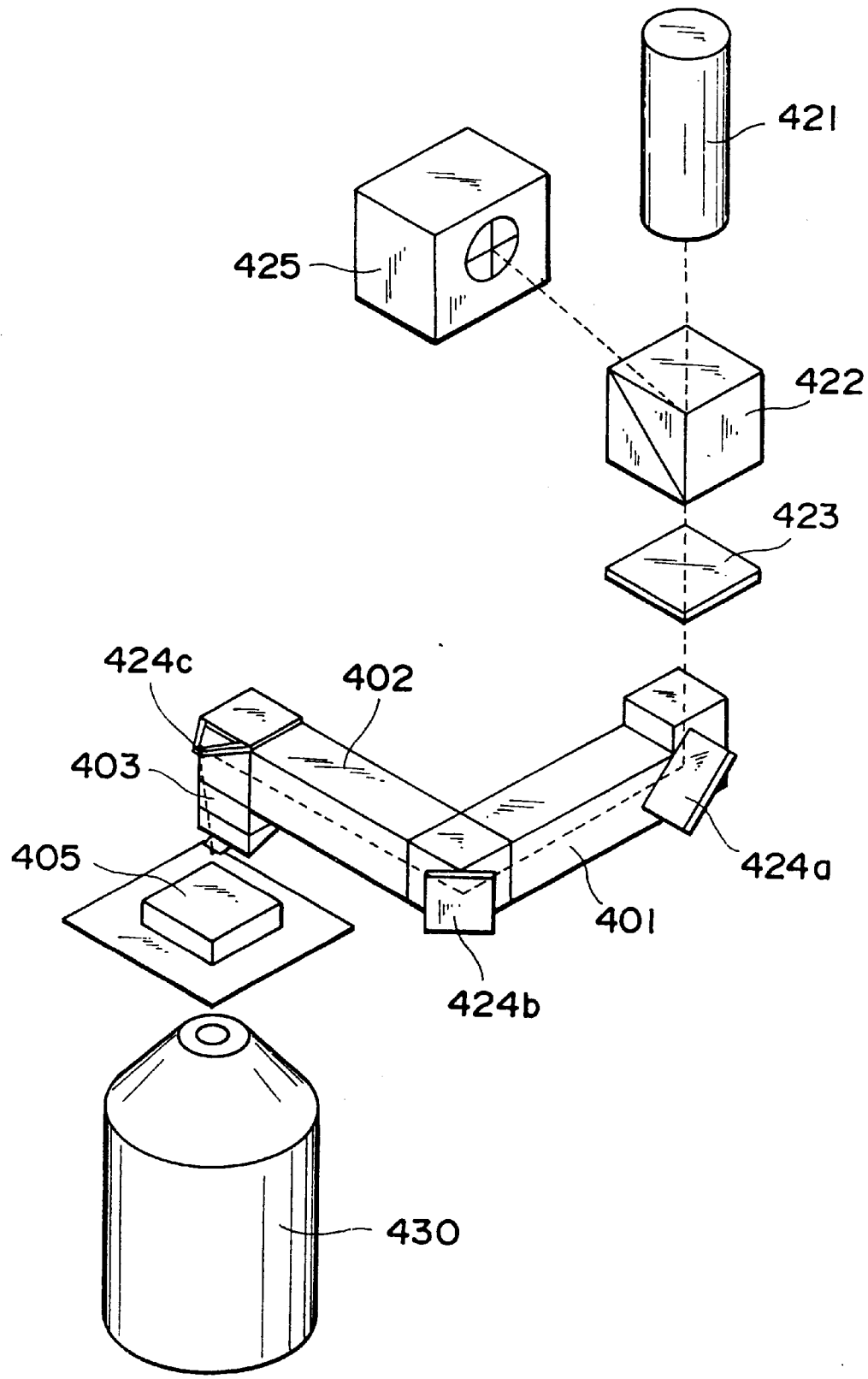
FIG. 39 is a perspective view of an atomic force microscope using an objective lens.

FIG. 39 shows an arrangement in which the atomic force microscope of the present invention is mounted in an optical microscope to observe a transparent sample such as a living sample with a high resolution. In an atomic force microscope using a conventional sample scanning scheme, a driving system must be arranged right below a sample. In contrast to this, since the atomic force microscope of the present invention uses a probe scanning scheme, an objective lens 430 is arranged right below a sample 405 to allow the user to observe the sample 405 and the probe 404 from below.

FIG. 40 is an enlarged view of a portion of an optical microscope in which a conventional probe scanning type atomic force microscope is mounted. As shown in FIG. 40, an objective lens must be arranged inside a cylindrical piezoelectric driving member to observe a sample from above. As a result, the apparatus is complicated, and a wide scanning range cannot be ensured. In some apparatus, an object lens is arranged obliquely with respect to a sample. In this method, the sample and the objective lens must be arranged at a long distance. For this reason, the numerical aperture (NA) of the lens decreases, and the resolution in optical observation decreases. In contrast to this, in the atomic force microscope of the present invention, since the object lens can be arranged right above or below a sample, not a change in the design of the optical microscope nor remodeling is required upon mounting of the atomic force microscope in the optical microscope.

In addition, the atomic force microscope of the present invention allows a compact arrangement and a wide probe scanning range as compared with a microscope whose displacement measurement optical system and driving system are conventional probe scanning type systems.

According to the present invention, since a probe scanning/driving scheme, in which a force detection laser beam is always irradiated on the cantilever during sample measurement, is used, a compact atomic force microscope having high measurement sensitivity and capable of scanning the probe at a high speed can be realized. In addition, the atomic force microscope and an optical microscope can be easily combined to allow new sample observation.

Scanning type probe microscopes have been enthusiastically developed and improved. Such a microscope is used to observe the fine structure of a sample surface by scanning a probe near the sample surface within a two-dimensional plane and detecting a tunnel current or an interatomic force acting between the sample and the probe.

The resolutions of these scanning type probe microscopes can be set to be 0.1 Å or less in the longitudinal direction and 0.5 Å or less in the lateral direction. That is, the performance of such a scanning type probe microscope cannot be fully used unless a probe driving member having a precision higher than the above resolutions is used. For this reason, a driving member using a piezoelectric element capable of causing a small displacement is widely used as the only means.

According to the scanning type probe microscope in FIG. 7, the probe 4 and the piezoelectric driving member 3 are supported by the piezoelectric driving members 1 and 2. This structure is susceptible to vibration, and hence tends to decrease in resolution.

Figure 46:
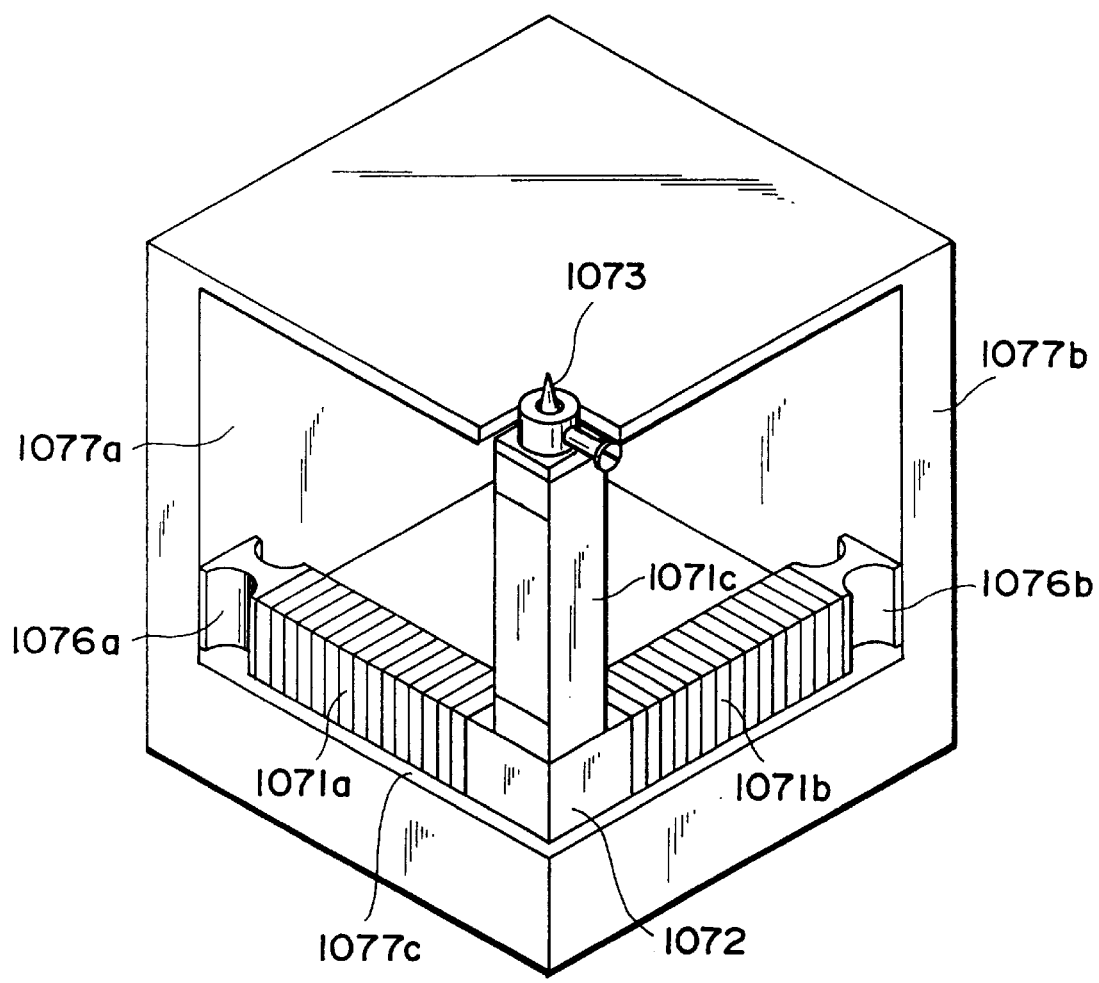
FIG. 46 is a perspective view showing a scanning device having no antivibration mechanism.

FIG. 46 shows another tripod type piezoelectric driving device which is widely used as a scanning type probe microscope. This scanning type probe microscope uses the same piezoelectric driving members as those in FIG. 7. In this microscope, however, a sample is arranged above a probe 1073. In the scanning type probe-microscope, a piezoelectric driving member 1071a which is displaced in the X direction, and a piezoelectric driving member 1071b which is displaced in the Y direction are fixed via a block 1072. The microscope also has a piezoelectric driving member 1071c which is arranged on the block 1072 and is displaced in a direction perpendicular to the sample surface. The piezoelectric driving members 1071a and 1071b are respectively fixed to support substrates 1077a and 1077b via hinges 1076a and 1076b. The piezoelectric driving members 1071a and 1071b and the block 1072 are supported in contact with a support member 1077c arranged thereunder. When the probe 1073 is scanned parallel to the sample surface, the piezoelectric driving members 1071a and 1071b and the block 1072 are slid along the support member 1077c. Therefore, the probe in this structure does not easily vibrate as compared with the scanning type probe microscope shown in FIG. 7.

In the scanning type probe microscope shown in FIG. 46, however, undesired friction is caused in a probe scanning operation.

In the scanning type probe microscope using the above tripod type piezoelectric driving device, however, the probe tends to vibrate. For this reason, the probe easily vibrates in the vertical direction owing to the influence of external vibration, resulting in a decrease in resolution.

In a structure in which the probe faces upward, and the piezoelectric driving members and the like are in contact with a given wall to support the probe side, friction is caused when the probe is moved in a direction parallel to a sample surface. As a result, a load acts on the piezoelectric driving device itself.

Each of the antivibration mechanisms to be described with reference to FIGS. 41 to 46 is designed to prevent the probe from easily vibrating and also prevent a load from acting on each piezoelectric driving member in a scanning type probe microscope whose probe is driven by a tripod type piezoelectric driving device.

The apparatuses having these antivibration mechanisms will be briefly described first.

Each of these apparatuses includes a driving device for moving a probe. The driving device includes a driving device support member for supporting the driving device, an X-Y plane driving member which has one end supported by the driving device support member and is driven in a direction parallel to a sample surface, a Z-direction driving member which is arranged on the other end of the X-Y plane driving member and is displaced in a direction perpendicular to the sample surface, and a probe, arranged on the Z-direction driving member, for detecting the shape of the sample surface. Each apparatus further includes a support and an antivibration member consisting of an elastic material. One end of the antivibration member is fixed to the support, and the other end of the antivibration member is fixed to the other end of the X-Y plane driving member.

It is preferable that a crossbeam be arranged on the X-Y plane driving member to extend from its the other end, a support member be used to fix the antivibration member to the upper or lower side of the crossbeam, and the antivibration member be arranged between the crossbeam and the support. The crossbeam extending from the other end of the X-Y plane driving member is preferably parallel to the sample surface.

It is also preferable that support members for the support be arranged on the upper and lower sides of the crossbeam, and antivibration members be fixed between the upper support portion and the crossbeam and between the lower support portion and the crossbeam in a direction perpendicular to the sample surface. The support is preferably fixed to the driving device support member.

The antivibration member preferably has a hard plate arranged in an elastic element to be parallel to the sample surface. The antivibration member preferably has a structure in which elastic elements and hard plates are alternately stacked on each other in a direction perpendicular to the sample surface.

The X-Y plane driving member and the Z-direction driving member preferably consist of piezoelectric elements.

This apparatus includes a driving device for moving a probe. The driving device includes a driving device support member for supporting the driving device, an X-Y plane piezoelectric driving member which has one end supported by the driving device support member and expands/contracts in a direction parallel to a sample surface, a Z-direction driving member which is arranged on the other end of the X-Y plane piezoelectric driving member and expands/contracts in a direction perpendicular to the sample surface, and a probe for detecting the shape of the sample surface. The apparatus further includes a support having two flat support plates, a crossbeam fixed to the X-Y plane piezoelectric driving member and arranged between the two flat support plates, and spherical elements respectively arranged between the crossbeam and the flat support plates, each of the spherical elements having a diameter equal to the distance from a corresponding one of the flat support plates to the crossbeam. Each spherical element is preferably a steel ball.

In a driving device having one end fixed to a frame and the other end to which a probe is fixed, since the end to which the probe is fixed is a free end, the device tends to be affected by external vibrations.

For this reason, the end to which the probe is fixed is fixed to a support via an elastic element. With this arrangement, even if vibrations are produced, the elastic element absorbs the vibrations.

The probe, therefore, is not easily vibrated to prevent a decrease in the resolution of the scanning type probe microscope. Although the probe is moved on a plane parallel to a sample surface, since the probe is supported by the elastic element, the elastic element can be deformed accordingly. No problems, therefore, are posed in the movement of the probe.

The most influential vibrations are vibrations produced in a direction perpendicular to the direction in which the probe is supported. For this reason, this elastic element is fixed in a direction perpendicular to the sample surface with the crossbeam extending from the free end side of the driving member and the support. With this arrangement, vibrations in the Z direction can be effectively absorbed, and the probe can be smoothly moved on the X-Y plane for the following reasons. If the elastic element is fixed perpendicular to the sample surface, the elastic member can absorb vibrations in the Z direction most efficiently. In addition, even if the probe moves in the X or Y direction, the elastic element can be deformed most easily in the same direction.

By arranging elastic elements on the upper and lower sides of the crossbeam extending from the free end side of the piezoelectric driving member, vibrations in the Z direction can also be absorbed.

If hard plates are added to the above elastic elements, the influences of vibrations can be further reduced.

An elastic element is basically a material which is more deformable than a hard element. For this reason, the elastic element tends to expand/contact owing to the gravitational forces acting on the piezoelectric driving member and the probe, and greatly expands/contracts owing to vibrations. If a hard plate is arranged on the elastic element, the expansion/contraction amount of the elastic element (corresponding to the length from the end fixed to the crossbeam and the end fixed to the support) decreases.

With this arrangement, the elastic element does not easily expand/contract even under the influences of the gravitational forces acting on the driving member and the probe and vibrations, and hence the distance between the distal end of the probe and the sample surface can be kept constant.

The present invention is especially suitable for a scanning type probe microscope for detecting the fine uneven portions of a sample surface. Since this scanning type probe microscope is used to detect an uneven shape having a size of several nm, a piezoelectric element capable of controlling a small displacement is preferably used as a driving member. In addition, if a piezoelectric driving element having a plurality of piezoelectric elements stacked in a displacing direction is used, the displacement amount increases to allow the driving device to scan the prove on a relatively large sample surface.

According to the present invention, the same effects as those described above can be obtained by inserting steel balls between the other end of the piezoelectric driving member and the flat support plates arranged above and below the other end to keep the distal end of the probe and the sample surface at predetermined positions. This is because when the piezoelectric driving member is driven in a direction parallel to the sample surface, the free end of the piezoelectric driving member is always supported by the steel balls and the flat support plates in a direction perpendicular to the sample surface while the steel balls are rolling.

The apparatuses in FIGS. 41 to 46 will be described in more detail next.

Figure 41:
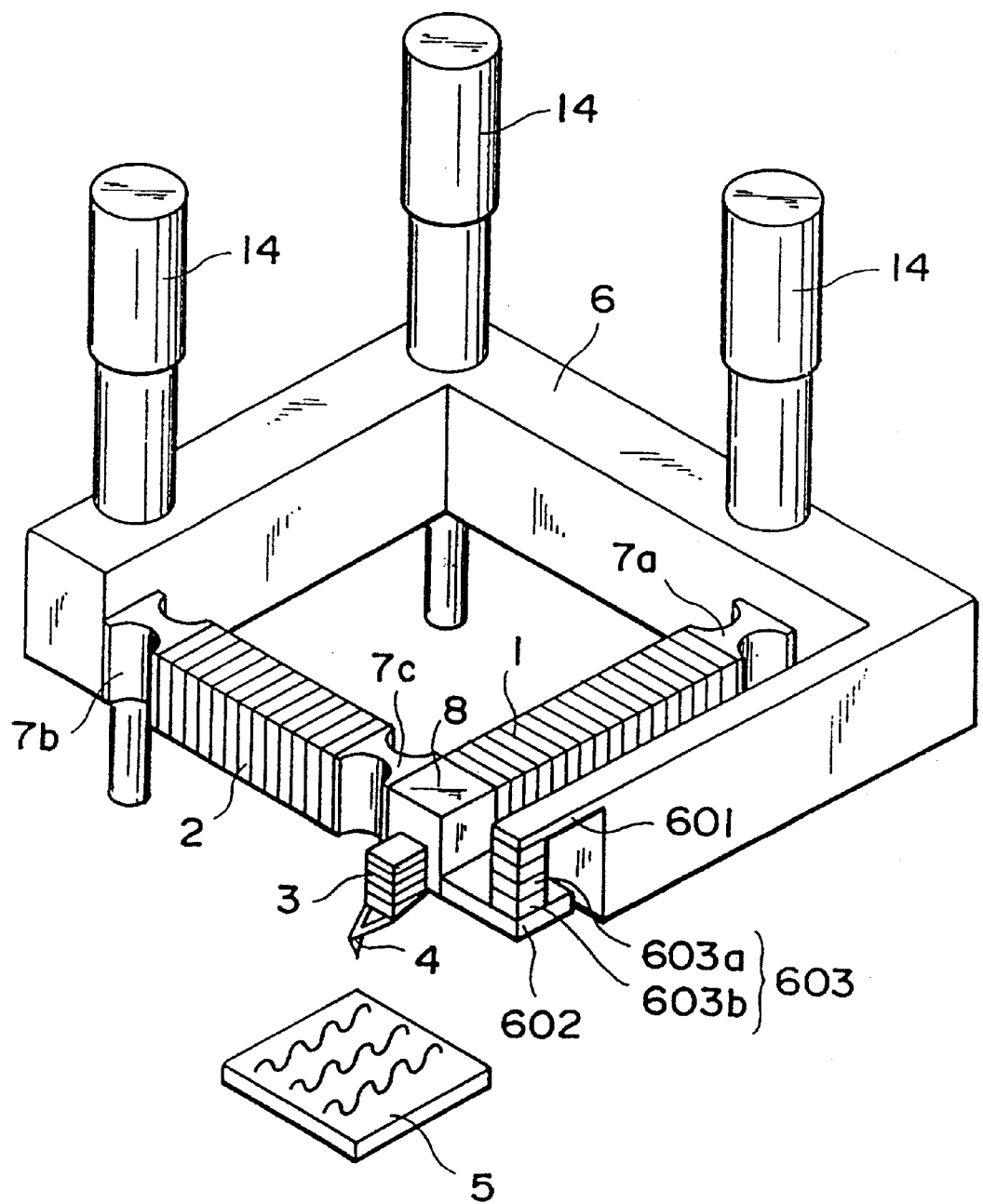
FIG. 41 is a perspective view of an atomic force microscope including an antivibration mechanism.

FIG. 41 is a perspective view of the overall arrangement of a piezoelectric driving device for the probe of an atomic force microscope according to the first embodiment of the present invention.

This piezoelectric driving device includes an X-direction piezoelectric driving member 2 which has one end fixed to a frame 6 via a hinge 7b and is displaced in the X direction parallel to a sample surface 5, and a Y-direction piezoelectric driving member 1 which has one end fixed to the frame 6 via a hinge 7a and is displaced in the Y direction parallel to the sample surface 5 and perpendicular to the X direction.

The X-direction piezoelectric driving member 2 is obtained by stacking a plurality of piezoelectric elements in the X direction. When voltages are applied to the respective piezoelectric elements, the X-direction piezoelectric driving member 2 expands/contracts in the X direction. The Y-direction piezoelectric driving member 1 is obtained by stacking a plurality of piezoelectric elements in the Y direction. When voltages are applied to the respective piezoelectric elements, the Y-direction piezoelectric driving member 1 expands/contracts in the Y direction. The other end of the X-direction piezoelectric driving member 2 is fixed to a block 8 via a hinge 7c. These piezoelectric driving members are accurately displaced by small distances and can be easily controlled, and hence are very effective as driving members for the probe of a scanning type probe microscope.

The other end of the Y-direction piezoelectric driving member 1 is fixed to the block 8. A Z-direction piezoelectric driving member 3 which is displaced in the Z direction perpendicular to the sample surface 5 is fixed to the block 8. A probe 4 is arranged on the end of the Z-direction piezoelectric driving member 3 which is located on the sample surface side. In this piezoelectric driving device, the block 8 serves as a kind of free end.

The probe 4 is the probe of the atomic force microscope. The deflection amount of the probe 4 changes in accordance with an interatomic force generated between the distal end of the probe 4 and the sample. The probe 4 measures this change amount to measure the uneven shape of the sample surface.

A free end support crossbeam 602, which is a plate parallel to the sample surface 5, is arranged on the block 8. A free end flat support plate 601 fixed to the frame 6 is arranged above the free end support crossbeam 602. A free end support member 603 obtained by alternately stacking elastic elements 603a and hard plates 603b on each other is arranged between the free end support crossbeam 602 and the free end flat support plate 601. The elastic elements 603a and the hard plates 603b are preferably adhered each other. One end of the free end support member 603 is fixed to the free end flat support plate 601, and the other end of the member 603 is fixed to the free end support crossbeam 602. The free end support member 603 is arranged between the free end flat support plate 601 and the free end support crossbeam 602 such that the axis of the member 603 is almost parallel to the Z direction. The frame 6 is supported on a stage, on which the sample is placed, by micrometers 14. The sample 5 and the probe 4 can be kept close to each other in advance by adjusting the micrometers 14.

This free end support member 603 is designed such that the elastic elements 603a and the hard plates 603b are alternately stacked on each other to be almost parallel to the sample surface 5. Polymer elastic element such as silicone rubber having a hardness of 50 Hs (Shore hardness) is used for the elastic element 603a, and a stainless steel band having a thickness of 0.1 mm is used for the hard plate 603b. The structure obtained by stacking the elastic elements 603a and the hard plates 603b in this manner can be smoothly deformed in a direction perpendicular to the stacking direction (Z direction), but is hardly deformed in the stacking direction. In order to effectively use this effect, the free end support crossbeam 602 and the free end support member 603 are arranged parallel to the sample surface 5.

Figure 42:
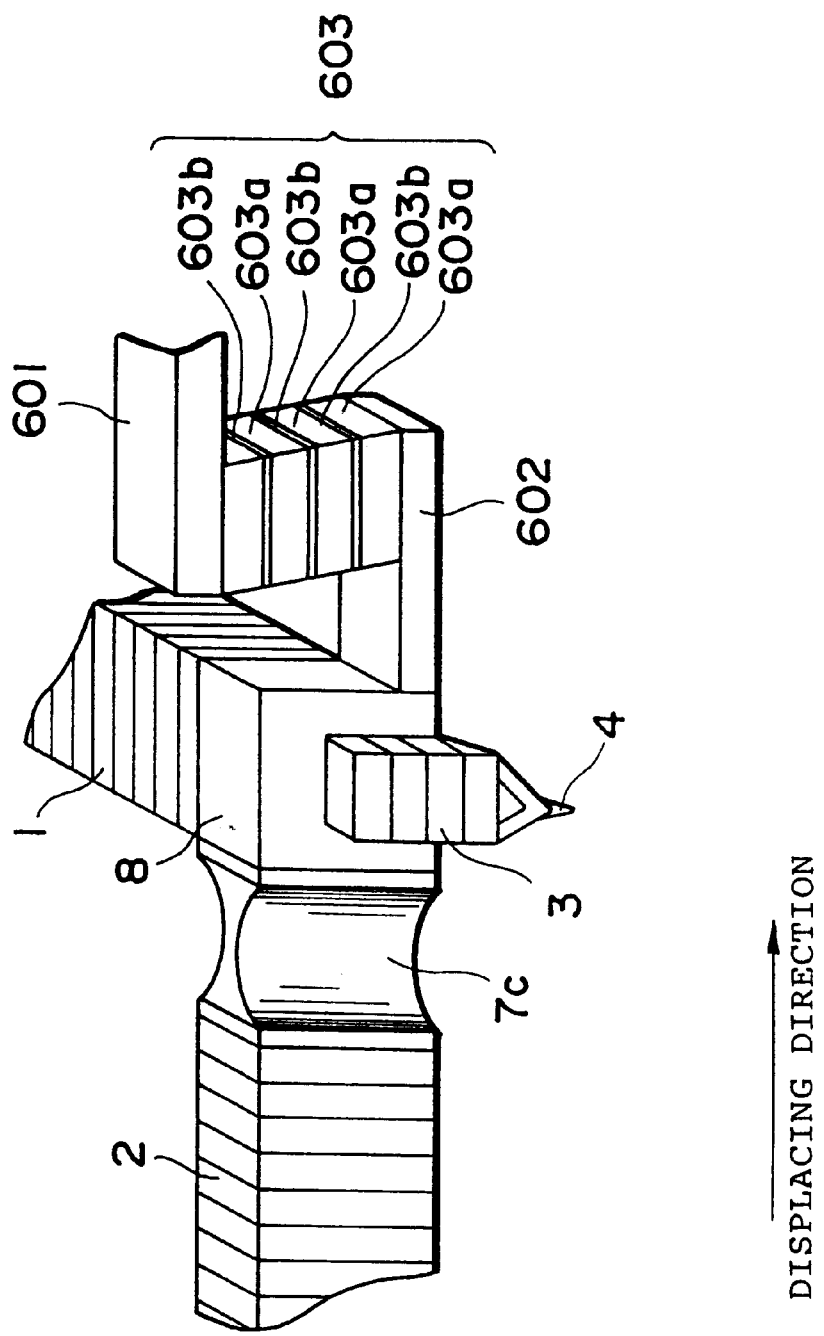
FIG. 42 is a perspective view showing the antivibration mechanism in detail.

FIG. 42 shows a state wherein the X-direction piezoelectric driving member 2 expands and the free end support member 603 is deformed. FIG. 42 shows how the X-direction piezoelectric driving member 2 expands to generate a force in the later direction. This force acts as a shearing force on each elastic element 603a of the free end support member 603. As a result, the free end support member 603 is deformed in the lateral direction.

When vibrations are generated and the resultant force acts on the free end support member 603 in the Z direction, each elastic element 603a is compressed by the stress in the longitudinal direction. However, since the hard plates 603b having a high tensile strength are inserted between the elastic elements 603a, the compression amount of each elastic element 603a can be suppressed to a small amount.

As described above, the above mechanism can eliminate vibrations in the Z direction without interfering with a scanning operation of the probe in the horizontal direction.

Assume that the X- and Y-direction piezoelectric driving members 2 and 1 for substantially supporting the probe 4 are insufficient in rigidity and hence tend to deflect. Even in this case, since this piezoelectric driving device includes the free end support crossbeam 602 and the free end flat support plate 601, together with the free end support member 603 arranged therebetween, the device can also serve as a guide capable of keeping a constant positional relationship with respect to the sample surface 5.

Figure 43:
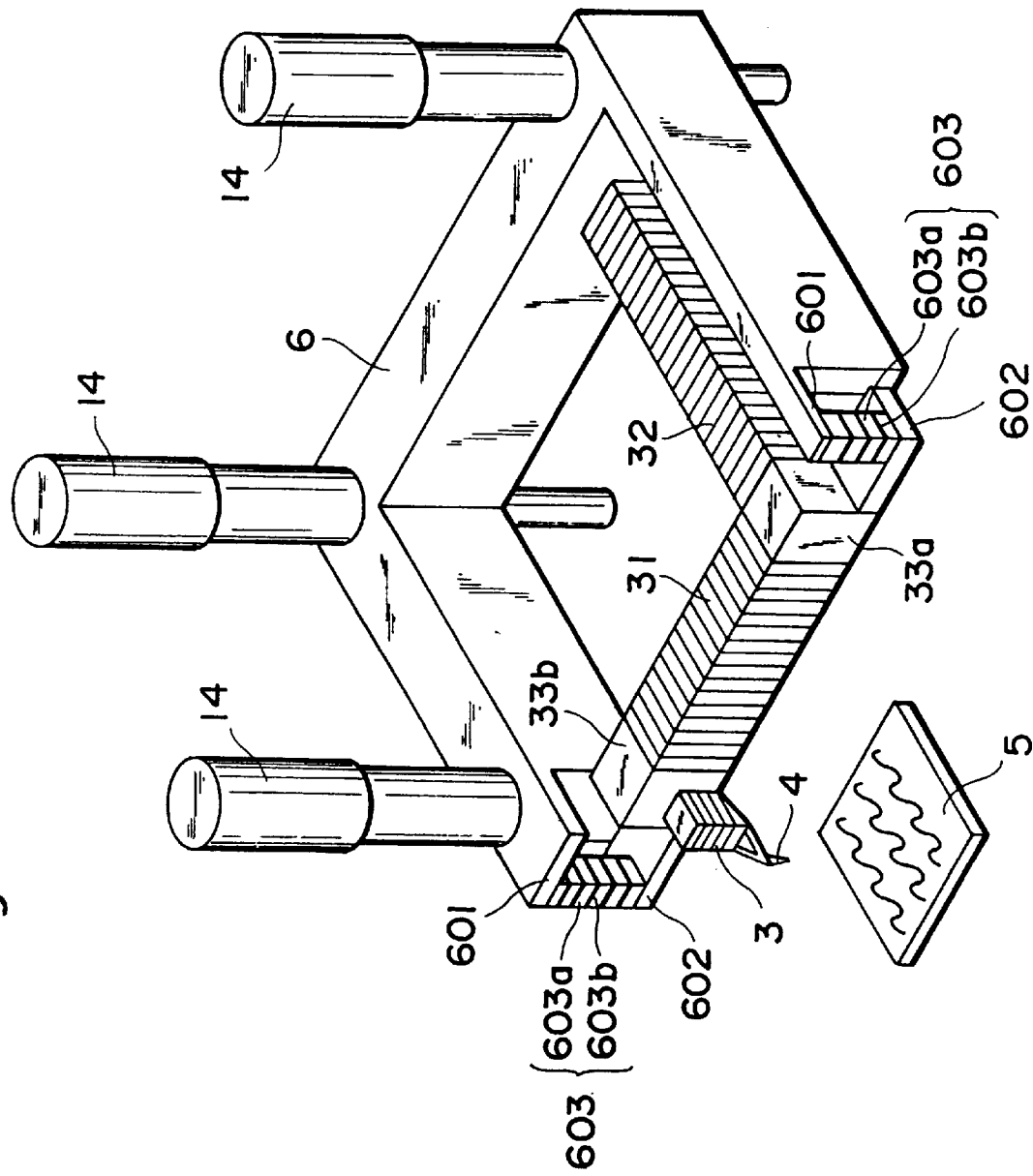
FIG. 43 is a perspective view of another antivibration mechanism.

FIG. 43 is a perspective view of the overall arrangement of a piezoelectric driving device according to another embodiment.

Since the same reference numerals in FIG. 43 denote the same parts as in FIG. 41, a description thereof will be omitted.

The piezoelectric driving device in FIG. 43 includes a Y-direction piezoelectric driving member 32 which has one end fixed to a frame 6 and the other fixed to block 33a and is displaced in the Y direction parallel to a sample surface 5, and an X-direction piezoelectric driving member 31 which has one end fixed to the block 33a and the other end fixed to a block 33b and is displaced in the X direction parallel to the sample surface 5 and perpendicular to the Y direction. A Z-direction piezoelectric driving member 3 is fixed to the block 33b. A probe 4 is arranged on the end of the Z-direction piezoelectric driving member 3 which is located on the sample side.

The blocks 33a and 33b respectively have free end support crossbeams 602. Free end flat support plates 601 are arranged above the respective free end support crossbeams 602. Free end support members 603 identical to the one shown in FIG. 41 are arranged between the respective free end support crossbeams 602 and the respective free end flat support plates 601. As described above, the free end support crossbeams 602 are arranged on the ends of the X- and Y-direction piezoelectric driving members which are not directly fixed to the frame 6, and are supported on the frame 6 via the free end support members 603 and the free end flat support plates 601.

In this piezoelectric driving device, when the Y-direction piezoelectric driving member 32 expands/contracts, the free end support member 603 fixed to the block 33a via the free end support crossbeam 602 is deformed in the same direction as the displacing direction of the Y-direction piezoelectric driving member 32, similar to the free end support member 603 in FIG. 41. similarly, the free end support member 603 fixed to the block 33b via the free end support crossbeam 602 is deformed in the same manner. When the X-direction piezoelectric driving member 31 expands/contracts, the free end support member 603 fixed to the block 33b via the free end support crossbeam 602 is formed in the same direction as the displacing direction of the X-direction piezoelectric driving member 31.

When the Y- and X-direction piezoelectric driving members 32 and 31 are simultaneously displaced, the free end support member 603 fixed to the block 33b via the free end support crossbeam 602 is displaced in the same direction as that of the resultant force of the forces generated by the X- and Y-direction piezoelectric driving members 31 and 32.

As described above, the free end support crossbeams 602 and the free end support members 603 are arranged on the ends of the respective piezoelectric driving members which are not fixed to the frame 6, and are fixed to the free end flat support plates 601. With this arrangement, even if the X-direction piezoelectric driving member 31 or the Y-direction piezoelectric driving member 32 does not have sufficient rigidity, the distance from the sample surface 5 can be kept constant without causing deflection of the member. If the path from a fixing end to the probe is long as in this piezoelectric driving device, the structure is susceptible to vibrations. In this device, however, since the free end support members 603 are arranged, the problem of vibrations can be solved.

Figure 44:
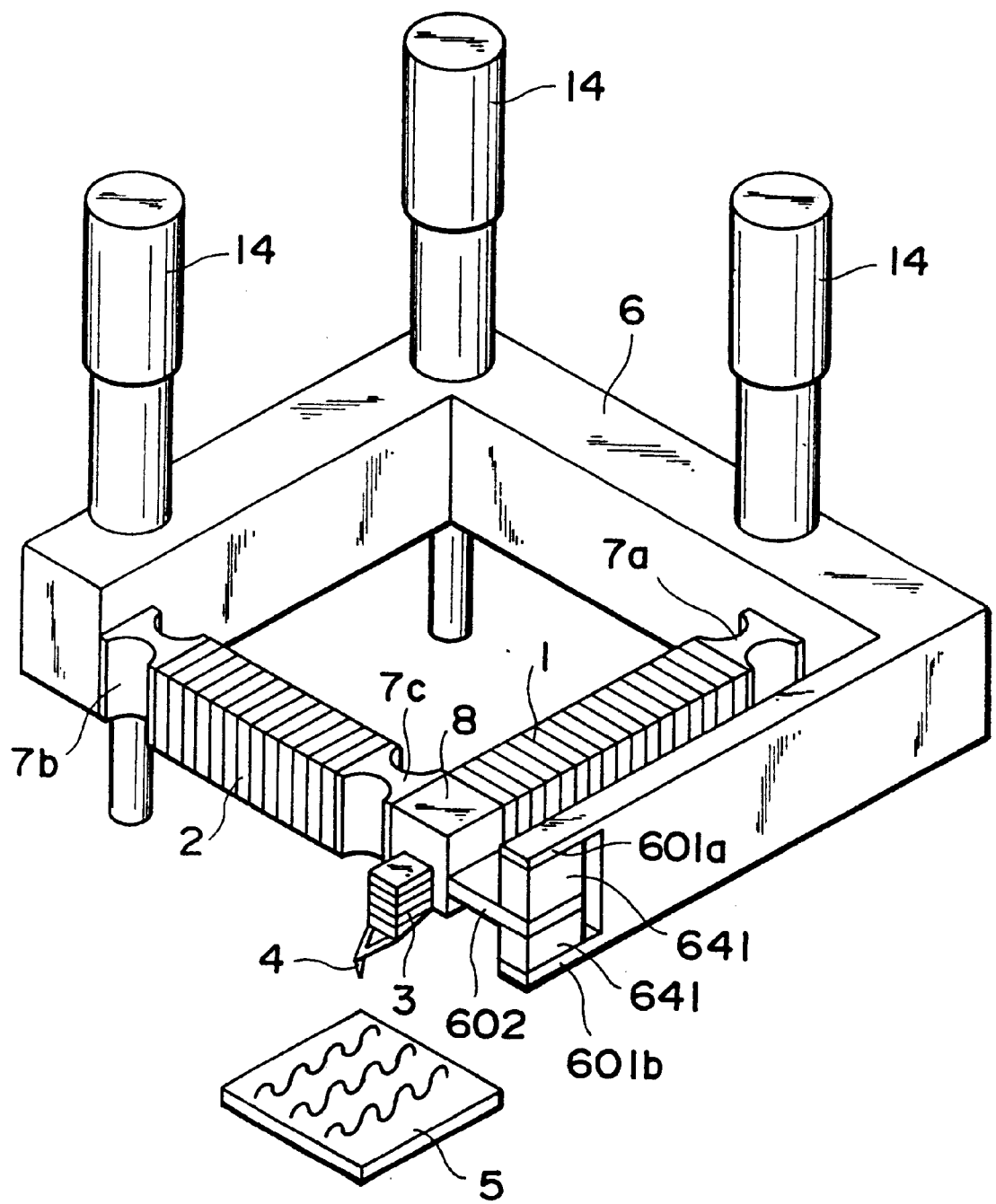
FIG. 44 is a perspective view of still another antivibration mechanism.

FIG. 44 is a perspective view of the overall arrangement of a piezoelectric driving device according to still another embodiment.

Since the same reference numerals in FIG. 44 denote the same parts as in FIG. 41, a description thereof will be omitted.

Free end flat support plates 601a and 601b are arranged above and blow a free end support crossbeam 602 fixed to a block 8. Elastic elements 641 are arranged between the free end support crossbeam 602 and the free end flat support plate 601a and between the free end support crossbeam 602 and the free end flat support plate 601b. The free end flat support plates 601a and 601b are fixed to a frame 6. Neoprene rubber having a hardness of 90 Hs (Shore hardness) is used for the elastic element 641.

In this manner, the free end support crossbeam 602 is arranged between the free end flat support plates 601a and 601b fixed to the frame 6, and the elastic elements 641 are arranged between the free end support crossbeam 602 and the free end flat support plate 601a and between the free end support crossbeam 602 and the free end flat support plate 601b. With this arrangement, since vibrations produced in a direction perpendicular to the sample surface 5 are suppressed from both the upward and downward directions, the vibrations can be quickly and efficiently attenuated.

If a polymer material having a high vibration absorbency is selected for the elastic element 641, vibrations can be further attenuated. The elastic element 641 is preferably higher in hardness than the elastic element in FIG. 41. An elastic element consisting of a material other than neoprene rubber, e.g., natural rubber or Byton rubber, may be used.

In this piezoelectric driving device, even if X- and Y-direction piezoelectric driving members 2 and 1 having low rigidity are used, since the free end support crossbeam 602 are supported from both the upward and downward directions, each piezoelectric driving member does not deflect, and the distance between a sample surface 5 and the probe can always be kept constant.

The same effects as those described above can be expected if a free end support member having an arrangement similar to that in the first embodiment, in which a hard plate is stacked between the elastic elements 641.

According to this device, even with the arrangement of the piezoelectric driving member shown in FIG. 43 (having only one fixing end), since the free end flat support plates are arranged above and below the free end support crossbeam, the same effects as those described above can be expected even if elastic elements are arranged between the free end support crossbeam and the free end flat support plates.

Figure 45:
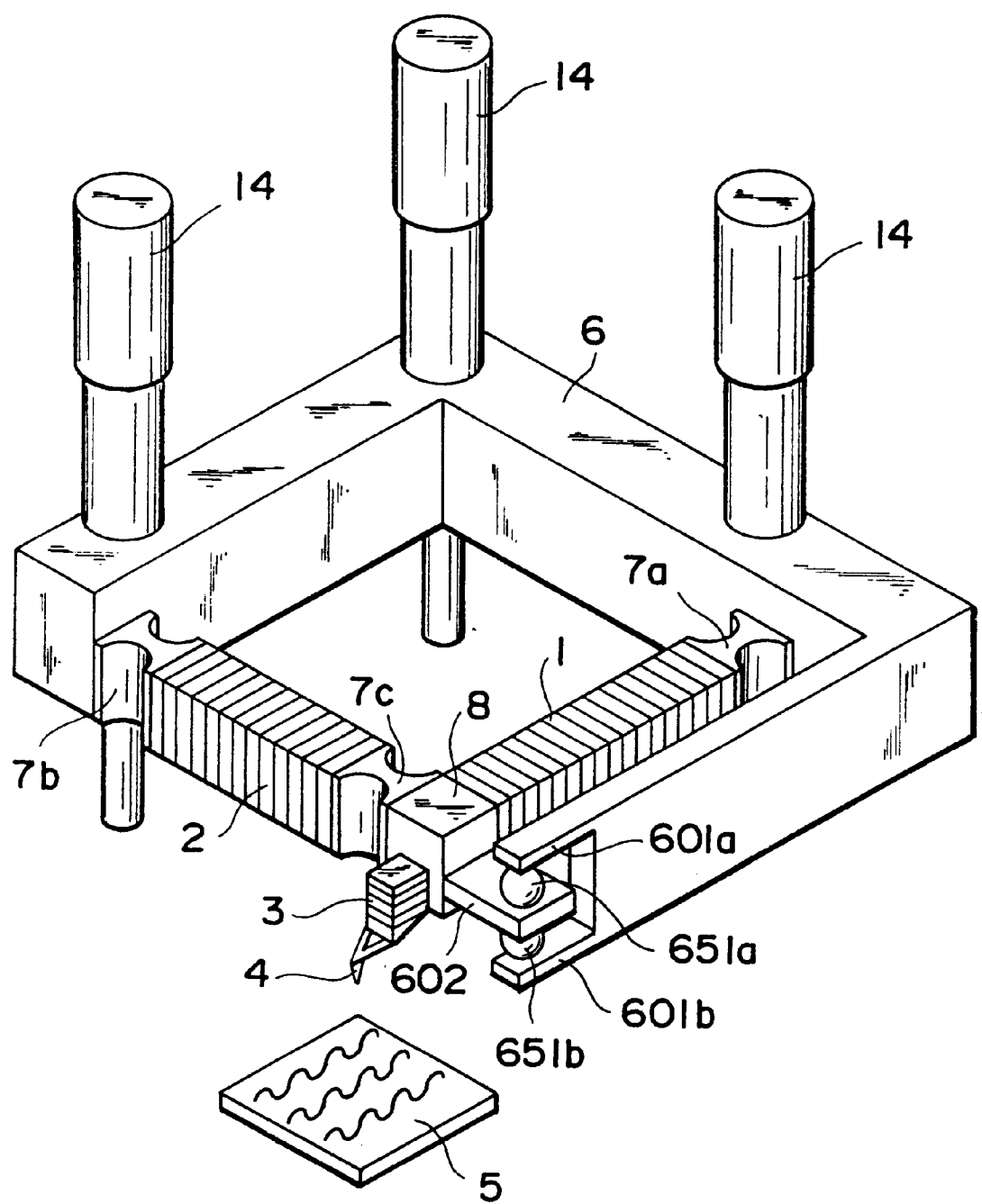
FIG. 45 is a perspective view showing an antivibration mechanisms using bearings.

FIG. 45 is a perspective view of the overall arrangement of a piezoelectric driving device according to still another embodiment.

Since the same reference numerals in FIG. 45 denote the same parts as in FIG. 44, a description thereof will be omitted.

In this device, a steel ball (ball bearing) 651a is arranged between a free end support crossbeam 602 and a free end flat support plate 601a, and a steel ball 651b is arranged between the free end support crossbeam 602 and a free end flat support plate 601b. The diameter of this steel ball 651a is almost equal to the distance between the free end support crossbeam 602 and the free end flat support plate 601a. The steel ball 651a consists of stainless steel. The diameter of this steel ball 651b is almost equal to the distance between the free end support crossbeam 602 and the free end flat support plate 601b on contact under the condition of Hertz's elastic contact between the beam 602 and the flat plate 601b. The steel ball 651b consists of almost the same material as that for the steel ball 651a.

Since the free ends of the piezoelectric driving members are supported by these steel balls, the distance between a probe 4 and a sample surface 5 can be kept constant even if X- and Y-direction piezoelectric driving members 2 and 1 having low rigidity are used.

In this device, since no force for deforming an elastic element is required to move the probe 4 in the X and Y directions, no load acts on the X- and Y-direction piezoelectric driving members 2 and 1 and a driving circuit for driving them. Since friction is caused by the steel balls 651a and 651b, the friction is rolling friction. For this reason, the friction can be reduced as compared with the case wherein the ends of the X- and Y-direction piezoelectric driving members 2 and 1 which are not fixed to the frame 6 are supported by plates like those described with reference to the prior art. Therefore, no load acts on the X- and Y-direction piezoelectric driving members 2 and 1 and the driving circuit for driving them.

In addition, according to this device, vibrations in the Z direction are not easily caused as compared with the case wherein a block 8 is not fixed.

When the influences of vibrations are to be further reduced, spherical elements obtained by attaching elastic elements around the surfaces of steel balls may be used in place of the steel balls 651a and 651b.

Even with the arrangement of the piezoelectric driving member shown in FIG. 43 (having only one fixing end), since the free end flat support plates are arranged above and below the free end support crossbeam, the same effects as those described above can be expected even if steel balls or spherical elements with elastic elements are arranged between the free end support crossbeam and the free end flat support plates.

The above piezoelectric driving device is especially effective as a piezoelectric driving device for the probe of a scanning type atomic force microscope, a scanning type tunnel microscope, or a scanning type proximity field microscope, which is used to detect fine uneven portions. This is because these microscopes need to detect uneven portions having a size of several Å, and a detection error is increased by a slight change in the deflection of the support element of the probe or vibrations of the probe, resulting in failure in accurate detection of the shape of a sample surface.

In each of these piezoelectric driving devices, each free end flat support plate is fixed to the frame 6. However, the stage on which a sample is placed, and the vibration system may be fixed to the same portion.

Each of these devices makes it difficult for the probe to vibrate in a direction perpendicular to a sample surface without interfering a scanning operation of the probe in a direction parallel to the sample surface. In addition, even if each piezoelectric driving member for supporting the probe is not high in rigidity, deflection of each piezoelectric driving member can be prevented.

Figure 47:
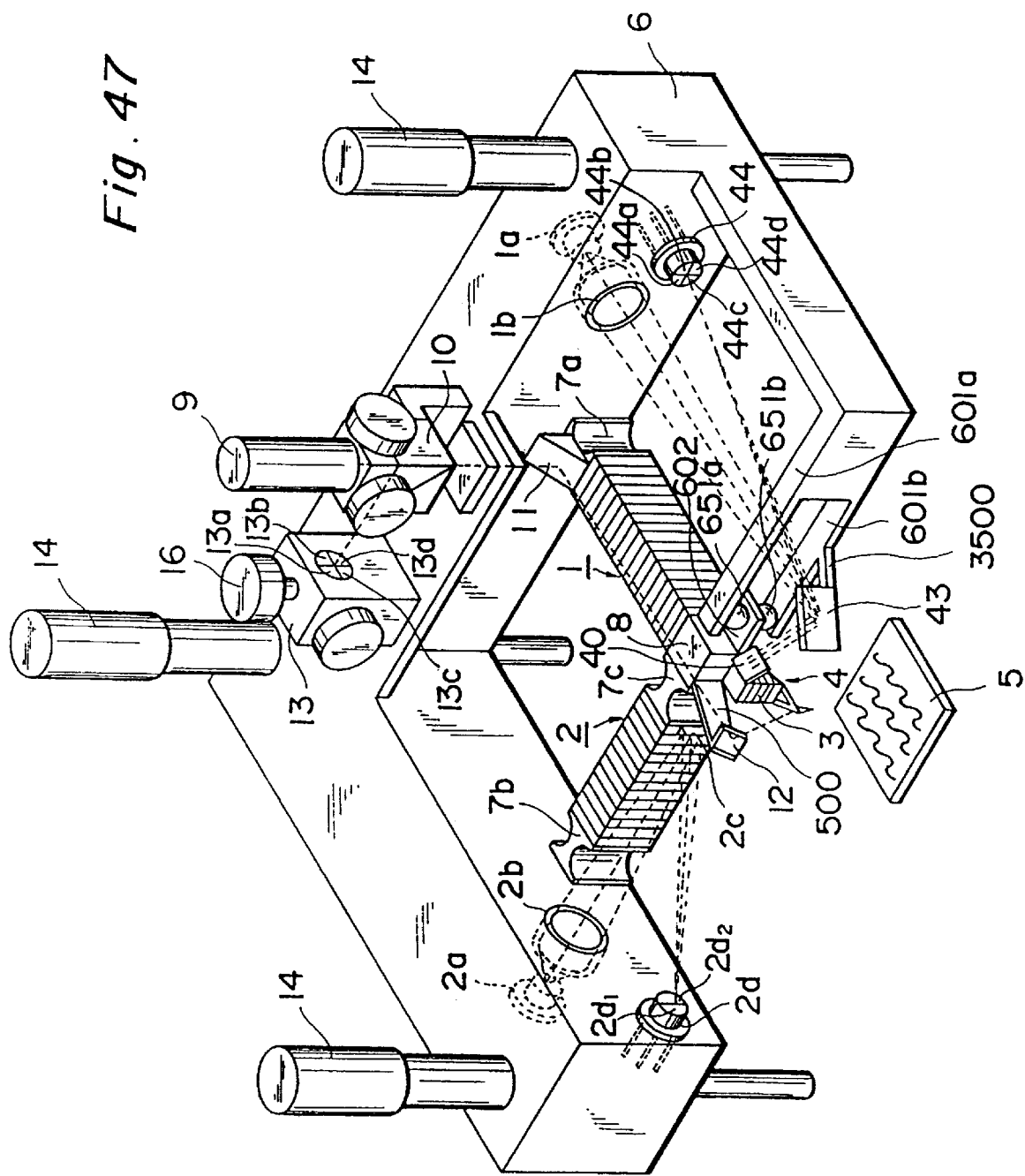
FIG. 47 is a perspective view of an atomic force microscope according to an embodiment of the present invention.

Next, an AFM according to an embodiment will be explained below. FIG. 47 is a perspective view of the AFM. The microscope comprises the parts of FIGS. 1A, 23, and 45. Accordingly, the same reference numerals as in FIG. 47 denote the same parts in FIGS. 1A, 23 and 45, and a detailed description thereof will be omitted.

The microscope has three piezoelectric driving members 1, 2 and 3, and the members 1–3 are connected through a rigid block 8. Each of the members 1–3 is expandable along each of the longitudinal directions, i.e., X, Y and Z axes. The expanding is performed by applying predetermined voltages to the members 1–3.

The ends of the first and second members 1 and 2 are connected to a frame 6. Hinges 7a and 7b are interposed between the frame 6 and the members 1–2, and the members 1 and 2 can be deflected only in a direction parallel to a virtual plane including the X and Y axes, thereby the probe 4 scans the surface of the sample 5 by applying voltages to the driving members 1 and 2.

The third member 3 is expandable along the Z-axis, thereby the probe 4 moves up and down relative to the sample 5 by applying voltage to the driving member 3.

The displacement amount of the probe 4 is detected by using photodetectors 2d and 44. The principle of the displacement amount detection using the photodetectors 2d and 44 is explained using FIG. 23, and a detailed description thereof will be omitted.

The light-receiving surface of the photodiode 2d is divided into two, i.e., the photodiode 2d has two light-receiving areas $2d_1$ and $2d_2$. The displacement amount of the X-direction piezoelectric driving member 1 is calculated by comparing signals from the right half light-receiving area $2d_2$ and left half light-receiving area $2d_1$.

The light-receiving surface of the photodiode 44 is divided into four, i.e., the photodiode 44 has four light-receiving areas 44a–44d. Light beam, to be detected by the photodiode 44, is incident on a mirror 40 which is connected to the Z-axis driving member 3, and reflected by the mirror 40. The displacement amount of the Z-direction piezoelectric driving member 3 is calculated by comparing signals from the upper half light-receiving area (44a, 44b) and lower half light-receiving area (44c, 44d). The displacement amount of the Y-direction piezoelectric driving member 2 is calculated by comparing signals from the right half light-receiving area (44b, 44d) and left half light-receiving area (44a, 44c).

A fin-like crossbeam 602 is fixed to the rigid block 8, and the beam 602 extends along the Y axis. A ball bearing 651a is disposed-between the free end support crossbeam 602 and a free end flat support plate 601a, and a ball bearing 651b is disposed between the free end support crossbeam 602 and a free end flat support plate 601b. The upper and lower crossbeams 601a and 601b are continued to the frame 6, and have a predetermined air gap therebetween. An arm member 3500 is continued to the lower crossbeam 601b, and a mirror 43 is fixed to the distal end of the arm 3500. The light beam reflected by the mirror 43 propagates in the air gap between the crossbeams 651a and 651b, and is incident on the photodetector 44.

Light beam emitted from a laser diode 9 is reflected by a mirror fixed on the hinge 7a, and propagates along the longitudinal direction of the first driving member 1. Note that the propagating direction of the light beam is not parallel to the longitudinal direction of the member 1. The light beam is reflected by a mirror 12 connected to a block 8, and incident on an upper surface of the cantilever 4. The optical passage of the light beam reflected by the cantilever is changed by an atomic force between the cantilever 4 and the sample 5, and the reflected light beam is incident on a light receiving surface of a photodetector 13. The light-receiving surface of the photodiode 13 is divided into four, i.e., the photodiode 13 has four light receiving areas 13a–13d. The displacement amount of the light beam incident on the photodetector is corresponding to the amount of the atomic force between the distal end of the probe 4 and the surface of the sample 5.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A scanning probe microscope comprising:

a light source for generating a light beam:

a support member;

a first driving member having two ends and being expandable along a first direction defined by the direction between the ends, the one end being flexibly connected to said support member;

a block fixed to the other end of said first driving member;

a second driving member having two ends and being expandable along a second direction defined by the direction between the ends of said second driving member, the one end of said second driving member being attached to said block;

a cantilever fixed to the other end of said second driving member, having a probe;

a first mirror fixed to said block so as to reflect said light beam traveling along the first direction onto said cantilever, and to reflect a returning light beam which has been reflected by said cantilever; and a photodetector arranged at a position in the path traveled by the light beam after the light beam has been reflected by said first mirror twice.

2. A microscope according to claim 1, further comprising:

a second mirror arranged near the one end of said first driving member so as to deflect the light beam after the light beam has been reflected by said first mirror twice.

3. A microscope according to claim 2, further comprising a beam splitter arranged at a point of pathways traversed by the light beam, one of the pathways being between said light source and said second mirror, and the other pathway being between said second mirror and said photodetector.

4. A microscope according to claim 1, wherein said photodetector has a plurality of divided light-receiving surfaces.

5. A microscope according to claim 1, further comprising a third driving member having two ends, expandable along a third direction defined by the ends thereof, the third direction being different from the first and second directions, one of the ends of said third driving member being flexibly connected to said support member, and the other of the ends of said third driving member being flexibly connected to said block.

6. A scanning probe microscope comprising:
   (a) an assembly having:
      a support member; and
      a driving portion including first, second, and third driving members each of which is extendable, each in a different direction, a part of said driving portion is connected to said support member;
   (b) a cantilever attached to said driving portion, having a probe;
   (c) a light beam emitting portion attached to said assembly;
   (d) a plurality of mirrors attached to said assembly, said mirrors reflecting the light beam from said light beam emitting portion onto said cantilever or reflecting a light beam which has been reflected by said cantilever; and
   (e) a photodetector arranged so as to receive the light beam which has been reflected by said cantilever and at least one of said mirrors.

7. A microscope according to claim 6, wherein said mirrors are fixed to said driving portion.

8. A microscope according to claim 6, wherein said first and second driving members are connected via their ends and are in an articulated structural relationship, and said third driving member is attached to one end of said first driving member, the direction of the extension of said third driving member is different from the directions of the extension of said first and second driving members.

9. A microscope according to claim 8, further comprising a block arranged between neighboring ends of said first and second driving members, wherein one of the ends is fixed to said block and the other of the ends is flexibly connected to said block.

10. A microscope according to claim 9, wherein at least one of said mirrors is fixed to said block, and said photodetector receives the light beam which has been reflected by the mirror fixed to said block twice.

11. A probe scanner comprising:
    a support member;
    a tube-type piezoelectric driving member having a first end and a second end, said driving member being fixed to said support member at said first end;
    a probe affixed to said second end of said driving member;
    a light source emitting a probe light; and
    a reflecting member attached to the outside surface of said driving member for directing said probe light to said probe.

12. The probe scanner according to claim 11, wherein said reflecting member is attached at a location equidistant from said two ends of said driving member.

13. The probe scanner according to claim 12, wherein said reflecting member is a mirror.

* * * * *